United States Patent
Leake et al.

(10) Patent No.: US 12,437,841 B2
(45) Date of Patent: Oct. 7, 2025

(54) SYSTEMS AND METHODS FOR STORING AND READING NUCLEIC ACID-BASED DATA WITH ERROR PROTECTION

(71) Applicant: Catalog Technologies, Inc., Boston, MA (US)

(72) Inventors: Devin Leake, Boston, MA (US); Swapnil P. Bhatia, Boston, MA (US); Hyunjun Park, Boston, MA (US); Nathaniel Roquet, Boston, MA (US); Graeme Doran, Boston, MA (US)

(73) Assignee: CATALOG TECHNOLOGIES, INC., Boston, MA (US)

( * ) Notice: Subject to any disclaimer, the term of this patent is extended or adjusted under 35 U.S.C. 154(b) by 1132 days.

(21) Appl. No.: 16/532,077

(22) Filed: Aug. 5, 2019

(65) Prior Publication Data
US 2020/0185057 A1   Jun. 11, 2020

Related U.S. Application Data

(60) Provisional application No. 62/714,557, filed on Aug. 3, 2018.

(51) Int. Cl.
*G16B 30/00* (2019.01)
*B82Y 10/00* (2011.01)
(Continued)

(52) U.S. Cl.
CPC .............. *G16B 30/00* (2019.02); *B82Y 10/00* (2013.01); *C12Q 1/6869* (2013.01);
(Continued)

(58) Field of Classification Search
CPC ........ G16B 30/00; G16B 35/20; B82Y 10/00; G06N 3/002; G11C 13/02
See application file for complete search history.

(56) References Cited

U.S. PATENT DOCUMENTS

| | | | |
|---|---|---|---|
| 5,821,886 | A | 10/1998 | Son |
| 6,187,537 | B1 | 2/2001 | Zinn, Jr. et al. |

(Continued)

FOREIGN PATENT DOCUMENTS

| | | |
|---|---|---|
| CA | 2974306 | 8/2016 |
| EP | 1512749 A2 | 3/2005 |

(Continued)

OTHER PUBLICATIONS

US 11,667,940 B2, 06/2023, Nguyen et al. (withdrawn)
(Continued)

*Primary Examiner* — Lori A. Clow
*Assistant Examiner* — Emilie A Neulen
(74) *Attorney, Agent, or Firm* — McDermott Will & Schulte LLP

(57) ABSTRACT

The systems, devices, and methods described herein provide scalable methods for writing data to and reading data from nucleic acid molecules. The present disclosure covers four primary areas of interest: (1) accurately and quickly reading information stored in nucleic acid molecules, (2) partitioning data to efficiently encode data in nucleic acid molecules, (3) error protection and correction when encoding data in nucleic acid molecules, and (4) data structures to provide efficient access to information stored in nucleic acid molecules.

24 Claims, 18 Drawing Sheets

(51) Int. Cl.
  *C12Q 1/6869* (2018.01)
  *G01N 33/487* (2006.01)
  *G06N 3/00* (2023.01)
  *G11C 13/02* (2006.01)
  *G16B 35/20* (2019.01)

(52) U.S. Cl.
  CPC ....... *G01N 33/48721* (2013.01); *G06N 3/002* (2013.01); *G11C 13/02* (2013.01); *G16B 35/20* (2019.02)

(56) References Cited

U.S. PATENT DOCUMENTS

| | | |
|---|---|---|
| 6,221,653 B1 | 4/2001 | Caren et al. |
| 6,309,828 B1 | 10/2001 | Schleifer et al. |
| 6,384,210 B1 | 5/2002 | Blanchard |
| 6,419,883 B1 | 7/2002 | Blanchard |
| 6,446,642 B1 | 9/2002 | Caren et al. |
| 6,458,583 B1 | 10/2002 | Bruhn et al. |
| 6,537,747 B1 | 3/2003 | Mills, Jr. et al. |
| 6,796,634 B2 | 9/2004 | Caren et al. |
| 7,176,297 B2 | 2/2007 | Li et al. |
| 7,306,316 B2 | 12/2007 | Doak |
| 7,491,422 B2 | 2/2009 | Zhang et al. |
| 7,600,840 B2 | 10/2009 | Kim et al. |
| 7,802,517 B2 | 9/2010 | Wessels et al. |
| 7,833,701 B2 | 11/2010 | Oshima |
| 7,909,427 B2 | 3/2011 | Kim et al. |
| 7,951,334 B2 | 5/2011 | Mirkin et al. |
| 8,071,168 B2 | 12/2011 | Cruchon-Dupeyrat et al. |
| 8,114,207 B2 | 2/2012 | Josten |
| 8,136,936 B2 | 3/2012 | Hook et al. |
| 8,496,326 B2 | 7/2013 | Hook et al. |
| 8,735,327 B2 | 5/2014 | Macula |
| 8,769,689 B2 | 7/2014 | Hoglund |
| 8,806,127 B2 | 8/2014 | Brownell et al. |
| 8,835,358 B2 | 9/2014 | Fodor et al. |
| 8,856,940 B2 | 10/2014 | Kencl et al. |
| 8,937,564 B2 | 1/2015 | Aloni et al. |
| 9,061,494 B2 | 6/2015 | Rogers et al. |
| 9,062,218 B2 | 6/2015 | Oshima et al. |
| 9,187,777 B2 | 11/2015 | Jacobson et al. |
| 9,266,370 B2 | 2/2016 | Jung et al. |
| 9,317,664 B2 | 4/2016 | Ahuja et al. |
| 9,384,320 B2 | 7/2016 | Church |
| 9,403,180 B2 | 8/2016 | Ha et al. |
| 9,487,002 B2 | 11/2016 | Rogers et al. |
| 9,616,661 B2 | 4/2017 | Pierik et al. |
| 9,679,030 B2 | 6/2017 | Hatami-Hanza |
| 9,684,678 B2 | 6/2017 | Hatami-Hanza |
| 9,774,351 B2 | 9/2017 | Huetter et al. |
| 9,830,553 B2 | 11/2017 | Chen et al. |
| 9,904,734 B2 | 2/2018 | Murrah et al. |
| 9,928,869 B2 | 3/2018 | Church |
| 9,996,778 B2 | 6/2018 | Church |
| 10,020,826 B2 | 7/2018 | Gladwin et al. |
| 10,027,347 B2 | 7/2018 | Le Scouarnec et al. |
| 10,047,235 B2 | 8/2018 | Wilsher et al. |
| 10,050,959 B2 | 8/2018 | Soon-Shiong et al. |
| 10,287,573 B2 | 5/2019 | Macula |
| 10,289,801 B2 | 5/2019 | Church |
| 10,370,246 B1 | 8/2019 | Milenkovic et al. |
| 10,387,301 B2 | 8/2019 | Goldman et al. |
| 10,417,457 B2 | 9/2019 | Peck |
| 10,423,341 B1 | 9/2019 | Kermani |
| 10,438,662 B2 | 10/2019 | Predki |
| 10,460,220 B2 | 10/2019 | Church |
| 10,566,077 B1 | 2/2020 | Milenkovic et al. |
| 10,640,822 B2 | 5/2020 | Predki et al. |
| 10,650,312 B2 | 5/2020 | Roquet et al. |
| 10,669,558 B2 | 6/2020 | Ganjam |
| 10,742,233 B2 | 8/2020 | Erlich |
| 10,754,994 B2 | 8/2020 | Peck |
| 10,774,379 B2 | 9/2020 | Chen et al. |
| 10,787,699 B2 | 9/2020 | Chen et al. |
| 10,793,897 B2 | 10/2020 | Chen et al. |
| 10,818,378 B2 | 10/2020 | Hutchison, III et al. |
| 10,838,939 B2 | 11/2020 | Walder et al. |
| 10,839,295 B2 | 11/2020 | Shen et al. |
| 10,853,244 B2 | 12/2020 | Petti et al. |
| 10,860,562 B1* | 12/2020 | Gupta ................. G06F 16/2453 |
| 10,883,140 B2 | 1/2021 | Church et al. |
| 10,902,939 B2 | 1/2021 | Merriman et al. |
| 10,917,109 B1 | 2/2021 | Dimopoulou et al. |
| 10,929,039 B2 | 2/2021 | Kwon et al. |
| 10,936,953 B2 | 3/2021 | Peck et al. |
| 10,956,806 B2 | 3/2021 | Masuda et al. |
| 10,982,276 B2 | 4/2021 | Efcavitch et al. |
| 11,066,661 B2 | 7/2021 | Rausch et al. |
| 11,093,547 B2 | 8/2021 | Su et al. |
| 11,093,865 B2 | 8/2021 | Rubenstein et al. |
| 11,100,404 B2 | 8/2021 | Merriman et al. |
| 11,133,084 B2 | 9/2021 | Schnall-Levin et al. |
| 11,162,950 B2 | 11/2021 | Pfeiffer et al. |
| 11,164,190 B2 | 11/2021 | Pfeiffer et al. |
| 11,174,512 B2 | 11/2021 | Efcavitch et al. |
| 11,263,354 B2 | 3/2022 | Peck |
| 11,308,055 B2 | 4/2022 | Walder et al. |
| 11,326,161 B2 | 5/2022 | Church et al. |
| 11,339,423 B2 | 5/2022 | Bishop et al. |
| 11,365,411 B2 | 6/2022 | Chen et al. |
| 11,435,905 B1 | 9/2022 | Kermani |
| 11,485,965 B2 | 11/2022 | Strauss et al. |
| 11,495,324 B2 | 11/2022 | Yekhanin et al. |
| 11,507,135 B2 | 11/2022 | Cheung et al. |
| 11,538,554 B1 | 12/2022 | Milenkovic |
| 11,545,182 B2 | 1/2023 | Yachie et al. |
| 11,643,647 B2 | 5/2023 | Rausch et al. |
| 11,651,836 B2 | 5/2023 | Strauss et al. |
| 11,702,689 B2 | 7/2023 | Chen et al. |
| 11,704,575 B2 | 7/2023 | Strauss et al. |
| 11,720,801 B2 | 8/2023 | Nakamura et al. |
| 11,755,922 B2 | 9/2023 | Milenkovic et al. |
| 11,783,918 B2 | 10/2023 | Strauss et al. |
| 11,837,302 B1 | 12/2023 | Predki |
| 11,854,668 B2 | 12/2023 | Hayes et al. |
| 11,854,669 B1 | 12/2023 | Bachand |
| 11,873,484 B2 | 1/2024 | Chen et al. |
| 11,892,945 B2 | 2/2024 | Goldman et al. |
| 11,900,191 B2 | 2/2024 | Church |
| 11,928,603 B2 | 3/2024 | Diamanti et al. |
| 11,931,713 B2 | 3/2024 | Horton et al. |
| 11,943,940 B2 | 3/2024 | Hihath et al. |
| 11,961,008 B2 | 4/2024 | Bathe et al. |
| 11,970,696 B1 | 4/2024 | Haupt et al. |
| 11,989,216 B2 | 5/2024 | Ceze et al. |
| 11,990,184 B2 | 5/2024 | Mendonsa et al. |
| 12,009,062 B2 | 6/2024 | Ceze et al. |
| 12,046,329 B2 | 7/2024 | Makarychev |
| 12,056,264 B2 | 8/2024 | Peck |
| 12,086,722 B2 | 9/2024 | Bramlett et al. |
| 12,104,167 B2 | 10/2024 | Ganjam |
| 2003/0116630 A1 | 6/2003 | Carey et al. |
| 2004/0244623 A1 | 12/2004 | Hayashizaki |
| 2005/0019760 A1 | 1/2005 | Southern |
| 2005/0166782 A2 | 8/2005 | Hayashizaki |
| 2005/0243618 A1 | 11/2005 | Boland et al. |
| 2006/0263534 A1 | 11/2006 | Laurent et al. |
| 2008/0252679 A1 | 10/2008 | Pierik et al. |
| 2008/0269152 A1 | 10/2008 | Verdine et al. |
| 2008/0303870 A1 | 12/2008 | Verbeek et al. |
| 2008/0309701 A1 | 12/2008 | Pierik et al. |
| 2009/0023607 A1 | 1/2009 | Rozhok et al. |
| 2009/0033690 A1 | 2/2009 | Pierik et al. |
| 2009/0062129 A1 | 3/2009 | McKernan et al. |
| 2009/0253141 A1 | 10/2009 | Quake |
| 2010/0029490 A1 | 2/2010 | Pierik et al. |
| 2010/0056381 A1 | 3/2010 | Kurt et al. |
| 2011/0195850 A1 | 8/2011 | Rozhok et al. |
| 2011/0312779 A1 | 12/2011 | Silverbrook et al. |
| 2011/0312782 A1 | 12/2011 | Azimi et al. |
| 2011/0312847 A1 | 12/2011 | Silverbrook et al. |
| 2011/0312851 A1 | 12/2011 | Silverbrook et al. |
| 2011/0312853 A1 | 12/2011 | Azimi et al. |

(56) References Cited

U.S. PATENT DOCUMENTS

| | | |
|---|---|---|
| 2011/0312855 A1 | 12/2011 | Silverbrook et al. |
| 2011/0312856 A1 | 12/2011 | Silverbrook et al. |
| 2012/0089339 A1 | 4/2012 | Ganeshalingam |
| 2012/0164396 A1 | 6/2012 | Mirkin et al. |
| 2012/0329561 A1 | 12/2012 | Evans et al. |
| 2013/0231254 A1 | 9/2013 | Kawashima et al. |
| 2013/0233709 A1 | 9/2013 | Dunbar |
| 2013/0253839 A1 | 9/2013 | Friedlander |
| 2013/0338009 A1 | 12/2013 | Gregory |
| 2014/0065609 A1 | 3/2014 | Hicks et al. |
| 2014/0296087 A1 | 10/2014 | Verdine et al. |
| 2014/0371100 A1 | 12/2014 | Kawashima et al. |
| 2015/0083797 A1 | 3/2015 | Tran et al. |
| 2015/0261664 A1 | 9/2015 | Goldman et al. |
| 2015/0269313 A1 | 9/2015 | Church |
| 2015/0312212 A1 | 10/2015 | Holmes et al. |
| 2015/0363550 A1 | 12/2015 | Green et al. |
| 2016/0007893 A1 | 1/2016 | Roberts |
| 2016/0051985 A1 | 2/2016 | Knight et al. |
| 2016/0168579 A1 | 6/2016 | Hutchison et al. |
| 2016/0258939 A1 | 9/2016 | Morin |
| 2016/0304948 A1 | 10/2016 | Lee et al. |
| 2016/0371434 A1 | 12/2016 | Strauss et al. |
| 2017/0017436 A1 | 1/2017 | Church |
| 2017/0021611 A1 | 1/2017 | Jung et al. |
| 2017/0060924 A1* | 3/2017 | Fitzhardinge ....... H04L 67/1095 |
| 2017/0081716 A1 | 3/2017 | Peck |
| 2017/0093851 A1 | 3/2017 | Allen |
| 2017/0109229 A1 | 4/2017 | Huetter |
| 2017/0136452 A1 | 5/2017 | Niles et al. |
| 2017/0140095 A1 | 5/2017 | Kim |
| 2017/0175170 A1 | 6/2017 | Chen |
| 2017/0218228 A1 | 8/2017 | Jose et al. |
| 2017/0233724 A1 | 8/2017 | Bustamante |
| 2017/0355982 A1 | 12/2017 | Derda et al. |
| 2017/0363953 A1 | 12/2017 | Steinhart et al. |
| 2018/0068060 A1 | 3/2018 | Ceze et al. |
| 2018/0086781 A1 | 3/2018 | Liss |
| 2018/0101487 A1 | 4/2018 | Peck |
| 2018/0121478 A1 | 5/2018 | Walder et al. |
| 2018/0137418 A1 | 5/2018 | Roquet et al. |
| 2018/0173710 A1 | 6/2018 | Maftuleac et al. |
| 2018/0173738 A1 | 6/2018 | Lopez-Ortiz et al. |
| 2018/0253563 A1 | 9/2018 | Peck et al. |
| 2019/0020651 A1 | 1/2019 | Soon-Shiong et al. |
| 2019/0040458 A1 | 2/2019 | Su et al. |
| 2019/0136307 A1 | 5/2019 | Predki |
| 2019/0138909 A1 | 5/2019 | Shen |
| 2019/0142882 A1 | 5/2019 | Shepherd et al. |
| 2019/0271032 A1 | 9/2019 | Owen |
| 2019/0325040 A1 | 10/2019 | Sagi |
| 2019/0344239 A1 | 11/2019 | Efcavitch et al. |
| 2019/0351673 A1 | 11/2019 | Roquet et al. |
| 2019/0355442 A1 | 11/2019 | Merriman |
| 2019/0383788 A1 | 12/2019 | Predki |
| 2020/0076798 A1 | 3/2020 | Lidsky |
| 2020/0193301 A1 | 6/2020 | Roquet et al. |
| 2020/0242482 A1 | 7/2020 | Merriman et al. |
| 2020/0357483 A1 | 11/2020 | Roquet et al. |
| 2021/0010065 A1 | 1/2021 | Salk et al. |
| 2021/0050073 A1 | 2/2021 | Chen et al. |
| 2021/0074380 A1 | 3/2021 | Yekhanin |
| 2021/0108194 A1 | 4/2021 | Roquet et al. |
| 2021/0210171 A1 | 7/2021 | Stirparo et al. |
| 2021/0332426 A1 | 10/2021 | Puddu et al. |
| 2021/0348214 A1 | 11/2021 | Roquet et al. |
| 2021/0363570 A1 | 11/2021 | Mok et al. |
| 2022/0012646 A1 | 1/2022 | Rubenstein et al. |
| 2022/0028497 A1 | 1/2022 | Keung et al. |
| 2022/0282243 A1 | 9/2022 | Chen et al. |
| 2022/0364991 A1 | 11/2022 | Wanunu et al. |
| 2022/0389483 A1 | 12/2022 | Chen et al. |
| 2023/0027270 A1 | 1/2023 | Rubenstein et al. |
| 2023/0153452 A1 | 5/2023 | Peck et al. |
| 2023/0161995 A1 | 5/2023 | Masuda et al. |
| 2023/0185971 A1 | 6/2023 | Peck |
| 2023/0193383 A1 | 6/2023 | Peck |
| 2023/0207001 A1 | 6/2023 | Predki et al. |
| 2023/0215516 A1 | 7/2023 | Arslan et al. |
| 2023/0230636 A1 | 7/2023 | Gu et al. |
| 2023/0245720 A1 | 8/2023 | Strauss et al. |
| 2023/0257788 A1 | 8/2023 | Chen et al. |
| 2023/0257789 A1 | 8/2023 | Chen et al. |
| 2023/0274793 A1 | 8/2023 | Chen et al. |
| 2023/0279485 A1 | 9/2023 | Predki et al. |
| 2023/0281112 A9 | 9/2023 | Goldman et al. |
| 2023/0324822 A1 | 10/2023 | Keung et al. |
| 2023/0395198 A1 | 12/2023 | Strauss et al. |
| 2023/0419331 A1 | 12/2023 | Owen et al. |
| 2024/0011076 A1 | 1/2024 | Grass et al. |
| 2024/0035018 A1 | 2/2024 | Roselle et al. |
| 2024/0071574 A1 | 2/2024 | Bradl et al. |
| 2024/0095543 A1 | 3/2024 | Bar-Lev et al. |
| 2024/0132947 A1 | 4/2024 | Chiozzi |
| 2024/0152629 A1 | 5/2024 | Deshpande et al. |
| 2024/0168676 A1 | 5/2024 | Avraham et al. |
| 2024/0176733 A1 | 5/2024 | Avraham et al. |
| 2024/0182871 A1 | 6/2024 | Shepherd |
| 2024/0321356 A1 | 9/2024 | Tuller et al. |
| 2024/0346270 A1 | 10/2024 | Chen et al. |
| 2024/0369476 A1 | 11/2024 | Chen et al. |

FOREIGN PATENT DOCUMENTS

| | | |
|---|---|---|
| EP | 2329425 A1 | 6/2011 |
| EP | 2856375 A2 | 4/2015 |
| EP | 3067809 | 9/2016 |
| EP | 3346404 A1 | 7/2018 |
| EP | 3810773 | 1/2024 |
| EP | 4451278 | 10/2024 |
| JP | 2009244996 | 10/2009 |
| JP | 2010-20524 | 1/2010 |
| WO | WO-03025123 A2 | 3/2003 |
| WO | WO-2004009844 | 1/2004 |
| WO | WO-2006055943 | 5/2006 |
| WO | WO-2007135354 | 11/2007 |
| WO | WO-2012058638 A1 | 5/2012 |
| WO | WO-2012094492 | 7/2012 |
| WO | WO-2013178801 | 12/2013 |
| WO | WO-2014014991 A2 | 1/2014 |
| WO | WO-2015144858 A1 | 10/2015 |
| WO | WO-2016015701 A1 | 2/2016 |
| WO | WO-2016059610 A1 | 4/2016 |
| WO | WO-2016081834 A2 | 5/2016 |
| WO | WO-2016164779 A1 | 10/2016 |
| WO | WO-2016182814 A2 | 11/2016 |
| WO | WO-2017151195 A1 | 9/2017 |
| WO | WO-2017189914 A1 | 11/2017 |
| WO | WO-2017190297 A1 | 11/2017 |
| WO | WO-2017192633 A1 | 11/2017 |
| WO | WO-2018017131 A1 | 1/2018 |
| WO | WO-2018049272 A1 | 3/2018 |
| WO | WO-2018094108 A1 | 5/2018 |
| WO | WO-2018094115 A1 | 5/2018 |
| WO | WO-2018102064 | 6/2018 |
| WO | WO-2018132457 A1 | 7/2018 |
| WO | WO-2018148260 A1 | 8/2018 |
| WO | WO-2018148458 A1 | 8/2018 |
| WO | WO-2018213856 A2 | 11/2018 |
| WO | WO-2019046768 A1 | 3/2019 |
| WO | WO-2019053443 | 3/2019 |
| WO | WO-2019081145 A1 | 5/2019 |
| WO | WO-2019178551 A1 | 9/2019 |
| WO | WO-2019195479 | 10/2019 |
| WO | WO-2019222561 | 11/2019 |
| WO | WO-2019224544 | 11/2019 |
| WO | WO-2019246434 A1 | 12/2019 |
| WO | WO-2020014478 A1 | 1/2020 |
| WO | WO-2020028912 A1 | 6/2020 |
| WO | WO-2020128517 A1 | 6/2020 |
| WO | WO-2020132935 A1 | 7/2020 |
| WO | WO-2020239806 | 12/2020 |

(56) References Cited

FOREIGN PATENT DOCUMENTS

| | | |
|---|---|---|
| WO | WO-2022055885 | 3/2022 |
| WO | WO-2023026039 | 3/2023 |
| WO | WO-2024020395 | 1/2024 |

OTHER PUBLICATIONS

De Silva, et al., "New Trends of Digital Data Storage in DNA", BioMed Research International, vol. 2016, Article ID 8072463, 14 pages (Sep. 5, 2016) ps. 14.

Extended European Search Report for EP Application No. 17872172.6 dated Oct. 27, 2020, 10 pages.

Patrick, et al., DNA Assembly in 3D Printed Fluidics, PLOS One, 10(12): e014636 18 pages (2015).

Bonnet et al., "Rewritable digital data storage in live cells via engineered control of recombination directionality," Proceeding of the National Academy of Sciences, vol. 109(23): 8884-8889 (2012).

Bornholt et al., "A DNA-Based Archival Storage System," International Conference on Architectural Support for Programming Languages and Operating Systems (ASPLOS), Apr. 2-6, 2016, Atlanta, GA, 637-649.

Buschmann, et al., "Levenshtein Error-Correcting Barcodes for Multiplexed DNA Sequencing", BMC Bioinformatics, vol. 14, No. 1., pp. 1-10 (2013).

Bystrykh, et al., "Generalized DNA Barcode Design Based on Hamming Codes", PLOS ONE, vol. 7, No. 5, pp. 1-8, (May 2012).

Casini, A. "Advanced DNA assembly strategies and standards for synthetic biology," Thesis, Department of Life Sciences, Imperial College London: 1-178 (2014).

Clarke, et al., "Continuous base identification for single-molecule nanopore DNA sequencing", Nature Nanotechnology, vol. 4, No. 4, pp. 265-270, Feb. 22, 2009.

Deorowicz et al., "Data compression for sequencing data," Algorithms for Molecular Biology, vol. 8(25): 1-13 (2013).

Engler et al., "A One Pot, One Step, Precision Cloning Method with High Throughput Capability," PLoS ONE, vol. 3(11): E3647 (2008) printed as pp. 1-7.

Engler et al., "Chapter 12: Combinatorial DNA Assembly Using Golden Gate Cloning," Karen M. Polizzi and Cleo Kontoravadi (eds.), Synthetic Biology, Methods in Molecular Biology, vol. 1073, Springer Science+Business Media, New York: 141-156 (2013).

Fogg et al., "New Applications for Phage Integrases, Journal of Molecular Biology," vol. 426(15):2703-2716 (2014).

Goldman et al., "Towards practical, high-capacity, low-maintenance information storage in synthesized DNA," Nature, vol. 494: 77-80 (2013).

Kivioja et al., "Counting absolute Nos. of molecules using unique molecular identifiers," Nature Methods, vol. 9(1): 72- 74 (2011), including pp. 1-2 of Online Methods, and pp. 1-14 of Supplementary Information.

Lee, et al., "Enzymatic DNA synthesis for digital information storage", bioRxiv, XP055603868, DOI: 10.1101/348987 Retrieved from the Internet: URL:https://www.biorxiv.org/content/biorxiv/early/2018/06/16/348987.full.pdf [retrieved on Nov. 20, 2019] abstract, pp. 5, 8ff (Jun. 16, 2018).

Leier et al., "Cryptography with DNA binary strands," Biosystems, vol. 57: 13-22 (2000).

Organick, et al., "Random access in large-scale DNA data storage", Nature Biotechnology, vol. 36, No. 3, pp. 242-248, (Mar. 1, 2018).

PCT/US2017/062098 International Search Report and Written Opinion dated Mar. 14, 2018.

PCT/US2017/062106 International Search Report and Written Opinion dated Feb. 22, 2018.

PCT/US2019/022596 International Search Report and Written Opinion dated Jun. 28, 2019.

PCT/US2019/032756 International Search Report and Written Opinion dated Sep. 4, 2019.

Quetier et al., "The CRISPR-Cas9 technology: Closer to the ultimate toolkit for targeted genome editing," Plant Science, vol. 242: 65-76 (2015).

Roquet et al., "Synthetic recombinase-based state machines in living cells," Science, vol. 353(6297): 363, aad8559-1-aad8559-13 (2016).

Sands, B. and Brent, R., "Overview of Post Cohen-Boyer Methods for Single Segment Cloning and for Multisegment DNA Assembly," Current Protocols in Molecular Biology, vol. 113: 3.26.1-3.26-20 (2016).

Sorek et al., "CRISPR-Mediated Adaptive Immune Systems in Bacteria and Archaea," Annual Review of Biochemistry, vol. 82: 237-266 (2013).

Sun et al., "Recent advances in targeted genome engineering in mammalian systems," Biotechnology Journal, vol. 7: 1074-1087 (2012).

Tulpan, et al., "HyDEn: A Hybrid Steganocryptographic Approach for Data Encryption Using Randomized Error Correcting DNA Codes,", Biomed Research International, vol. 32, No. 4839, pp. 1-11, (2013).

Yang et al., "Permanent genetic memory with >1-byte capacity," Nature Methods, vol. 11(12): 1261-1266 (2014) including pp. 1-3 of Online Methods, and pp. 1-30 of Supplementary Figures and Text.

Yazdi et al., "A Rewritable, Random-Access DNA-Based Storage System," Scientific Reports, vol. 5(14138): 1-10 (2015), including pp. 1-19 of Supplementary Information.

Yazdi et al., "DNA-based storage: Trends and Methods," IEEE Transactions on Molecular, Biological, and Multi-Scale Communications, vol. 1(3): 230-248 (2015).

Yim et al., "The essential component in DNA-based information storage system: robust error-tolerating module," Frontiers in Bioengineering and Biotechnology, vol. 2, Article 49: 1-5 (2014).

Zhu et al., "High-throughput DNA sequence data compression," Briefings in Bioinformatics, 16(1):1-15 (2015).

Navarro, et al., "Compressed Full-Text Indexes", ACM Computing Surveys, ACM, New York, NY, vol. 39, No. 1, Apr. 12, 2007, 61 pages.

PCT/US2020/032384 International Search Report and Written Opinion, dated Jul. 30, 2020.

Yazdi, et al., "Portable and Error-Free DNA-Based Data Storage", bioRxiv preprint doi: https://doi.org/10.1101/079442 (2016). 4 pages.

Burks et al., "The GenBank Nucleic Acid Sequence Database," Cabios Review, vol. 1(4): 225-233 (1985).

Craig, et al., "Ordering of Cosmid Clones covering the Herpes Simplex Virus Type 1 (HSV-1) genome: a test case for fingerprinting by hybridisation", Nucleic Acids Research, vol. 18, pp. 2653-2660 (1990).

Erciyes, K., Distributed and Sequential Algorithms for Bioinformatics, Computational Biology, 2015, 23, Springer, Ed. A. Dress, 1-133. (Year: 2015).

Supplementary European Search Report for EP Application No. 17872574.3 dated Sep. 14, 2020.

Lee et al, DNA detection using commercial mobile phones, Biosensors and Bioelectronics, 2011, 26, 4349-4354 (Year: 2011).

PCT/US2019/045160 International Search Report and Written Opinion dated, Jan. 30, 2020.

PCT/US2020/055351 International Search Report and Written Opinion dated, Mar. 31, 2021.

PCT/US2021/031865 International Search Report and Written Opinion dated, Aug. 13, 2021 .

PCT/US2021/049289 International Search Report and Written Opinion dated, Nov. 18, 2021.

PCT/US2022/020949 International Search Report and Written Opinion dated, Jun. 23, 2022 .

Staden, R., "Nucleic Acids Research—Sequence Data Handling by Computer," vol. 4(11): 4037-4052 (1977).

Boneh, D., et al., "Breaking DES Using a Molecular Computer," in DIMACS Workshop on DNA Computing, 1995 (20 pgs).

Braich RS, et al., "Solution of a 20-variable 3-SAT problem on a DNA computer". Science. Apr. 1, 20029;296(5567):499-502. doi: 10.1126/science. 1069528. Epub Mar. 1, 20024. PMID: 11896237.

(56) References Cited

OTHER PUBLICATIONS

Lipton RJ., "DNA solution of hard computational problems", Science. Apr. 28, 1995;268(5210):542-5. doi: 10.1126/science. 7725098. PMID: 7725098.
PCT/US2022/050435 International Search Report and Written Opinion dated, May 11, 2023 (18 pgs).
PCT/US2023/15495 International Search Report and Written Opinion dated, May 23, 2023 (13 pgs).
Al'Khafaji, A., et al., "High-throughput RNA isoform sequencing using programmable cDNA concatenation", bioRxiv, https://doi.org/10.1101/2021.10.01.462818; Oct. 1, 2021, 18 pgs.
Al'Khafaji, A., et al., "High-throughput RNA isoform sequencing using programmed cDNA concatenation", Nature Biotechnology, Jun. 8, 2023, 16 pgs.
Cui, M., et al., "Nonlinear manipulation and analysis of large DNA datasets", Nucleic Acids Research, vol. 50, No. 15, Aug. 10, 2022, pp. 8974-8985.
El-Sagheer, A., et al., "Click Nucleic Acid Ligation: Applications in Biology and Nanotechnology", Accounts of Chemical Research, vol. 45, No. 8, pp. 1258-1267. Dec. 12, 2011.
Gardner, et al., "Acyclic and dideoxy terminator preferences denote divergent sugar recognition by archaeon and Taq DNA polymerases", Nucleic Acids Res. Jan. 15, 2002;30(2):605-13.
Lahr, et al., "Reducing the impact of PCR-mediated recombination in molecular evolution and environmental studies using a new-generation high-fidelity DNA polymerase", Biotechniques. Oct. 2009;47(4):857-66.
Lee, et al., "Terminator-free template-independent enzymatic DNA synthesis for digital information storage", Nat Commun. Jun. 3, 2019;10(1): 12 pages.
Nour-Eldin, H., et al., "Advancing uracil-excision based cloning towards an ideal technique for cloning PCR fragments", Nucleic Acids Research, 2006, vol. 34, No. 18, Sep. 26, 2006, 8 pgs.
Roquet, et al., "DNA-based data storage via combinatorial assembly", bioRxiv 2021.04.20.440194; doi: https://doi.org/10.1101/2021.04.20.440194, Apr. 20, 2021, (15 pgs).
Schlecht, U., et al., "ConcatSeq: A method for increasing throughput of single molecule sequencing by concatenating short DNA fragments", Scientific Reports, Jul. 12, 2017, 10 pgs.
Staden, R., "Computer Methods to Locate Signals in Nucleic Acid Sequences", Nucleic Acids Research, vol. 12, No., 1, Part 2, Jan. 11, 1984 (505-519).
Staden, R., "An Interactive Graphics Program for Comparing and Aligning Nucleic Acid and Amino Acid Sequences," Nucleic Acids Research, vol. 10, Issue 9, May 11, 1982 (2951-2061).
Verardo, D., et al., "Multiplex enzymatic synthesis of DNA with single-base resolution", Science Advances, Jul. 7, 2023 (13 pgs).
Yolov, et al., "Constructing DNA by polymerase recombination", Nucleic Acids Res. Jul. 11, 1990;18(13):3983-6.
U.S. Appl. No. 18/282,825, filed Mar. 18, 2023.
U.S. Appl. No. 15/850,112, filed Dec. 21, 2017.
U.S. Appl. No. 16/847,064, filed Apr. 13, 2020.
U.S. Appl. No. 17/007,946, filed Aug. 31, 2020.
U.S. Appl. No. 18/230,382, filed Aug. 4, 2023.
U.S. Appl. No. 18/230,383, filed Aug. 4, 2023.
U.S. Appl. No. 18/230,385, filed Aug. 4, 2023.
U.S. Appl. No. 16/461,774, filed May 16, 2019.
U.S. Appl. No. 18/230,273, filed Aug. 4, 2023.
U.S. Appl. No. 18/647,003, filed Apr. 26, 2024.
U.S. Appl. No. 17/012,909, filed Sep. 4, 2020.
U.S. Appl. No. 17/674,170, filed Feb. 17, 2022.
U.S. Appl. No. 18/230,296, filed Aug. 4, 2023.
U.S. Appl. No. 16/414,758, filed May 16, 2019.
U.S. Appl. No. 17/206,803, filed Mar. 19, 2021.
U.S. Appl. No. 17/206,886, filed Mar. 19, 2021.
U.S. Appl. No. 16/872,129, filed May 11, 2020.
U.S. Appl. No. 18/107,851, filed Feb. 9, 2023.
U.S. Appl. No. 18/646,997, filed Apr. 26, 2024.
U.S. Appl. No. 17/069,420, filed Oct. 13, 2020.
U.S. Appl. No. 17/989,925, filed Nov. 18, 2022.
U.S. Appl. No. 17/317,547, filed May 11, 2021.
U.S. Appl. No. 17/693,705, filed Mar. 14, 2022.
U.S. Appl. No. 18/024,909, filed Mar. 6, 2023.
U.S. Appl. No. 18/027,524, filed Mar. 21, 2023.
U.S. Appl. No. 18/282,825, filed Sep. 19, 2023.
U.S. Appl. No. 17/990,255, filed Nov. 18, 2022.
Casini, et al., "Bricks and blueprints: methods and standards for DNA assembly". Nature Reviews Molecular Cell Biology, 16(9), pp. 568-576 (Year 2015).
"Click chemistry—Wikipedia", Wikipedia, Apr. 11, 2017, pp. 1-11; XP093142494, Retrieved from the Internet: URL:https://web.archive.org/web/20171104103152/https://en.wikipedia.org/wiki/Click_chemistry#Potential_applications [retrieved on Mar. 18, 2024] (Resubmission).
Design & Analysis of Algorithms, Lecture #25: Burrows-Wheeler Transform, pp. 1-8 (Year: 2018) (Resubmission).
Kosuri, et al., "Large-scale de novo DNA Synthesis: technologies and applications", Nature Methods, 11(5), pp. 499-407 (Year 2014).
Langmead, Ben, Introduction to the Burrows-Wheeler Transform and FM Index, Department of Computer Science, JHU, pp. 1-12; Nov. 24, 2013 (Resubmission).
Li, H., et al., "Fast and accurate short read alignment with Burrows-Wheeler transform", Bioinformatics, vol. 25, Issue 14, pp. 1754-1760, Jul. 2009, https://doi.org/10.1093/bioinformatics/btp324 (Year: 2009) (Resubmission).
"Ligation (molecular biology) Wikipedia", Wikipedia, Oct. 10. 2016, pp. 1-5; XP093142492, Retrieved from the Internet: URL:https://web.archive.org/web/20161010083548/https://en.wikipedia.org/wiki/Ligation_(molecular_biology) [retrieved on Mar. 18, 2024] (Resubmission).
PCT/US2024/035685 International Search Report and Written Opinion dated, Oct. 22, 2024 (17 pgs).
Wang, et al., "Cost-Effective DNA Storage System with DNA Movable Type", Advanced Science, 15 pgs (2024).

* cited by examiner

SYSTEMS AND METHODS FOR STORING AND READING NUCLEIC ACID-BASED DATA WITH ERROR PROTECTION

REFERENCE TO RELATED APPLICATIONS

This application claims priority to and the benefit of U.S. Provisional Patent Application No. 62/714,557 filed on Aug. 3, 2018, and entitled "COMPOSITIONS AND METHODS FOR NUCLEIC ACID-BASED DATA STORAGE", and is related to International Application No.: PCT/US2019/045160, filed on Aug. 5, 2019, and entitled "SYSTEMS AND METHODS FOR STORING AND READING NUCLEIC ACID-BASED DATA WITH ERROR PROTECTION". The entire contents of the above-referenced applications are incorporated herein by reference.

BACKGROUND

Nucleic acid digital data storage is a stable approach for encoding and storing information for long periods of time, with data stored at higher densities than magnetic tape or hard drive storage systems. Current methods for nucleic acid digital data storage rely on encoding the digital information (e.g., binary code) into base-by-base nucleic acid sequences, such that the base-to-base relationship in the sequence directly translates into the digital information (e.g., binary code) using multi-step chemistry. Sequencing of digital data stored in base-by-base sequences that can be read into bit-streams or bytes of digitally encoded information can be error prone and costly to encode since the cost of de novo base-by-base nucleic acid synthesis can be expensive.

Reading times and costs may be prohibitive for data written with base-by-base synthesis. Information stored at a high density (in terms of bits-per-base) may need high accuracy and high-resolution sequencing to read back. Indeed, data stored at or near the theoretical maximum of 2 bits/base has similar stringency requirements for sequencing as does genomic information. This leaves little room for innovation over state-of-the-art sequencers intended for genomic applications. For reference, approximately 450B reads would need to be processed to recover a full TB of data, which can cost millions of dollars and thousands of hours to process. One method of sequencing is a nanopore sequencing. A key hurdle for nanopore sequencing has been achieving slow enough DNA translocation and narrow enough pores to sequence individual DNA bases.

SUMMARY

The systems, devices, and methods described herein provide nucleic acid digital data storage encoding and retrieving methods that are less costly and easier to commercially implement than existing methods. The systems, devices, and methods described herein provide scalable methods for writing data to and reading data from nucleic acid molecules. The present disclosure covers four primary areas of interest: (1) accurately and quickly reading information stored in nucleic acid molecules, (2) partitioning data to efficiently encode data in nucleic acid molecules, (3) error protection and correction when encoding data in nucleic acid molecules, and (4) data structures to provide efficient access to information stored in nucleic acid molecules.

While the reading methods described herein may be used to read any nucleic acid sequence, the reading methods of the present disclosure are particularly advantageous when reading information stored in nucleic acid sequences that were written into said sequences using an encoding method that writes data or information in identifier nucleic acid molecules (also referred to herein as simply "identifiers" or "identifier molecules"). The nucleic acid sequence of each identifier molecule corresponds to a particular symbol value (e.g., bit or series of bits), that symbol's position (e.g., rank or address), or both, in a string of symbols (e.g., a bit stream). For example, the presence or absence of an identifier molecule could signal a bit value of one or zero, respectively (or vice versa). The identifier nucleic acid molecules include combinatorial arrangements of component nucleic acid molecules (also referred to herein as simply "components" or "component molecules"). The nucleic acid sequences of the components are separated into unique sets (also referred to as layers). Identifier molecules are assembled by ligating together (or otherwise assembling) multiple component molecules, one component molecule selected from each layer. The set of possible identifier sequences corresponds to the various possible combinatorial combinations of the component sequences. For example, for C component sequences separated into M layers, with $c_i$ representing the number of component sequences in each $i^{th}$ layer, the number of possible identifier sequences that can be formed can be represented by $c_1 \times c_2 \times \ldots \times c_M$. As an example, an encoding scheme of 12 layers, each containing 10 component sequences can result in $10^{12}$ different unique identifier sequences. If each identifier sequence corresponds to a bit in a bit stream, this encoding scheme can represent 1 TB of data.

Sequencing or reading nucleic acid molecules is often error-prone due to difficulty distinguishing between nucleotides (for example, because of a poor signal-to-noise ratio). Because symbols encoded using the above-described methods are represented as identifier nucleic acid molecules that are formed from a set of component molecules that are known a priori, reading a sequence of a given molecule to determine the information encoded therein does not require an accurate reading of each and every single base in that sequence. Instead, the reading method disclosed herein can tolerate a relatively high error rate, and still correctly decode the digital information from the nucleic acid molecules. To do that, portions of sequences that have been read can be matched to the known set of component sequences by using an approximate string matching technique to determine which symbol in the string of symbols is most likely to be represented by the identifier molecule. In some implementations, the component sequences are designed so that each component sequence is separated from each other component sequence by at least a minimum number of base differences. Requiring the component sequences to be distinct from one another in this manner reduces the chance that one sequence of a component molecule being sequenced will be mistaken for another component sequence when matching sequences. The reading system of the present disclosure is therefore robust (e.g., less sensitive to base errors), and identifier molecules can be read at a faster rate and with fewer errors than in traditional sequencing.

One way to improve tolerance to errors when reading data stored in nucleic acid molecules is to include error protection symbols and error correction schemes when encoding the data. To accomplish this, the source data (e.g., the string of symbols) is split into blocks, a hash is calculated for each block, and the hashes are appended to the source data at the end of each block to obtain a modified string of symbols, which is written into DNA. When the portion of the modified string of symbols corresponding to one of those hashes is read out from the DNA, it is compared to a hash computed on the read out symbols of the corresponding block. A mismatch between the read out hash and the computed hash indicates a read error—e.g., the information extracted from the nucleic acid molecules does not match the source data. To further improve tolerance to errors when reading data stored in nucleic acid molecules, an error protecting code such as a Reed-Solomon code can be applied to source data or the above-modified string of symbols that represents hashed source data. The Reed-Solomon code increases error tolerance, for both erroneous elements and element erasures, when reading data.

Applying a uniform weight code to the data before writing it to nucleic acid molecules may also increase the efficiency of reading that data back from the nucleic acid molecules. Multiple identifier molecules may be located in a pool having solid, liquid, or powder form. For example, identifier molecules may be formed in separate compartments then the compartments may be consolidated to form the pool. A uniform weight code ensures that each pool has a certain number of identifier molecules. The data may be separated into words and then padded to form codewords, in a manner that ensures that each resulting codeword has the same number of symbols of a particular type (e.g., when symbols are bits, all codewords could have the same number of bits having value 1), resulting in the codewords having the same "weight." For example, in an NchooseK encoding scheme, each pool would contain exactly K identifier sequences (note that the pool or compartment includes populations of individual identifier molecules, where each population of identifier molecules has the same identifier sequence. As used herein, "a number of identifier sequences" or "a number of identifiers" in a pool or a compartment refers to a number of populations of individual identifier molecules, where each population corresponds to the same identifier sequence.). When sequencing that pool, if fewer than K identifier sequences are read, that would indicate an error occurred during the sequencing. On the other hand, once K identifier sequences have been read during sequencing, the sequencing process can stop, which can decrease the amount of sequencing time and improve efficiency.

One way to improve efficiency in reading information from DNA involves using a data structure to hold the location of data blocks of data string. For example, a large data string may be separated and stored into two or more containers. To determine which container contains information a user wants to access, the system may access a B-tree or triple store structure that holds the location (e.g., container number or placement). This allows a user to access the information he or she is looking for in an expedient manner—rather than reading the information in each of the containers containing the data string.

The systems and methods described herein thus provide several opportunities to decrease the cost and increase the throughput of writing information into nucleic acid molecules. First, a set of components can be reused and recombined to write new packets of digital information. The expensive requirement to use base-by-base synthesis for each new write job is thus replaced by a one-time base-by-base synthesis cost that may be amortized over several write jobs (e.g., 224 30-base oligos at 10 μmol scale to write 860 terabit packets). Second, the encoded information is decoupled from the sequences of DNA components, enabling the use of a large sequence design space that may be optimized for write, store, copy, query, and read operations. Third, the nucleic acid molecule encoding schemes described herein comprise enhanced error correction and provide optimized operation speed.

In some aspects, encoded information is stored in nucleic acid molecules with error protection. Digital information is received as a first string of symbols having length L1. Each symbol in the first string of symbols has a symbol value and a symbol position within the first string of symbols. The symbols may be bits, bytes, a bit string of any length, alphanumeric characters, a character string of any length, or any other suitable symbol. In some implementations, the string of symbols is converted into a bit stream. For example, the string of symbols may consist of six symbols "LETTER". The string of alphanumeric characters "LETTER" may be converted to binary, resulting in 48 bits ("01001100 01000101 01010100 01010100 01000101 01010010"). In this example, L would be equal to 48. In some implementations, the information in the string of symbols is received separately—i.e., symbols may be received individually or any combination. The symbols or groups of symbols may then be concatenated or otherwise combined to form a string of symbols. For example, ten blocks of 8 bits may be received individually and then concatenated together to form a string of symbols 80 bits long.

In some implementations, there are three stages of encoding the received information: (1) hashing, (2) adding error protection symbols, and (3) determining codewords to represent the symbols. While the first string of symbols may be encoded using all three of these stages, the stages may be performed separately or in any combination thereof. For example, the stages of hashing and adding error protection symbols may be bypassed, such that the information is only encoded as codewords. The stages may be performed in any order.

In some implementations, the hashing stage begins by separating the string of symbols is into blocks. In some implementations, each block is of the same length B, where B is equal to L (the length of the string of symbols) divided by the number of blocks. As an example, the string of symbols may be 1,000 bits. The 1,000 bits may be separated into any length of blocks, such as five blocks each consisting of 200 bits; 100 blocks each consisting of 10 bits; 10 blocks each consisting of 100 bits, or any such combination. In some implementations, the blocks are not of equal length. For example, for a string of 1,000 bits, $block_1$ may consist of 500 bits; $block_2$ of 100 bits; $block_3$ of 300 bits; and $block_4$ of 100 bits.

In some implementations, a hash of length H is computed for each block. In some implementations, the hash is computed using one of MD5, SHA-224, SHA-256, SHA-384, SHA-512, SHA-512/224, or SHA-512/256. Each computed hash is appended to the corresponding block to form a hashed block. This allows string of symbols and the hashes to be stored together in nucleic acids. If each block is of length B, after appending the hash, the hashed blocks are of length H plus B. For example, the string of symbols may consist 1,000 bits that are then separated into ten blocks of 100 bits each (B=100). The hash of each block may be 10 bits long (H=10). After appending, the hashed blocks then consist of 110 bits (the original 100 bits plus the 100 bit hash). In some implementations, the hashes are alternatively or additionally stored separately from the string of symbols. In some implementations H equals zero.

In some implementations, the hashed blocks are concatenated to form a second string of symbols of length L2. In the example above, where each hashed block of the ten hashed blocks comprises 1,100 bits, the string of symbols would be equal to 1,100 bits (the original 1,000 bits received plus 100 hash bits). In some implementations, the hashes are computed for each block but not appended; rather, the hashes are stored separately. For example, the hashes may be stored on a hard drive in order for the hashes to be accessed faster or more easily than the blocks in nucleic acids. The hashes could be stored in nucleic acid molecules, a magnetic storage device, a flash memory device, cloud storage, or any other suitable location.

In some implementations, the second string of symbols is separated into slices. In some implementations, each slice is of the same length S, where S is equal to L2 (the length of the second string of symbols formed from the hashed blocks) divided by the number of slices. As an example, the second string of symbols may consist of 1,100 bits. The 1,100 bits may be separated into any length of slices, such as ten blocks each consisting of 110 bits; one hundred slices each consisting of 11 bits; five slices of 220 bits, or any such combination. In some implementations, the slices are not of equal length. For example, for a string of 1,100 bits, $slice_1$ may consist of 500 bits; $slice_2$ of 100 bits; $slice_3$ of 300 bits; and $slice_4$ of 200 bits. In some implementations, the hashing stage described above is bypassed. Thus, the second string of symbols of length L1 would be the same as the string of symbols of length L1.

In some implementations, error protection symbols are computed for each slice. Any number of error protection symbols may be computed for each slice. The error protection symbols are appended to the slice for which they were computed, thereby forming error-protected slices. In some implementations, the same number P of error protection symbols are computed for each slice, such that the each error-protected slice is S plus P bits long. For example, if the second string consists of 1,100 bits that are separated into five blocks consisting of 220 bits each and P equals 40, 40 bits are appended to each slice resulting in error-protected slices consisting of 260 bits each. In some implementations, P equals zero.

In some implementations, the error protection symbols are determined using a Reed-Solomon code. Reed-Solomon codes are block-based error correcting codes. If the P error protection symbols are computed using a Reed-Solomon code, $$\frac{P}{2}$$

erroneous bits can be tolerated.

For example, if P is equal to 40 for a 260-bit string, 20 of the 260 bits may be incorrect without negatively affecting the processing of those 260 bits. If the P error protection symbols are computed using a Reed-Solomon code, P erroneous bits can be tolerated. For example, if P is equal to 40 for a 260-bit string, 40 of the 260 bits may be erased without negatively affecting the processing of those 260 bits.

In some implementations, the error-protected slices are concatenated to form a third string of symbols having length L3. In the example above, where each error-protected slice of the five error-protected slices comprises 260 bits, the third string of symbols would consist of 1,300 bits (the original 1,000 bits received plus 100 hash bits plus 200 error protection bits determined). The third string of symbols of length L3 is equal to the second string of symbols of length L2 (i.e., the error protection bits may not be added). In some implementations, both the hashing and error protection stages are bypassed. In this case, the third string of symbols of length L3 would be equal to the first string of symbols of length L1.

In some implementations, the third string is separated into a plurality of words, each word having length W. For example, W may be equal to eight and each word would be eight bits long. In some implementations, a codeword is determined for each word using at least one codebook. In some implementations, each codeword is an exact match of the respective word (i.e., nothing changes between the third and fourth strings of symbols). In some implementations, however, determining the codewords affects the length of each word.

Codewords may be optimized for chemical conditions during encoding or decoding. As described above, the presence of an identifier may indicate a '1' in a certain symbol position, while the absence of an identifier for that position would indicate a '0'. In some implementations, determining the codewords comprises applying a uniform weight code to the third string of symbols to ensure every word has the same number of '1's (i.e., identifiers to be constructed). Thus, a codeword must be chosen that encode eight bits. This effectively adds additional bits so that each codeword can have an equal "weight" (number of identifiers to be constructed). The codewords may be determined from a combinatorial space in an NchooseK scheme. In an Nchoosek scheme, for every N identifier k identifiers are constructed. For example, in an 11choose4 scheme, for every 11 identifiers, exactly four are constructed. An 11choose4 scheme provides enough bits to encode 8 bits in each codeword.

In some implementations, fourth string of symbols having length L4 is formed by concatenating the codewords. The fourth string of symbols will comprise $$\frac{L3 * N}{W}$$

symbols. For example, for a string of 1300 bits (e.g., the third string of symbols of length L3) if each word is 8 bits and an 11choose4 scheme is used, L4 would equal 1788.

In some implementations, each symbol in the fourth string is mapped to an individual identifier sequence. The mapping step produces a scheme for printing the digital information into nucleic acids with error protection. An individual identifier nucleic acid molecule of the plurality of identifier nucleic acid molecules corresponds to an individual symbol in the fourth string of symbols. An individual identifier comprises a corresponding plurality of components, wherein each component in the plurality of components comprises a distinct nucleic acid sequence. For example, the components may be selected from M layers as described above.

In some implementations, the individual identifier molecules are constructed by depositing and assembling corresponding components. For example, any of the printer/finisher systems described herein may be used to construct individual identifiers by depositing and assembling corresponding components in a compartment. In some implementations, dispensing, using a plurality of print heads, a plurality of solutions comprising a plurality of components onto a coordinate on a substrate. A reaction mix may be dispensed onto the coordinate on the substrate to physically link the plurality of components, provide a condition necessary to physically link the plurality of components, or both.

Based on the codeword stage, a set of printer instructions may be developed that are then sent to a printer-finisher system. The printer instructions may be configured to reduce the possibility of printing errors or increase printing efficiency. For example, the codeword stage may be designed to distribute the identifiers such that each compartment in the plurality of compartments contains the same number of identifier nucleic acid molecules, thus providing uniform abundance of identifiers across compartments. To provide additional error protection, in some implementations, depositing the components into the compartments is permuted such that identifier nucleic acid molecules that represent adjacent symbols in the string of symbols are not constructed in adjacent compartments. This reduces the chances that printing mistakes may cause undetectable errors due to printing onto the wrong coordinate or bleeding between compartments.

In some implementations, the individual identifiers are collected in a pool. For example, a pool can hold hundreds of identifiers corresponding to hundreds of symbols encoded in the steps described above. In some implementations, a presence or absence of an identifier in the pool is representative of the symbol value of the corresponding respective symbol position within the string of symbols.

In some implementations, the hash, error protection, or codeword determination is performed on an individual block in the plurality of blocks. The method of claim C14, wherein the hash, error protection, or codeword determination is performed on the individual block and an additional block in parallel. In some implementations, additional error protection symbols or hash symbols are stored in a magnetic storage device, an optical storage device, a flash memory device, or cloud storage.

In some aspects, digital information is stored into nucleic acids with a partition scheme. The partition scheme may be designed with the intention of encoding the digital information in nucleic acids under restraints, such as writing hardware configurations (e.g., the number of inks available in a printer). Digital information is received as a first string of symbols having length L. Each symbol in the first string of symbols has a symbol value and a symbol position within the first string of symbols. The symbols may be bits, bytes, a bit string of any length, alphanumeric characters, a character string of any length, or any other suitable symbol. In some implementations, the string of symbols is converted into a bit stream. For example, the string of symbols may consist of six symbols "LETTER". The string of alphanumeric characters "LETTER" may be converted to binary, resulting in 48 bits ("01001100 01000101 01010100 01010100 01000101 01010010"). In this example, L would be equal to 48. In some implementations, the information in the string of symbols is received separately—i.e., symbols may be received individually or any combination. The symbols or groups of symbols may then be concatenated or otherwise combined to form a string of symbols. For example, ten blocks of 8 bits may be received individually and then concatenated together to form a string of symbols 80 bits long.

In some implementations, in order to encode within the given restraints, a partition scheme is determined. The partition scheme defines a set of rules to encode the string of symbols using a set of C distinct component sequences. Specifically, the partition scheme defines a number of M layers within which to arrange the C distinct component sequences, and defines component sequences numbers in each layer, such that there are $c_i$ component sequences in the $i^{th}$ layer. In some implementations, the number of component sequences in each layer is non-uniform (i.e., $c_1$ is not equal to $c_2$, etc.). The number of layers and number of component sequences may be configured to minimize the number of layers necessary to encode the string of symbols, thereby simplifying the chemistry of forming identifier molecules while maintaining enough identifier sequence possibilities to encode the entirety of the digital information. To ensure enough identifier sequence possibilities to encode the string of symbols, a product of the component sequence numbers $c_i$ ($\Pi_{i=1}^{L} c_i$) must be greater than or equal to the length L of the string of symbols and a sum of the component sequence numbers $c_i$ ($\Sigma_{i=1}^{L} c_i$) must be less than or equal to the number C of distinct component sequences. In some implementations, the identifiers are representative of a subset of a combinatorial space of possible identifier sequences, each including one component from each of the M layers. As a simple example, if L equals 1,000 (e.g., 1,000 bits in a bit stream received) and C equals 70 (e.g., 70 printer inks available to be printed), three layers (M=3) with 10 component sequences per layer could be used to encode the data. However, to best capitalize on the available 70 component sequences, it may be more efficient to encode the data using two layers (M=2), with 50 component sequences in the first layer and 20 component sequences in the second layer.

In some implementations, if the string of symbols has been translated to a string of symbols of length B, the product of the component sequence numbers $c_1$ must be greater than or equal to the length B of the string of bits. For example, if the string of symbols is "LETTER", L equals six but the equivalent string of bits consists of 48 bits (B equals 48). Thus, the number of M layers and C component sequences necessary to encode the string of bits having length B would be different than the number of layers needed to encode the a string of symbols having length L.

In some implementations, a first identifier is formed, for example with a printer/finisher system, by (i) selecting one component from each of the M layers, (ii) depositing the M selected components into a compartment, and (iii) physically assembling the selected components (ii). In some implementations, the selected components are assembled by ligation. The first identifier includes first and second end molecules and a third molecule positioned between the first and second end molecules. The components from the first and second of the M layers correspond to the first and second end molecules of the identifier nucleic acid molecule, and the component in the third layer of the M layers corresponds to the third molecule of the identifier, thereby defining a physical order of the M layers in the first identifier nucleic acid. In some layers, the M layers are associated with different priority levels. For example, the first layer may have a highest priority and the second layer may have a second highest priority. The remaining M−2 layers may have corresponding components between the first and second end molecules.

In some implementations, additional identifiers are formed. The additional identifiers correspond to respective symbol positions in the string of symbols that represents the digital information to be encoded. Each symbol position within the string of symbols may have a corresponding different identifier. In some implementations, once the necessary amount of identifiers are formed, the identifiers are collected in a pool.

In some aspects, information is read from nucleic acid sequences. In some implementations, a pool of identifiers is obtained. The identifiers in the pool store digital information from a string of symbols of length L. The pool of identifiers corresponds to a subset of identifier sequences in an identifier library that is capable of encoding any string of symbols having length L. Each individual identifier in the pool corresponds to a symbol value and a symbol position in the string of symbols. Each individual identifier comprises a plurality of components and is thus an instance of a specific sequence. In some implementations, the pool comprises gene-, peptide-, or RNA-encoding DNA.

The identifier may be processed in various ways. In some implementations, the identifier is ligated to a second identifier. In some implementations, one strand of the identifier is degraded. For example, a strand-specific exonuclease may be used to selectively degrade one strand of the identifier.

In some implementations, at least one of the obtained identifiers is read to obtain a read sequence corresponding to a portion of the at least one identifier. The read sequence may be obtained via any sequencing technique, such as chemical sequencing, chain termination sequencing, shotgun sequencing, bridge PCR sequencing, single-molecule real-time sequencing, ion semiconductor sequencing, pyrosequencing, sequencing by synthesis, combinatorial probe anchor synthesis sequencing, sequencing by ligation, nanopore sequencing, nanochannel sequencing, massively parallel signature sequencing, Polony sequencing, DNA nanoball sequencing, single molecule fluorescent sequencing, tunneling current sequencing, sequencing by hybridization, mass spectrometry sequencing, microfluidic sequencing, transmission electron microscopy sequencing, RNA polymerase sequencing, or in vitro virus sequencing. Sequencing a pool of nucleic acids, identifiers in this case, yields a read sequence for the whole pool; however, it is not known how each identifier of the pool maps to the read sequence. Sequencing methods are prone to single-base errors, further hindering the matching of identifiers to the read sequence.

In some implementations, the read sequence may be obtained via nanopore sequencing. An electric field is applied to an electrolytic solution and at least one nanopore channel. In some implementations, the at least one nanopore channel is formed within a solid-state membrane. In some implementations, the nanopore channels are formed from alpha-hemolysin (αHL) or *Mycobacterium smegmatis* porin A (MspA). During nanopore sequencing, the identifier is translocated through the at least one nanopore channel, while impedance across the channel is measured. Each component in the identifier has a corresponding unique impedance signature along the length of the component sequence, thus allowing the components in the read sequence to be determined by comparing measured impedance values to the unique impedance signature.

In some implementations, if the identifier is read using nanopore sequencing, the applied electric field generates a differential potential greater than or equal to 100 mV. This high differential potential enables the identifier to be passed through the nanopore channels at a relatively high rate. For example, translocation of the identifier may occur at a rate great than 1,000 bases per second. In particular, the translocation rate may be 1,000,000 bases per second.

In some implementations, when reading the identifier includes nanopore sequencing, an agent is bound to the identifier before translocating. For example, the agent may be a chemical moiety, a protein, an enzyme, a base analogue, a conjugated nucleic acid, a nucleic acid with a hairpin, or a methyl group. In some implementations, if the agent is a chemical moiety, an enzyme, such as methyltransferase, binds the chemical moiety to the at least one identifier nucleic acid molecule. In some implementations, if the agent is a base analogue and the agent is bound using an enzyme, such as a polymerase, the enzyme binds the base analogue to the at least one identifier nucleic acid molecule during replication.

In some implementations, the agent is associated with an agent signature that may be used to help determine sequences in the identifier during reading. Binding the agent to the at least one identifier nucleic acid molecule occurs at a known location on a component of the identifier, such that the agent signature at the known location results in a known shift in impedance value during translocation. The presence of the agent may thus create an exaggerated "profile" for the identifier, thereby increasing the signal-to-noise ratio during reading. This may allow the translocation speed to be increased while maintaining accuracy during reading. In particular, the presence of the agent on the at least one identifier may allow for a first maximum translocation rate that achieves a desired level of accuracy that is faster than a second maximum translocation rate that achieves the desired level of accuracy in the absence of the agent on the at least one nucleic acid molecule. Another way to increase signal-to-noise ration during reading includes replicating the identifier such that it comprises modified bases or base analogues. This may be done separately or in addition to binding an agent to the identifier.

In some implementations, the methods described herein includes matching the read sequence to a known set of identifier sequences (i.e., the identifier library). The read sequence is used to identify a set of candidate identifier sequences from the identifier library that have a component sequence that approximates or exactly matches the read sequence. As an example, the read sequence (which may or may not correctly match the identifier) may be CAGCTG. The set of candidate identifier sequences may comprise an exact match (CAGCTG) as well as other potential matches that are similar to the read sequence, such as identifier sequences that differ by a certain number of bases (e.g., 1, 2, 3, 10, 20, 100, etc.). For example, the set of candidate identifier sequences may also include CAGATG, AAGCTA, and CACGTG. For ease of reference, the "incorrect" nucleotides (i.e., that do not match the read sequence in the example) are underlined.

In some implementations, the identifiers are encoded with error tolerance symbols such that identifier is associated with a reading error tolerance. This reading error tolerance may be used to limit the rate at which the identifier is read. Another way to increase read speeds includes reading a subset of the identifier. In some implementations, the identifier includes M components corresponding to M layers. In some implementations, reading the identifier includes reading only N of the M components where N is less than M. For example, only the first two layers out of five layers may be read. While this lowers the resolution of the read, it can increase how many identifiers are read in a given amount of time. This can be helpful when a subset of the data encoded in the pool needs to be accessed. For example, if the first layer always indicates a certain meaningful value, certain useful identifiers can be identified by only accessing the first layer.

In some implementations, each candidate identifier sequence is assigned a score associated with how similar the component sequence of each candidate identifier sequence is to the read sequence. The better the candidate identifier sequence matches the read sequence, the lower (or higher) the score may be. The scores may be computed in a variety of ways including a least distance algorithm, a percent match, or any other suitable algorithm. As an example, for the read sequence CAGCTG, a candidate sequence CAGCTG may have a score of zero, while a candidate sequence CAG<u>A</u>TG may have a score of one because the fourth base of the candidate sequence does not match the read sequence. The score may depend on the number of bases that are incorrect and/or the placement of incorrect bases. For example, a candidate with two incorrect nucleotides adjacent one another (CA<u>CG</u>TG) may have a lower score than a candidate with two incorrect nucleotides that are not adjacent (<u>A</u>AGCT<u>A</u>).

In some implementations, the set of scores guides the selection of one of the candidate identifier sequences as a potential match to the identifier, thereby mitigating the effect of single-base sequencing errors. For example, the candidate sequence with the lowest score may be selected because it is the closest potential match to the read sequence. In some implementations, the selected candidate identifier sequence is then mapped to a symbol position and symbol value using the identifier library. In some implementations, for example if reading the identifiers includes nanopore sequencing and an agent has been bound to the identifier, determining the sequence in the identifier includes comparing measured impedance values during translocation to the agent signature.

In some implementations, the steps above are iterated until the desired digital information is completely accessed from the pool (or multiple pools) of identifiers. In some implementations, a decoded string of symbols is determined and tested for accuracy. Specifically, a hash of a portion of the decoded string of symbols may be calculated then compared to a hash associated with a corresponding portion of the string of symbols that was received. The hash may be stored as an identifier or component in the pool (and subsequently read), or may be stored remotely. When the portion of the modified string of symbols corresponding to one of these hashes (i.e., an original hash stored separately from the DNA or a hash read out from the identifier), it is compared to a hash computed on the read out symbols of the corresponding block. The hash may be calculated using MD5, SHA-224, SHA-256, SHA-384, SHA-512, SHA-512/224, or SHA-512/256 or any other suitable algorithm. A mismatch between the read out or original hash and the computed hash indicates there was a read error in reading the data—e.g., the information extracted from the nucleic acid molecules does not match the source data. Based on whether the calculated hash matches the read out original hash, the portion of the decoded string of symbols may be verified as a match to the portion of the string of symbols received. If the hashes do not match (or if it is determined the decoded string does not match the obtained string through any other means), a different candidate identifier sequence (e.g., of the set of candidate identifier sequences) may be selected. As identifiers are decoded and verified, a computer system may track this information and use a machine learning technique to increase a likelihood that the decoded string of symbols matches the string of symbols. The error-tolerant method thus sets a basis for making unconventional improvements to sequencing techniques, for example running nanopore sequencing at a substantially large applied voltage, as described above.

In terms of grams, the total amount of material in a given pool may be in microgram quantities. To accurately read the molecules in the pool, it may be amplified to ensure enough material exists for redundancy, archiving, and accessing. For example, a PCR amplification scheme for accessing a sub-library of identifiers from an archived DNA library may be used. A sub-library may be any group of identifiers that one wishes to access, such as a data block, several data blocks, a single identifier, several identifiers, etc. The amplifications process may include two primary steps. In the first amplification step with (A) primers, the desired data block is selected and enriched; in the second with (B) primers, amplicons are prepared for sequencing. The first step (A) is intended to select specific targets, using the unique primers and only a few PCR cycles, and the second step (B) is intended to then amplify the target sequences of the specific targets, not including the primers, to generate a large amount of molecules for sequencing. With this nested approach for amplification, the number and identity of identifiers accessed is adjusted and the sequencing burden is reduced. In some implementations, amplification steps are limited to 7 cycles or less to reduce amplification bias in the libraries and to maintain uniformity of sequence abundance. Primer combinations may be validated with identifiers to demonstrate efficiency and uniformity of the amplification process. Initial optimization will be measured by qPCR. The level of product purity may be determined by using PCR cleanup requirements (e.g., ExoSAP-IT, ThermoFisher) by measuring both qPCR amplification efficiency and sequencing the presence of partial sequencing products.

It may also be advantageous to selectively enrich the molecules with tags to increase the speed of accuracy of reading. Similar to how the nucleic acid molecules can be tagged for better signal resolution in nanopore sequencing, each component or identifier may be tagged with a specific probe/adapter that allows for other selection techniques like protein- or magnet-based selection protocols. Examples of methods of enrichment, include i) streptavidin coated magnetic beads, ii) Ampure XP size selection, iii) specific primer capture by Watson-Crick bait sequences.

In some implementations, nucleic acid molecules may be read using nanopore sequencing. Certain methods for nanopore sequencing involve ligation of adapter protein complexes to nucleic acid molecules. Some adapter proteins act as a hydrophobic tether allowing for the nucleic acid molecules to target the lipid bilayer reducing the time nanopores are unoccupied. Another protein, or motor, such as a-hemolysin separates the double-stranded nucleic acid molecules so that a single-strand enters the nanopore. This motor then helps ratchets the single-stranded nucleic acid molecules through the nanopore. This protocol is entirely compatible with the identifier libraries and amplicon enrichment plan described herein.

To increase sequencing efficiency, it may be advantageous to optimize nanopore sequencing by physically concatenating identifiers in amplified sub-libraries. Nanopore sequencing may require target nucleic acid molecules to find nanopores, which contributes to reading speed. In order to increase read time identifiers may be physically concatenated into longer molecules by ligation. By increasing the length of sequenced molecules from less than 500 bp to 5,000 bp (or greater), pore occupancy may be maximized.

The speed that nucleic acid molecules translocate through the nanopore may be increased. Current nanopore sequencing instruments translocate nucleic acid molecules through nanopores at a rate of 500 base pairs per second. Establishing a differential membrane potential (e.g., greater than 100 mV) across a nanopore membrane translocates nucleic acid molecules at a higher rate (e.g., greater than 1,000 or ~1,000,000 bases per second). For most sequencing applications, a rate on the order of hundreds of thousands is too rapid and protein "motors" can be used to ratchet nucleic acid molecules through the pore in order for a single distinct base to be detected. Thus, running nanopore sequencing without a "motor" may need generating single-stranded nucleic acid molecule input and amplification of nucleic acid molecule signal. Several methods exist for asymmetric PCR that achieve greater than 50% single-stranded nucleic acid molecules from a reaction. By adjusting primer-melting temperature, amplification primers can be designed to drive the reaction into linear amplification of one strand. Alternatively, strand-specific exonucleases, such as Lambda exonuclease, can be used to bind specifically to 5' phosphorylated nucleic acid molecule strands and selectively degrade one strand of the duplex. The protocol may provide greater than 90% production of single-strand molecules.

Regarding signal amplification, nucleic acid molecules can be modified with agents to enhance the signal to noise ratio, essentially creating a "super signature". For example, agents can be small molecules, chemical groups, base analogues, enzymes, proteins, protein complexes, peptides, or amino acids. One method for nanopore signal enhancement, mTAG (methyltransferase-directed transfer of activated groups), uses a methyltransferase to add a chemical group, like biotinylated S-adenosyl-L-methionine cofactor analogue, to the N6 atom of the adenine base in a sequence motif. If the agent is a base analogue, it can be added to the identifier molecule through PCR in which the base analogue is included in reaction mix and is incorporated into a complementary strand bound to a single strand of the identifier molecule during replication. The new hybrid of identifier molecule with base analogue can then be sequenced, and the base analogue can improve signal to noise ratio in a sequencing readout.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
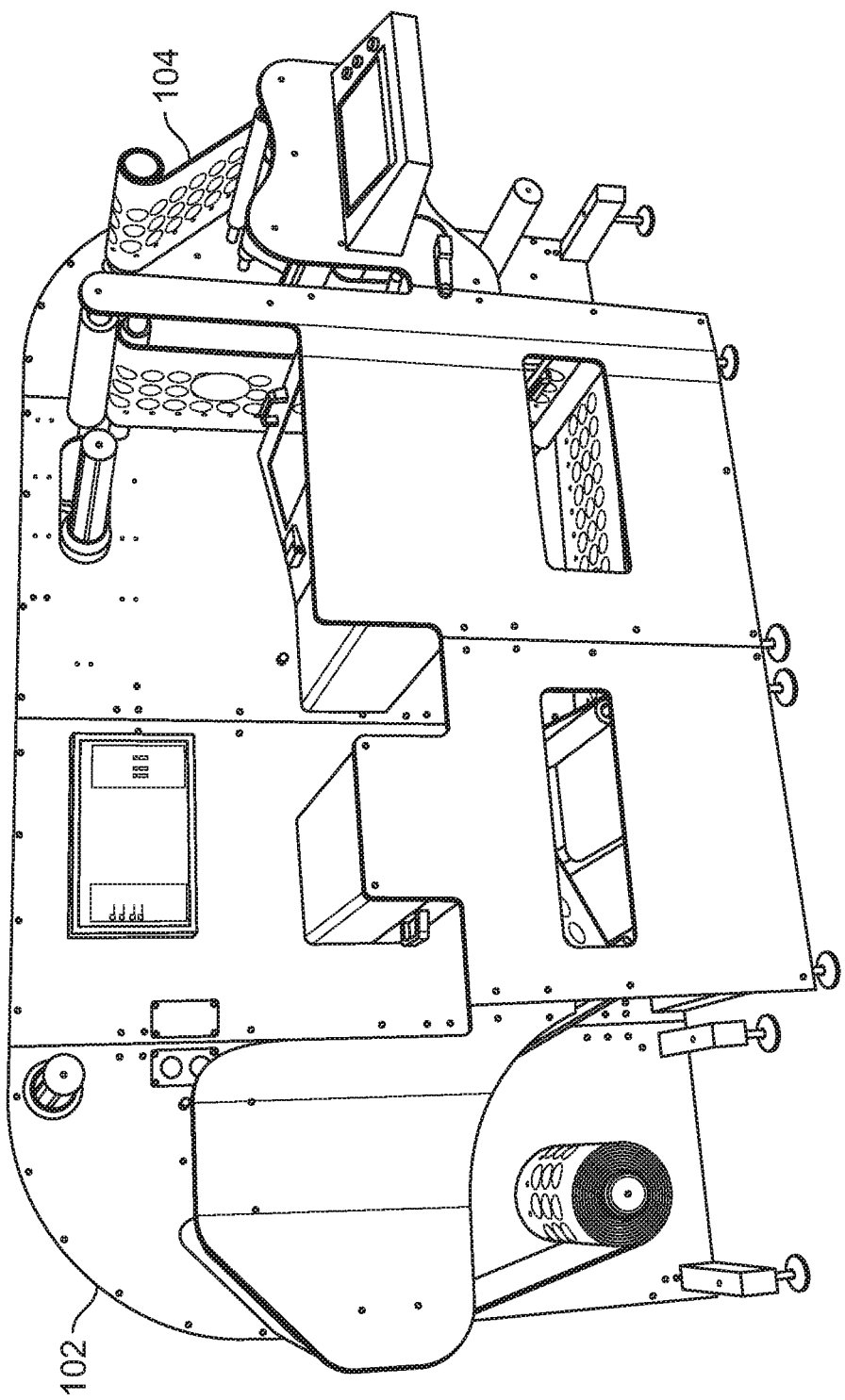
FIG. 1 shows a base module of a printer-finisher system, according to an illustrative implementation.

To provide an overall understanding of the systems, method, and devices described herein, certain illustrative embodiments will be described. Although the embodiments and features described herein are specifically described for use in connection with nucleic acid-based data storage, it will be understood that all the components and other features outlined below may be combined with one another in any suitable manner and may be adapted and applied to other types of data storage and nucleic acid technology.

There is a need for nucleic acid digital data storage encoding and retrieving methods that are less costly and easier to commercially implement than existing methods. The systems, devices, and methods described herein provide scalable methods for writing data to and reading data from nucleic acid molecules. The present disclosure covers four primary areas of interest: (1) accurately and quickly reading information stored in nucleic acid molecules, (2) partitioning data to efficiently encode data in nucleic acid molecules, (3) error protection and correction when encoding data in nucleic acid molecules, and (4) data structures to provide efficient access to information stored in nucleic acid molecules.

While the reading methods described herein may be used to read any nucleic acid sequence, the reading methods of the present disclosure are particularly advantageous when reading information stored in nucleic acid sequences that were written into said sequences using an encoding method that writes data or information in identifier nucleic acid molecules (also referred to herein as simply "identifiers" or "identifier molecules"). The nucleic acid sequence of each identifier molecule corresponds to a particular symbol value (e.g., bit or series of bits), that symbol's position (e.g., rank or address), or both, in a string of symbols (e.g., a bit stream). For example, the presence or absence of an identifier molecule could signal a bit value of 1 or 0, respectively (or vice versa). The identifier nucleic acid molecules include combinatorial arrangements of component nucleic acid molecules (also referred to herein as simply "components" or "component molecules"). In some implementations, the nucleic acid sequences of the components are separated into unique sets, also referred to as layers. Identifier molecules are assembled by ligating together (or otherwise assembling) multiple component molecules, one component molecule selected from each layer. The set of possible identifier sequences corresponds to the various possible combinatorial combinations of the component sequences. For example, for C component sequences separated into M layers, with $c_i$ representing the number of component sequences in each $i^{th}$ layer, the number of possible identifier sequences that can be formed can be represented by $c_1 \times c_2 \times \ldots \times c_M$. As an example, an encoding scheme of 12 layers, each containing 10 component sequences can result in $10^{12}$ different unique identifier sequences. If each identifier sequence corresponds to a bit in a bit stream, this encoding scheme can represent 1 Tb of data. Examples of various methods of writing digital information into nucleic acid molecules are in U.S. application Ser. No. 15/850,112 entitled "NUCLEIC ACID-BASED DATA STORAGE", filed Dec. 21, 2017 and published as U.S. Patent Publication No.: 2018/0137418; U.S. application Ser. No. 16/461,774 entitled "SYSTEMS FOR NUCLEIC ACID-BASED DATA STORAGE", filed May 16, 2019; and U.S. application Ser. No. 16/414,758 entitled "COMPOSITIONS AND METHODS FOR NUCLEIC ACID-BASED DATA STORAGE", filed May 16, 2019, each of which is hereby incorporated by reference.

Sequencing or reading nucleic acid molecules is often error-prone due to difficulty distinguishing between nucleotides (for example, because of a poor signal-to-noise ratio). Because symbols encoded using the above-described methods are represented as identifier nucleic acid molecules that are formed from a set of component molecules that are known a priori, reading a sequence of a given molecule to determine the information encoded therein does not require an accurate reading of each and every single base in that sequence. Instead, the reading method disclosed herein can tolerate a relatively high error rate, and still correctly decode the digital information from the nucleic acid molecules. To do that, portions of sequences that have been read can be matched to the known set of component sequences by using an approximate string matching technique to determine which symbol in the string of symbols is most likely to be represented by the observed (or read) identifier molecule. In some implementations, the component sequences are designed so that each component sequence is separated from each other component sequence by at least a minimum number of base differences (for example, a minimum Hamming distance or Levenshtein distance). Requiring the component sequences to be distinct from one another in this manner reduces the chance that one sequence of a component molecule being sequenced will be mistaken for another component sequence when matching sequences. The reading system of the present disclosure is therefore robust (e.g., less sensitive to base errors), and identifier molecules can be read at a faster rate and with fewer errors than in traditional sequencing, as is explained in further detail below, with reference to FIG. 12 and FIG. 13.

One way to improve tolerance to errors when reading data stored in nucleic acid molecules is to include error protection symbols and error correction schemes when encoding the data. To accomplish this, the source data (e.g., the string of symbols) is split into blocks, a hash is calculated for each block, and the hashes are appended to the source data at the end of each block to obtain a modified string of symbols, which is written into DNA. When the portion of the modified string of symbols corresponding to one of those hashes is read out from the DNA, it is compared to a hash computed on the read out symbols of the corresponding block. A mismatch between the read out hash and the computed hash indicates a read error—e.g., the information extracted from the nucleic acid molecules does not match the source data. To further improve tolerance to errors when reading data stored in nucleic acid molecules, an error protecting code such as a Reed-Solomon code can be applied to source data or the above-modified string of symbols that represents hashed source data. The Reed-Solomon code increases error tolerance, for both erroneous elements and element erasures, when reading data, as described in further detail below with reference to FIGS. 8-9.

Applying a uniform weight code to the data before writing it to nucleic acid molecules may also increase the efficiency of reading that data back from the nucleic acid molecules. Multiple identifier molecules may be located in a pool having solid, liquid, or powder form. For example, identifier molecules may be formed in separate compartments then the compartments may be consolidated to form the pool. A uniform weight code ensures that each compartment has a certain number of identifier molecules. The data may be separated into words and then translated to form codewords, in a manner that ensures that each resulting codeword has the same number of symbols of a particular type (e.g., when symbols are bits, all codewords could have the same number of bits having value 1), resulting in the codewords having the same "weight." For example, in an NchooseK encoding scheme, each codeword may be represented by the identifiers formed in one compartment, and each compartment would contain exactly K identifier sequences of N possible sequences (note that the pool or compartment includes copies of individual identifier molecules, where each copy of identifier molecules has the same identifier sequence. As used herein, "a number of identifier sequences" or "a number of identifiers" in a pool or a compartment refers to a number of copies of individual identifier molecules, where each copy corresponds to the same identifier sequence.). When sequencing that pool or compartment, if fewer than K identifier sequences are read (or observed) for the N possible sequences that represent a codeword, that would indicate that there is insufficient data to interpret the value of the codeword. We may refer to such an event as a codeword erasure. On the other hand, once K identifier sequences have been read (for N possible sequences that represent a codeword) during sequencing, the sequencing process can stop, which can decrease the amount of sequencing time and improve efficiency needed to interpret the codeword. In some examples, if more than K identifier sequences are read for N possible sequences that represent a codeword, then the codeword may be interpreted from the K identifier sequences with the highest copy numbers. In some examples, all combinations of K identifier sequences from the observed >K sequences may be considered to determine a more limited set of possible codeword values. The correct value may be determined in further downstream processing, for example, with hashing.

One way to improve efficiency in reading information from DNA involves using a data structure to hold the location of data blocks of data string. For example, a large data string may be separated and stored into two or more containers. To determine which container contains information a user wants to access, the system may access a B-tree or trie structure that holds the location (e.g., container number or placement). This allows a user to access the information he or she is looking for in an expedient manner—rather than reading the information in each of the containers containing the data string. Further, the information a user wants to access may only comprise a plurality of identifiers that is smaller than the total number of identifiers contained in a container. In such instances, it would be more efficient and costly to access and read only a small subset of possible identifiers comprising the target plurality rather than the entire space of possible identifiers that exist in the container. So, the location information contained in the B-tree or trie structure may be further configured to contain information about the target plurality of identifiers in addition to the container.

The systems and methods described herein thus provide several opportunities to decrease the cost and increase the throughput of writing information into nucleic acid molecules. First, a set of components can be reused and recombined to write new packets of digital information. The expensive requirement to use base-by-base synthesis for each new write job is thus replaced by a one-time base-by-base synthesis cost that may be amortized over several write jobs (e.g., 224 30-base oligos at 10-μmol scale to write 860 terabit packets). Second, the encoded information is decoupled from the sequences of DNA components, enabling the use of a large sequence design space that may be optimized for write, store, copy, query, and read operations. Third, the nucleic acid molecule encoding schemes described herein comprise enhanced error correction and provide optimized operation speed.

Figure 16:
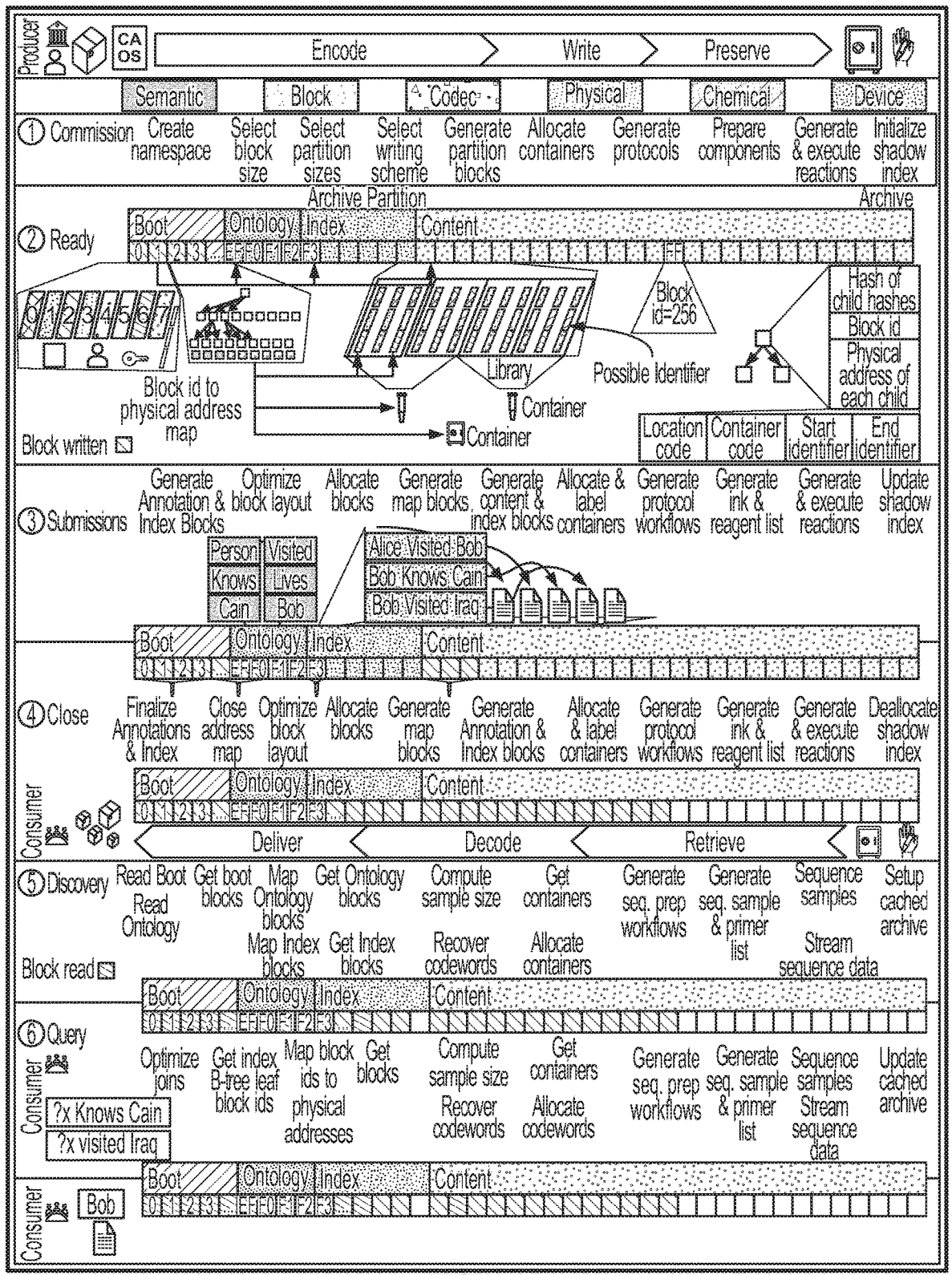
FIG. 16 shows a system diagram of archival operations, according to an illustrative implementation.
Figure 17:
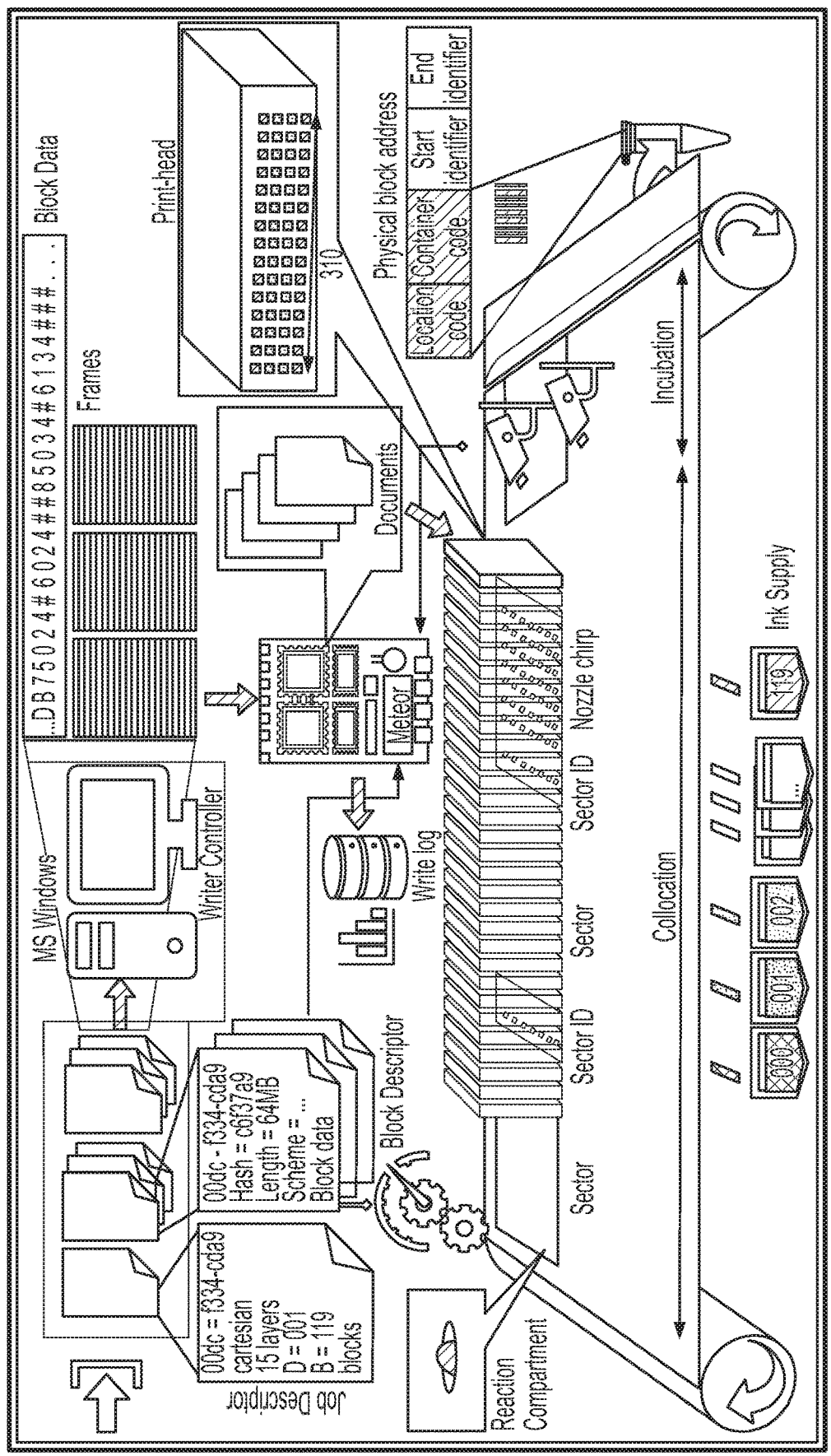
FIG. 17 shows a system diagram of writing data, according to an illustrative implementation.

The following description starts with an overview of encoding data in nucleic acid molecules, followed by a description of writing and archival systems configured to print and store encoded nucleic acid molecules as described in relation to FIGS. 1-5. The present disclosure describes various encoding methods in relation to FIGS. 6-11, including schemes designed for error protection, efficient encoding, and "weight minimization". The description then describes decoding systems and methods in FIGS. 12-15. The description introduces data structures that can be used in the retrieval of specific information from nucleic acid molecules in FIG. 18. FIG. 16 shows an overview of archival operations and FIG. 17 shows a system diagram of writing data to nucleic acid molecules.

Writing information to nucleic acid molecules using the methods described herein involve encoding a string of symbols as identifier sequences, where the position and value of each symbol is represented by an identifier sequence. In some implementations, each identifier molecule is comprised of ligated premade DNA component molecules that are ordered based on defined layers. Within each layer, several unique DNA component sequences can be selected to make an identifier sequence. The one-to-one mapping of a symbol to its corresponding identifier sequence is established by an identifier order, which is an efficiently computed function of its components. As a specific example, the set of available identifier sequences may include 15 layers, 14 layers of which each contain six unique DNA component sequences. The 15th layer may be a multiplex layer comprising 28 DNA component sequences (rather than six) which will also be incorporated. Thus, each identifier may contain 15 components (one component in each layer) in the full-length identifier nucleic acid molecule. During the writing process, the component molecules are assembled together in reaction compartments to form identifier molecules. In some implementations, multiple components from only the "multiplex layer" will be combined into the same reaction compartment.

As an example, to write one terabyte in 86400 seconds (24 hours), approximately 8E+11 identifier molecules may need to be assembled (assuming 10 bits of information encoded per identifier), or approximately 5.7E+10 droplet reaction compartments. Each reaction may assemble fourteen identifiers from a possible set of 28 identifiers. Fourteen components (one from each of the 14 layers each with six possible components) specify and assemble the "base" of the identifiers. A remaining fourteen components out of 28 possible components from the multiplex layer specify which fourteen identifiers (out of 28 possibilities) will be assembled. Thus, each reaction compartment may need 28 DNA components, plus ligase or other reaction mix.

The methods described herein may be implemented using a writing system, as described below. The writing system may be a printer-finisher system such as that described in U.S. application Ser. No. 16/414,752 filed May 16, 2019, entitled Printer-Finisher System for Data Storage in DNA, which is hereby incorporated by reference. The writer system may dispense DNA components at discrete locations (e.g., reaction compartments) on a substrate, dispense ligation master mix, provide optimal conditions for the ligation reaction, and pool all of the DNA identifiers that comprise a library. The writing system may comprise four modular components a base instrument, a print engine, an incubator, and a pooling sub-system, as described below in relation to FIGS. 2-5.

The writing systems described herein may execute high-throughput, parallelized printing of ligation reactions for constructing identifiers. Reactions may be carried out in picoliter (pL)-scale droplets printed onto flexible sheets (also referred to as webbing or substrates) moving over rollers. The writing systems may incorporate technologies such as digital inkjet printing and web handling, using suitable off-the-shelf print heads, drivers, and machine infrastructure. The systems and methods described herein include optimization of factors such as web speed, print head dispense speed, droplet size, and ligation chemistry to achieve storage capacity and write throughput. To this end, and to ensure data tolerance to potential chemistry and hardware errors, the systems and methods described herein include configurations to encode the data and develop printing instructions, including specifications for how to partition DNA component sequences into layers and how many identifier molecules to construct in each printed reaction. For example, such configurations may include computer systems that communicate with the writing system and track its performance.

FIG. 1 shows a base module 102 of a writing system configured to execute methods described herein. Base module 102 contains the unwind/rewind components that move webbing 104 through the writing system, such that components may deposited thereon. Webbing 104 (also referred to as a substrate) is a material on to which droplet will be dispensed to form droplet reaction compartments. For example, the webbing may be a low binding plastic like polyethylene terephthalate (PET) or polypropylene. Base module 102 is a reel-to-reel machine. Base module 102 may, for example, be the Werosys Compact system that was developed for the research and label manufacturing industries.

The writing system also includes a print engine. The two main components of the print engine are the ink management system and print heads for droplet dispensing. The ink management system includes a vacuum pump, valving/tubing, and on-board software/electronics for local control of the vacuum pressure in the headspace above the liquid. For example, the ink management system may be a Megnajet system. The ink reservoir can be located up to 1 m away and may use a Meteor 4-color controller card.

Figure 2A:
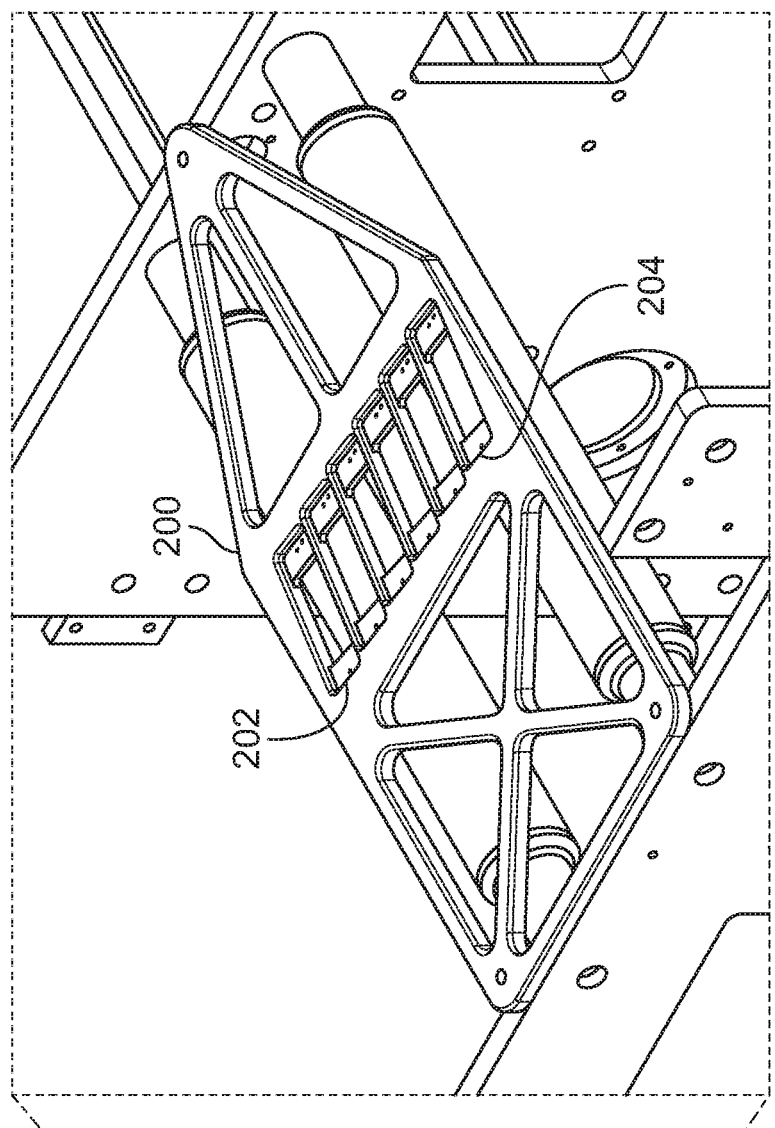
FIGS. 2A-B show a printer engine rack and the positioning of print heads, according to an illustrative implementation.
Figure 2A:
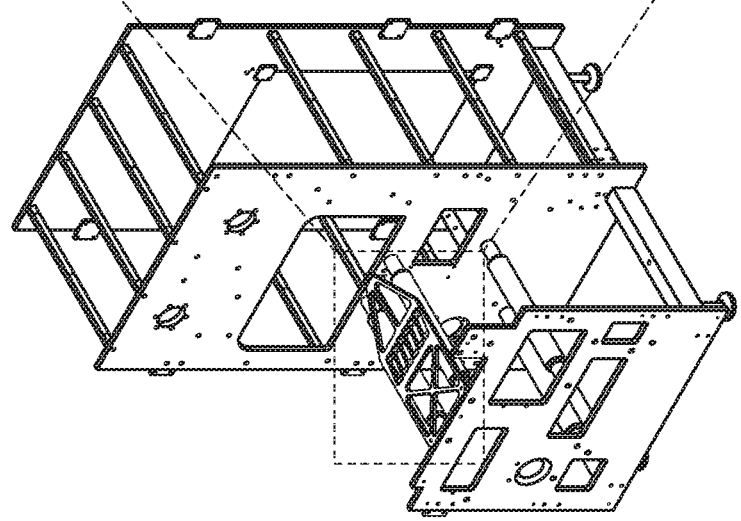

FIG. 2A shows a print head mounting rack 200. Rack 200 holds up to six print heads in print head holding spots 202-204. Rack 200 is an interface between the print heads used to deposit components onto the webbing and the webbing passing through the print engine. Rack 200 holds the print heads close the webbing. For example, the print heads may be held approximately 0.5 mm, 1 mm, 2 mm, or 3 mm above the web. Rack 200 holds the print heads at a cant to appropriately line up print head nozzles for overprinting in reaction compartments because certain print heads have a misaligned nozzle arrangement that limits our ability to overprint droplets. The cant angle is a slight rotation from the normal vector of the nozzle plate so that the nozzles align to over-print droplets. The cant angle may be, for example, 1 degree, 2 degrees, 4 degrees, 8 degrees, 10 degrees, 20 degrees, or any suitable angle. To achieve an overprint of, for example, four different nozzle rows, the print head may rotate at an angle of 8.7°. The accuracy of droplet dispensing is driven by the desired spacing, the diameter of a droplet on the web, which is dependent on the contact angle, and by the repeatability of dispensing. These parameters can be met with available hardware components but may need some customization during development.

Figure 2B:
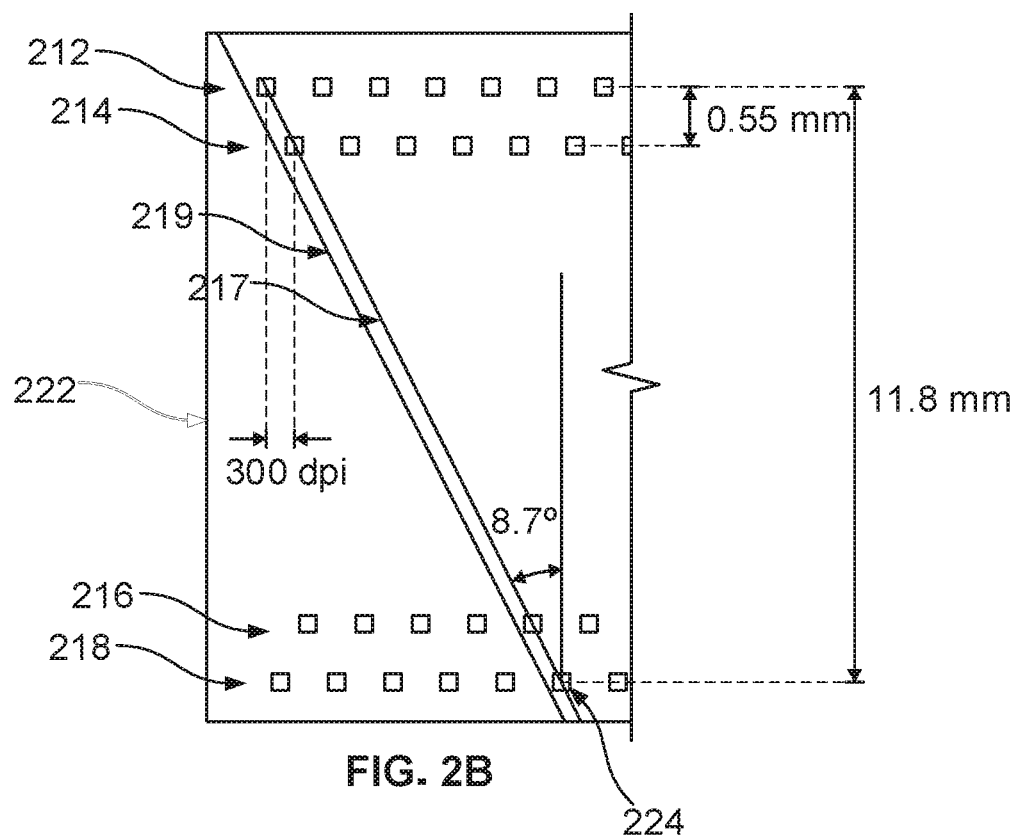

FIG. 2B shows four rows of print head nozzles 212, 214, 216, 218. Each of rows 212, 214, 216, 218 may dispense a different component. Substrate 222 (which extends diagonally upward and to the right from the line pointed at by arrow 219) is moved linearly under the print head with nozzles 212, 214, 216, 218. Because of the 8.7 degree rotation of the print head, a coordinate 224 on substrate 222 will pass directly beneath nozzles in rows 212, 214, 216, 218 along line 217 such that each nozzle may deposit a component on coordinate 224.

The print heads can dispense multiple "colors" per print head (four) which allow for overprinting. The droplet volume dispensed by each nozzle of the print head may be 1 pL, 2 pL, 3 pL, 7 pL, 10 pL, 20 pL, or any other suitable amount. In some implementations, the volume of the droplets may be adjusted. Flexibility in droplet volume is helpful because this parameter affects evaporation rate and ligation incubation conditions. Additives may be added to the component inks to facilitate compatibility with the print heads. For example, solutes like tris may be added to increase conductivity. As an example, humectants or surfactants (e.g. glycerol) may be added to improve ejection quality and print head nozzle lifetime.

In some implementations, the print heads are MEMS (micro-electro-mechanical system) devices. For example, the print head may be a Ricoh MI-15420 print head. Print heads are selected to avoid the risk and uncertainty associated with many thermal print heads, which may compromise the integrity of DNA identifiers. The print heads are capable of fast, low volume, aqueous-compatible and drop-addressable piezoelectric dispensing. The print heads may include a stainless steel nozzle plate.

Nozzle clogging is a common failure mode for print heads. For example, a stopped print head is at risk of blockage, drying out, and thus needing recirculation. For this reason, the writing system allows allow print heads to be moved from the writing system for purging and wiping and then replaced while maintaining registration.

To help repeatability of printing, the writing system may optimize droplet morphology, volume, and speed. The solution in the print heads may comprise water-Tris solution that contains dye for visibility. For example, the dye may be bromophenol blue. The solution used in the print heads varies from traditional print head inks in that it has low viscosity and high surface tension. The solution is essentially water and will have low viscosity at ~1 cP, compared to ideal ink of 10-11 cP. Because the solution is essentially water, it will have a high surface tension at 72 mN/m, compared to ideal ink of 32 mN/m With optimal waveforms, droplet repeatability may be verified by measuring droplet shape, volume and speed. Individual droplet volume may be verified dispensing millions of drops into a mineral oil vessel and measuring the change in mass of the vessel. To avoid liquid evaporation, the droplets may be dispensed into the oil such that the aqueous droplets submerge. Droplet shape and speed may be measured using a "drop watch" system using a CCD camera to capture droplet dispensing in-flight.

Figure 3:
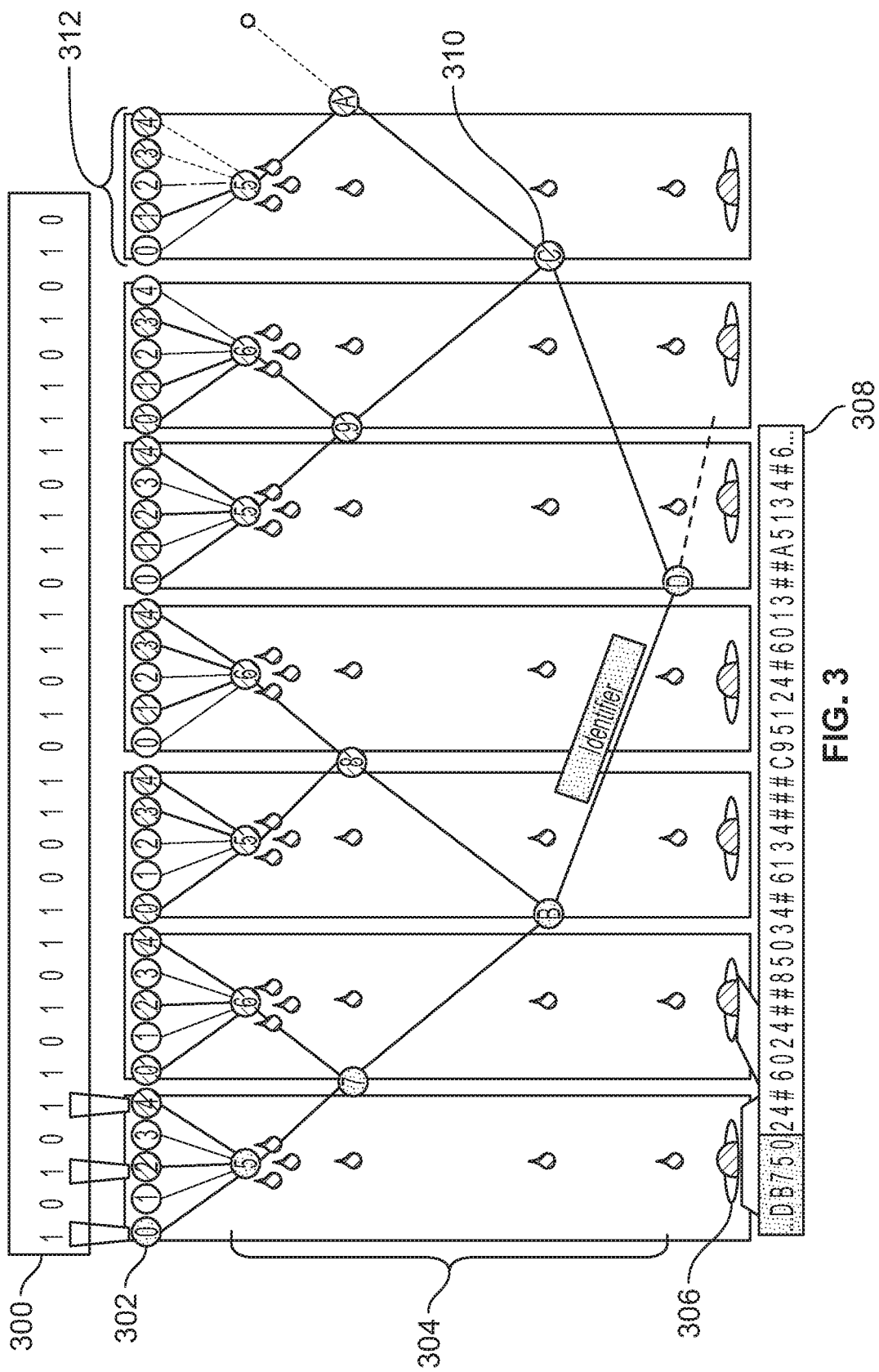
FIG. 3 shows a diagram of dispensing solutions into compartments according to a trie of identifiers, according to an illustrative implementation.

FIG. 3 shows a diagram of dispensing solutions into reaction compartments according to identifier sequences constructed from a trie. Each layer of the trie represents a layer of the identifier, and each edge of each trie layer represents a component within corresponding identifier layer. The final layer of the trie may represent the multiplex layer of an identifier. String of symbols 300 represents a set of codewords to be stored in DNA identifier nucleic acid molecules. A codeword is a string of symbols that represents a specific string of symbols from a source alphabet, called a source word. A code maps source words to codewords in a process known as encoding. Droplets 304 are dispensed into individual reaction compartments (e.g., compartment 306). String of symbols 300 is encoded by constructing identifiers that are represented by the trie paths connecting the root of the tree (not shown) to the leaves of the final (multiplex) layer 302 that point to symbol values of '1'. As shown in FIG. 3 and as will be described further below, particularly in relation to FIG. 11, the codeword's "weight" may be evenly distributed—i.e., string of symbols 300 is divided such that each string of five bits is encoded in a reaction compartment, and each string of five bits has exactly three '1' values so each compartment receives three components from the multiplex layer to form three identifiers. For example, reaction compartment 306 will contain identifiers with a unique combination of components from the base layers (the components that comprise the path of the trie up to the multiplex layer—components 7, B, D, . . . ), and components 0, 2, and 4 from the multiplex layer, respectively, as shown in the multiplex layer and as corresponding to the positions of the string of symbols "10101". For each of the '1' values, the corresponding identifier molecule for that symbol position (comprised of the components that make up the path leading to it) will be deposited into the reaction compartment.

After the print heads have deposited components into the reaction compartments, the reaction compartments are moved from the print engine to the incubator module. The incubator is critical for the ligation reaction because it controls the temperature required for optimal ligation efficiency and humidity needed for preventing droplet evaporation. The incubator module uses a series of rollers to keep large portions of webbing (e.g., 10 m, 20 m, 40 m, 100 m, or any suitable length) in the chamber for the duration of the ligation reaction. The number and position of the rollers allows changes in incubation time or webbing speed. While in the incubator module, the concentration of solutes within the droplet in the reaction compartment need to remain constant to retain maximal ligation efficiency. For this reason, the primary function of the incubator is to maintain a level of humidity that will minimize volume loss due to evaporation. Factors affecting the evaporation rates of droplets are (1) a humectant (likely to be glycerol) may be required within the ligase liquid, in order to prevent full evaporation of the droplet in a time much shorter (<1 s) than the required ligation time and (2) the concentration of glycerol within the ligase strongly affects the required humidity levels and humidity tolerances.

Figure 4:
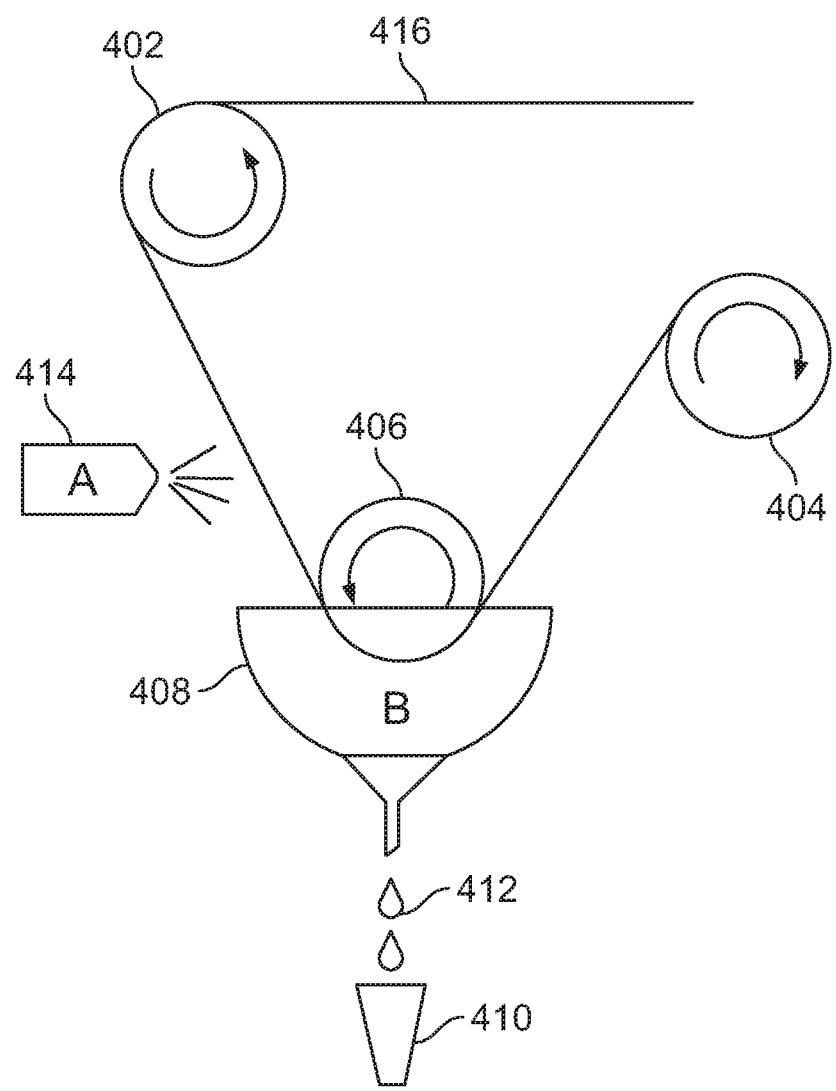
FIG. 4 shows a pooling sub-system, according to an illustrative implementation.

FIG. 4 shows a pooling sub-system using spray wash 414 and immersion in pooling buffer 408 to remove printed droplets from webbing 416. The pooling sub-system removes DNA molecules from moving web 416 and transfers it to a DNA binding column. The webbing 416 passes over rollers 402, 404, 406. The DNA molecules are removed from the webbing 416 using a combination of two mechanisms (1) spray wash 414 of the moving web using the pooling buffer and (2) immersion of the moving web into the pooling buffer 408 within the pooling chamber. In some implementations, only one of the two mechanisms is used, or the mechanisms are used in combination with other DNA molecule removing means.

After removal from webbing 416, the DNA molecules are passed through a binding column to collect the full-length DNA identifiers 410. The column 410 is then removed from the writing system for down-stream processing, comprising DNA elution and collection within a suitable vessel for storage.

The systems and methods described herein provide a fully automatable workflow based around nanopore sequencing to decode molecular data. The workflow includes validating a physical DNA storage system, developing PCR-based data access methods, improving nanopore sequencing technologies (with altered sample preparation, purposefully designed DNA component sequences, and chemically modified nucleic acids), and optimizing sequencing systems and workflows for large-scale parallel sequencing on multiple devices. DNA-based information produced using the methods described herein is uniquely suited to retrieval by strategically optimized nanopore (or electronic channel) sequencing methods. A key hurdle for nanopore sequencers has been achieving slow enough DNA translocation and narrow enough pores to sequence with single-base resolution. The DNA components encoded by the methods described here may be designed to simultaneously boost sequence signal of each component molecule and increase the discrimination between component sequences. Together with the option of incorporating chemically modified bases to enhance signal to noise, these features allow nanopore technologies to achieve reproducible TB-scale recovery of artificial DNA information. The system and methods described herein provide for the development of organization and storage systems for DNA, the development of a protocol for accessing a DNA library, the modification of sample preparation protocols for improved reading capacity of encoded DNA, and the advancement of nanopore technology to increase reading capacity of sequencing instruments.

The output from the writing process of a string of symbols, as described above, is a library of encoded DNA (identifiers) that may require long-term storage and infrequent access. The produced pool of encoded DNA may contain hundreds of thousands of molecules of each identifier sequence. In terms of grams, the total amount of material produced may be in microgram quantities. The pool may be amplified with PCR to ensure enough material exists for redundancy, archiving, and accessing, as described below in relation to FIG. 14.

After amplification, the pool may be allocated into multiple containers and stored in different locations. The pool may be stored in a range of nucleic acid storage and archival systems. For example, DNA may be stored in Eppendorf tubes, in a freezer, cryo-preserved in liquid nitrogen, or stored in Tris-EDTA. Shelf-life of DNA assessed by reading material subjected to accelerated stability conditions such as different temperatures. The systems and methods described herein may include an automated sample management system that allows for both long-term storage and random access of stored DNA.

In some implementations, an operating system (OS) may be capable of coordinating writing, reading, discoverable querying of archives scalable to Exabyte sizes, or any combination thereof. Specifically, in some implementations, the OS aims to enable the reading and writing of a tree of semantically annotated and indexed blocks via a codec optimized for the read/write platform described above. The OS includes a translation stack that can include an ingest API, as well as modules for organizing and formatting data for long-term yet granular data querying and discovery. These aspects of the OS can be broadly suited for any writing, reading, or access method. Other aspects of the OS can be designed to specifically optimize methods for writing, accessing, and reading information. These include modules for compressing and error-protecting data, as well as modules for configuring and sending data to the writing systems described above. Though data written in DNA molecules with the above methods will be readable with any sequencer, specific reading methods are described below. The OS may also include automation software and workflows that mediate the handling of DNA-based information between the writer and reader; for example, by allocating DNA to, accessing DNA from, and replenishing DNA in a system of storage containers capable of supporting an Exabyte of information.

Figure 5:
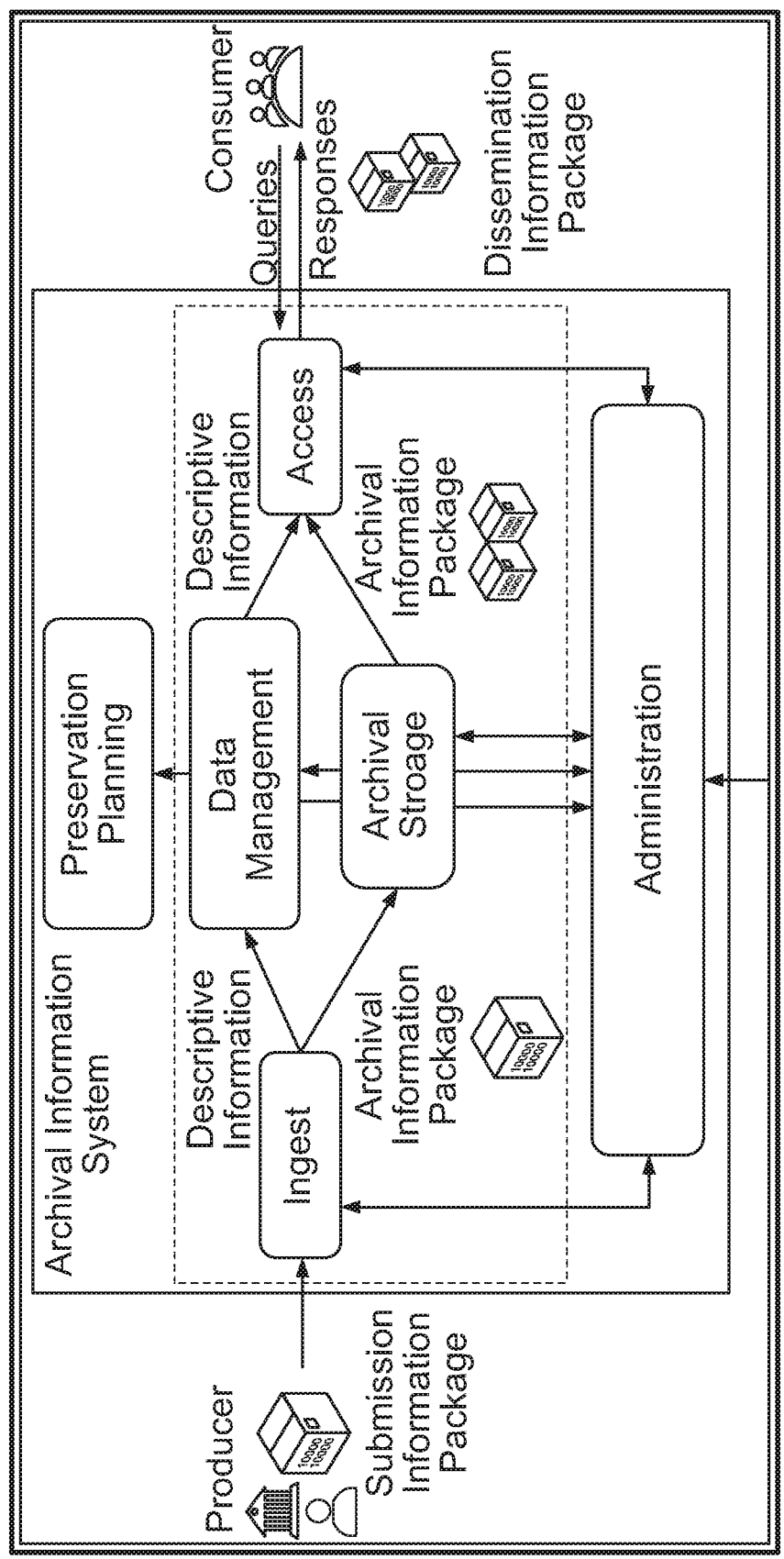
FIG. 5 shows an archival information system, according to an illustrative implementation.

FIG. 5 shows an archival information system for the OS. The central module comprises ingestion, data management, access, and archival storage modules. The data management and archival storage modules communicate with the ingestion and access modules. Descriptive information is passed from the ingestion module to the data management module. Descriptive information is then passed from the data management module to the access module. Archival information package is passed from the ingestion module to the archival storage module and then to the access module. The central module takes in information from a producer, such as a submission information package, via the ingestion module. The central module also communications with the consumer, via the access module, by fielding queries and sending responses. For example, the queries and responses may be held in a dissemination information package. The data management and archival storage units also interact with the preservation planning and administration modules.

Figure 6:
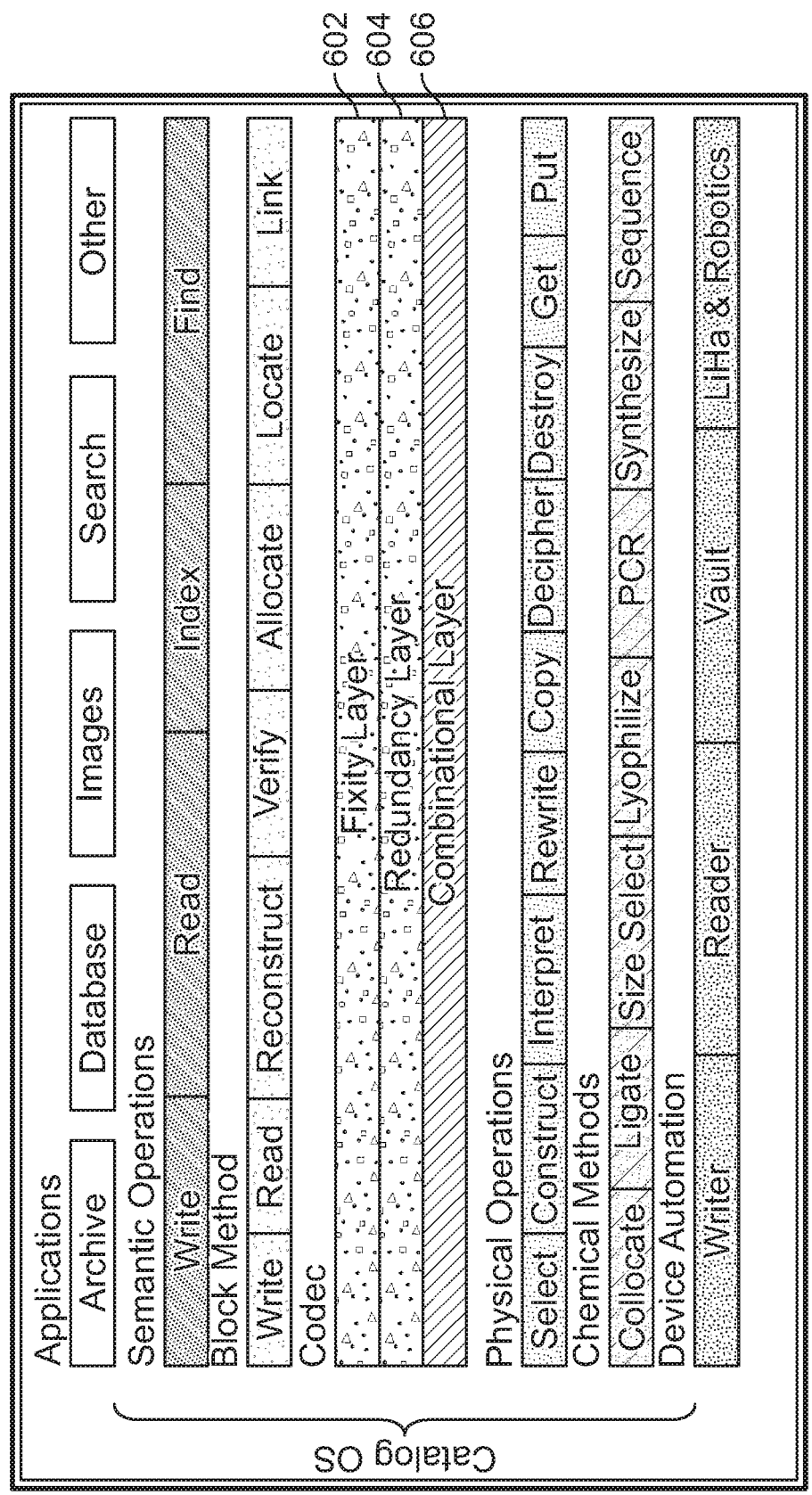
FIG. 6 shows a system diagram of an operating system organized by layer, according to an illustrative implementation.

FIG. 6 shows a layered organization of the capabilities managed by the OS organized into seven functional layers. Each layer draws on the services offered by the layer below. The seven layers translate into six areas of development involving design and construction of:

(1) Codec: an encoder/decoder pipeline with writer-specific optimizations (2) Chemistry Interface: a translator from bit operations to chemical operations (3) Automation Interface: interfaces and translators to automation devices (4) Block Abstraction: a block-based interface & supporting core data structures (5) Search & Indexing: infrastructure for semantic annotation and indexing (6) Archival Application: an archival application demonstrating the OS Benefits of the encoding schemes and OS described herein include the ability to select an encoding scheme optimized for writing speed, writing cost, reading cost, or access cost; the ability to optimize the mapping of index data to blocks to minimize decoded footprint; the ability to manipulate information at all scales from large blocks to single bits and model data structures natively; and tight integration with current archival standards and practices enabling archival, querying, and reasoning over data and relationships.

The codec functions as the encoder/decoder for information. Because layers above need it and layers below cannot be meaningfully tested without it, the proper operation of the codec is highly important. The codec receives a source bit stream and is charged with translating it into a form suitable for writing using chemical methods. As shown in FIG. 6, the Codec includes three layers: a fixity layer, a redundancy layer, and a combinatorial layer that handle the encoding process.

In the fixity layer, the source bit stream is divided into packets, where all packets are of a fixed size. Packets may be processed independently and serve as a unit for parallel processing. Packets are composed of one or more blocks. A block is the smallest unit of allocation in the archive, and the archive's combinatorial space is divided into a series of contiguous strings of bits called blocks. The fixity layer is responsible for computing a block hash using a standard cryptographic hashing algorithm such as MD5, SHA-224, SHA-256, SHA-384, SHA-512, SHA-512/224, or SHA-512/256 and this hash is included in a parent block. When a block is decoded, its integrity may be checked by re-computing its hash and checking it via the parent block.

In the redundancy layer, the hashed block is passed on to the redundancy layer where up to two, three, or more error protection techniques are applied. Because the susceptibility to noise of certain writing systems may be unknown, a high redundancy convolution code may be used. Errors caused during writing may be primarily of two types: (1) due to a missing identifier, for example because of deteriorating print head nozzles or low efficiency assembly reactions, or (2) due to assembly of unintended identifiers, for example because of dispense splatter or contamination among adjacent reactions. A writing system's imaging-based quality control methods may mitigate errors due to print head clogging and missing identifiers. To correct errors, a block is divided into slices (e.g., 223 bytes long in a typical configuration) and a Reed-Solomon code using an arithmetic field of 255 symbols is computed for each slice, resulting in error protection bytes (e.g., 32) capable of correcting byte-errors (e.g., 16 bytes) (where each byte in error may have any number of bit errors). These error protection parameters are configurable, are written to the archive, and are configured to tolerate, for example, a writing system error rate of 10' errors per codeword. As defined above, codeword is a string of symbols that represents a specific string of symbols from a source alphabet, called a source word. A code maps source words to codewords during the process known as encoding.

Assuming a scheme where a source word comprises three source bytes, a protected slice of 255 bytes will map to 255/3=85 codewords. Assuming independent errors, the probability that more than 16 bytes will be in error is the probability that more than five codewords will be in errors, which is approximately $4.3 \times 10^{16}$. By changing the field size or the error protection bytes computed, this probability can be lowered as needed. A writing system with precision printing heads, such as that described above, may be able to comply with this expected error rate, but the codec is capable of handling higher protection rates if needed, albeit at a higher computing cost. Additionally, a larger field (e.g. 65,535) could confer higher protection. To mitigate the impact of unintended identifier molecules, the redundancy layer may also introduce an optional interleaver that permutes the order of the bits so that source bits protected by the same set of error protection bytes do not end up in adjacent reaction compartments and thus do not become susceptible to larger burst errors than may be correctible.

Figure 7:
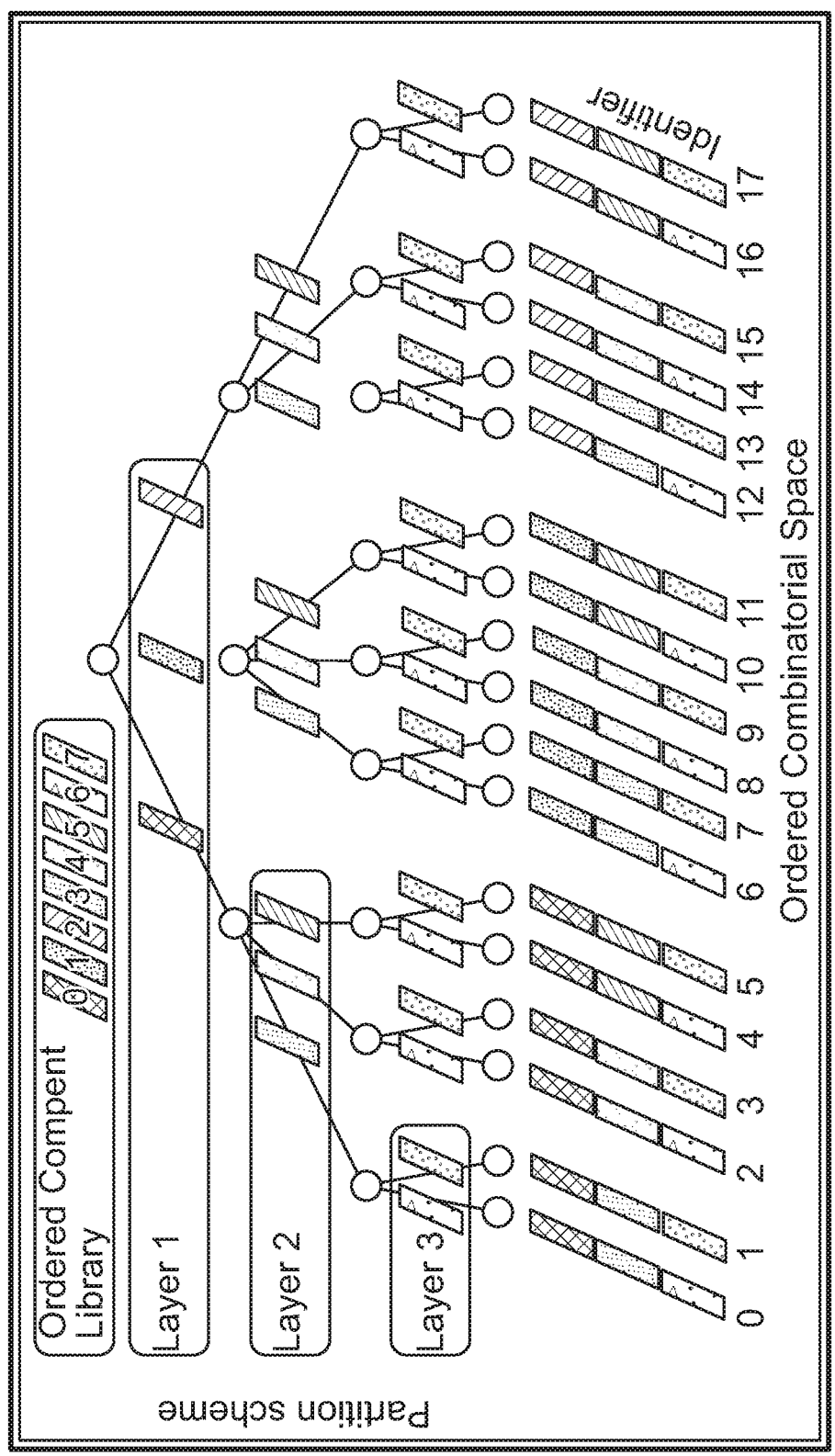
FIG. 7 shows system diagram of a layered product constructor with three layers and a component library of eight components, according to an illustrative implementation.
Figure 8:
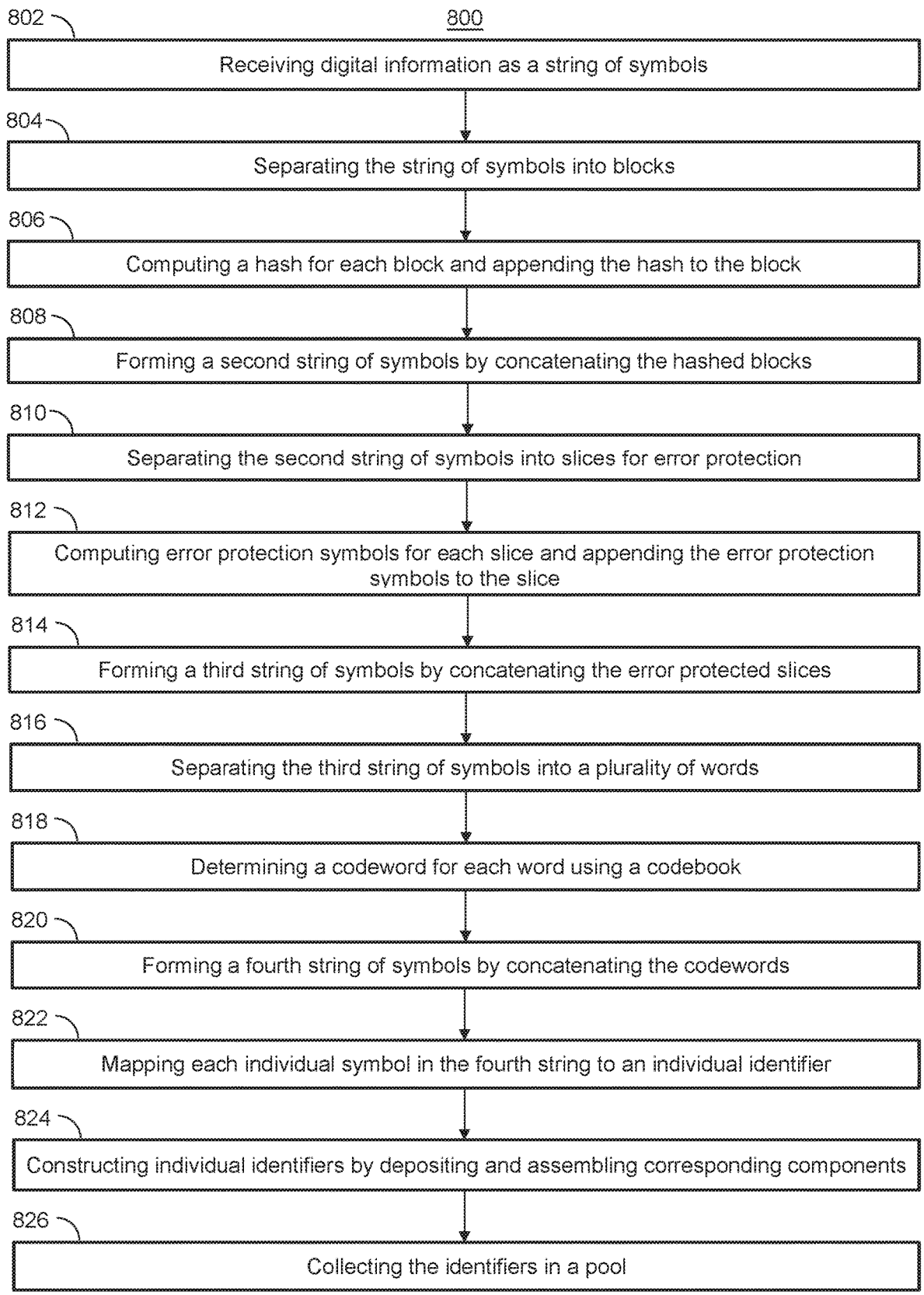
FIG. 8 shows a flowchart for storing digital information into nucleic acid molecules with error protection, by appending hashes, according to an illustrative implementation.
Figure 9:
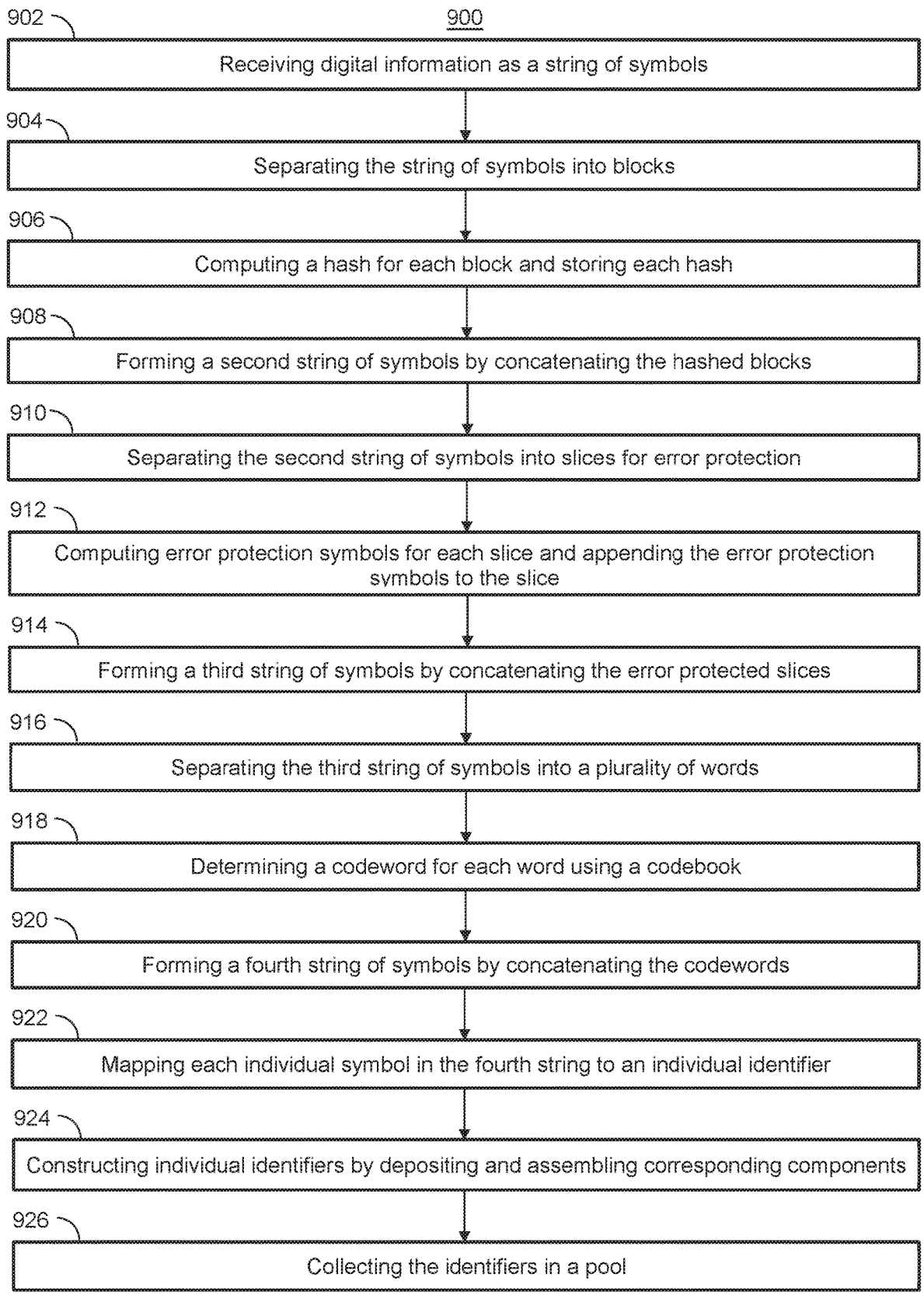
FIG. 9 shows a flowchart for storing digital information into nucleic acid molecules with error protection, by separately storing hashes, according to an illustrative implementation.

Symbols, such as the error-protected symbols formed from the methods described in relation to FIGS. 8-9, may be mapped from source words composed of source symbols (e.g., a series of bits) to codewords from a number of combinatorial methods for encoding information in nucleic acid libraries. In some implementations, this encoding is performed or orchestrated by the codec. An example of a particular encoding scheme is shown in FIG. 7. FIG. 8 shows a system diagram of a Layered Cartesian Product combinatorial constructor (LCPCC) for designing and ordering identifiers. The product constructor has three layers (M=3) and a component library of eight component sequences (C=8). A combinatorial partition scheme with {3,3,2} component sequences per layer is shown. The space of all possible identifier sequences forms a combinatorial space. As will be described in further detail below in relation to FIG. 10, the total number of combinatorial objects constructible from the component library, which may be referred to as the span of a combinatorial scheme, determines the length of the bit stream writable to a single pool of identifiers. The span of this particular scheme is 18. The combinatorial objects are ordered in the combinatorial space lexicographically by extending a ranking on the component sequences to the identifiers constructed from them. This ordering information is implicit in the identifier, identifies its position in the combinatorial space, and may be used to identify the position of the symbol encoded by the identifier in the source symbol stream. For example, the LCPCC may be used to encode a binary alphabet, and define the symbol encoded by a constructed identifier to be "1." The "0" symbol may be represented by not constructing the corresponding identifier. A source bit stream may be encoded by constructing a specific set of identifiers (i.e., an identifier library) unique to that bit stream.

FIGS. 8-9 show flowcharts 800, 900 for storing digital information into nucleic acids with error protection. At step 802, information is received as a string of symbols of length L. As described above, the symbols may be bits, bytes, a bit string of any length, alphanumeric characters, a character string of any length or any other suitable symbol. In some implementations, the string of symbols is converted into a bit stream. For example, the string of symbols may consist of six symbols "LETTER". The string of alphanumeric characters "LETTER" may be converted to binary, resulting in 48 bits ("01001100 01000101 01010100 01010100 01000101 01010010"). In this example, L would be equal to 48. In some implementations, the information in the string of symbols is received separately—i.e., symbols may be received individually or any combination. The symbols or groups of symbols may then be concatenated or otherwise combined to form a string of symbols. For example, ten blocks of 8 bits may be received individually and then concatenated together to form a string of symbols 80 bits long.

Flowchart 800 includes three stages of encoding the received information: (1) hashing, as explained in relation to steps 804-808; (2) adding error protection symbols, as explained in relation to steps 810-814; and (3) determining codewords, as explained in relation to steps 816-820. While FIG. 8 displays all three of these stages, the stages may be performed separately or in any combination thereof. For example, steps 804-814 (hashing and adding error protection symbols) may be bypassed, such that flowchart 800 proceeds from step 802 directly to step 816 (the start of the codeword stage). The stages may be performed in any order.

The hashing stage begins at step 804, where the string of symbols is separated into blocks. In some implementations, each block is of the same length B, where B is equal to L (the length of the string of symbols) divided by the number of blocks. As an example, the string of symbols may be 1,000 bits. The 1,000 bits may be separated into any length of blocks, such as five blocks each consisting of 200 bits; 100 blocks each consisting of 10 bits; 10 blocks each consisting of 100 bits, or any such combination. In some implementations, the blocks are not of equal length. For example, for a string of 1,000 bits, block$_1$ may consist of 500 bits; block$_2$ of 100 bits; block$_3$ of 300 bits; and block$_4$ of 100 bits. In some embodiments, blocks may be padded with arbitrary symbols to reach a target length.

At step 806, a hash of length H is computed for each block. In some implementations, the hash is computed using one of MD5, SHA-224, SHA-256, SHA-384, SHA-512, SHA-512/224, or SHA-512/256. Each computed hash is appended to the corresponding block to form a hashed block. This allows string of symbols and the hashes to be stored together in nucleic acids. An alternative implementation that includes storing the hashes separately from the string of symbols is described below in relation to FIG. 9. If each block is of length B, after appending the hash, the hashed blocks are of length H plus B. For example, the string of symbols may consist 1,000 bits that are then separated into ten blocks of 100 bits each (B=100). The hash of each block may be 10 bits long (H=10). After appending, the hashed blocks then consist of 110 bits (the original 100 bits plus the 10-bit hash).

At step 808, the hashed blocks are concatenated to form a second string of symbols of length L2. In the example above, where each hashed block of the ten hashed blocks comprises 110 bits, the string of symbols would be equal to 1,100 bits (the original 1,000 bits received in step 802 plus 100 hash bits computed in step 806).

At step 810, the second string of symbols is separated into slices. In some implementations, each slice is of the same length S, where S is equal to L2 (the length of the second string of symbols formed in step 808 from the hashed blocks) divided by the number of slices. As an example, the second string of symbols may consist of 1,100 bits. The 1,100 bits may be separated into any length of slices, such as ten slices each consisting of 110 bits; one hundred slices each consisting of 11 bits; five slices of 220 bits, or any such combination. In some implementations, the slices are not of equal length. For example, for a string of 1,100 bits, slice$_1$ may consist of 500 bits; slice$_2$ of 100 bits; slice$_3$ of 300 bits; and slice$_4$ of 200 bits. In some implementations, the hashing stage (steps 804-808) is bypassed. Thus, the second string of symbols references in step 810 would be equal to the string of symbols received in step 802. In some implementations, the blocks are never concatenated back together to form L2, but rather each block is processed into slices separately.

At step 812, error protection symbols are computed for each slice. Any number of error protection symbols may be computed for each slice. At step 812, the error protection symbols are appended to the slice for which they were computed, thereby forming error-protected slices. In some implementations, the same number P of error protection symbols are computed for each slice, such that the each error-protected slice is S plus P bits long. For example, if the second string consists of concatenated blocks that are each 1,100 bytes (1000 source bytes plus a 100-byte hash), they can each be divided into five slices consisting of 220 bytes. Then 40 bytes of error protection can be appended to each slice resulting in error-protected slices consisting of 260 bytes each.

In some implementations, the error protection symbols are determined using a Reed-Solomon code. Reed-Solomon codes are block-based error correcting codes. If the P error protection symbols (or bytes) are computed using a Reed-Solomon code, $$\frac{P}{2}$$

erroneous symbols (or bytes) can be tolerated in a protected slice. For example, if P is equal to 40 bytes for a 260-byte protected slice, 20 of the 260 bytes may be incorrect without negatively affecting the processing of those 260 bytes. If the P error protection bytes are computed using a Reed-Solomon code, P erased bytes can be tolerated. For example, if P is equal to 40 bytes for a 260-byte protected slice, 40 of the 260 bytes may be erased without negatively affecting the processing of those 260 bytes.

At step 814, the error-protected slices are concatenated to form a third string of symbols having length L3. In the example above, where each error-protected slice of the five error-protected slices per block comprises 260 bytes, the third string of symbols would consist of 1,300 bytes per block (the original 1,000 bytes received in step 802 plus 100 hash bytes computed in step 806 plus 200 error protection bytes total determined in step 812). In some implementations, flowchart 800 proceeds from step 808 to step 816, bypassing the error protection stage (steps 810-814). Thus, the third string of symbols references in step 814 would be equal to the second string of symbols formed in step 808. In some implementations, both the hashing and error protection stages are bypassed, such that flowchart 800 proceeds from step 802 directly to step 816. In this case, the third string of symbols would be equal to the string of symbols received in step 802. In some implementations, the third string of symbols is computed and processed separately for each block.

At step 816, the third string is separated into a plurality of words, each word having length W. For example, each word may be eight bits long. At step 818, a codeword is determined for each word using at least one codebook. In some implementations, each codeword is an exact match of the respective word (i.e., nothing changes between the third and fourth strings of symbols). In some implementations, however, the codewords may be different from their respective words. For example, the codewords can be a different length than the words.

Codewords may be optimized for chemical and instrument conditions during encoding or decoding. As described above, the presence of an identifier may indicate a '1' in a certain symbol position, while the absence of an identifier for that position would indicate a '0'. In some implementations, determining the codewords comprises applying a uniform weight code (e.g., as described in relation to FIG. 11) to the third string of symbols to ensure every codeword has the same number of '1's (i.e., identifiers to be constructed in step 824). Thus, for the example above with W=8, a codeword must be chosen that can encode eight bits. This effectively adds additional bits so that each codeword can have an equal "weight" (number of identifiers to be constructed).

As described in relation to FIG. 7, the codewords may be determined from a combinatorial space in an NchooseK scheme. In an Nchoosek scheme, for every N ordered identifiers, k identifiers are constructed. For example, in an 11choose4 scheme, for every 11 identifiers, exactly four are constructed. The representative codeword would have length N=11 bits and have weight k=4. An 11choose4 scheme provides enough bits to encode 8 bits in each codeword because $Log_2(11choose4)>8$.

At step 820, a fourth string of symbols having length L4 is formed by concatenating the codewords. The fourth string of symbols will comprise $$\frac{L3 * N}{W}$$

symbols. For example, for a string of 1300 bytes per block (e.g., the third string of symbols formed in step 814) if each word is 8 bits and an 11choose4 scheme is used, L4 would equal 1787.5 bytes per block, or 14300 bits if each byte is eight bits. In some embodiments, the fourth string of symbols is computed and processed separately for each block.

At step 822, each symbol in the fourth string is mapped to an individual identifier sequence. The mapping step 822 produces a scheme for printing the digital information into nucleic acids with error protection. An individual identifier nucleic acid molecule of the plurality of identifier nucleic acid molecules corresponds to an individual symbol in the fourth string of symbols. An individual identifier comprises a corresponding plurality of components, wherein each component in the plurality of components comprises a distinct nucleic acid sequence. For example, the components may be selected from M layers as described above.

At step 824, the individual identifier molecules are constructed by depositing (or co-locating) and assembling corresponding components. For example, the printer/finisher system described above in relation to FIGS. 1-5 may be used to construct individual identifiers by depositing and assembling corresponding components in a compartment. In some implementations, dispensing, using a plurality of print heads, a plurality of solutions comprising a plurality of components onto a coordinate on a substrate. A reaction mix may be dispensed onto the coordinate on the substrate to physically link the plurality of components, provide a condition necessary to physically link the plurality of components, or both.

Based on the codeword stage, a set of printer instructions may be developed that are then sent to a printer-finisher system. The printer instructions may be configured to reduce the possibility of printing errors or increase printing efficiency. For example, the codeword stage may be designed to distribute the identifiers such that each compartment in the plurality of compartments contains the same number of copies of each identifier nucleic acid sequence to within a statistical certainty, thus providing uniform abundance of identifiers across compartments. To provide additional error protection, in some implementations, codewords are permuted or interleaved (with respect to one another) before being sent to the writing instrument, such that identifier nucleic acid molecules that represent adjacent symbols in the string of symbols are not constructed in adjacent compartments. This reduces the chance that burst errors in the writing instrument results in uncorrectable errors or erasures. For example, this reduces the chances that printing mistakes may cause undetectable errors due to streaks of printing onto the wrong coordinate or bleeding between compartments. Alternatively, the error protection may be computed on disparate symbols rather than adjacent symbols to reduce the chance that burst errors in the writing instruments results in uncorrectable errors or erasures At step 826, the individual identifiers are collected in a pool. For example, a pool can hold hundreds of identifiers corresponding to hundreds of symbols encoded in steps 802-822. In some implementations, a presence or absence of an identifier in the pool is representative of the symbol value of the corresponding respective symbol position within the string of symbols.

Flowchart 900 follows the same steps with the exception of storing the hashes rather than appending them. Steps 902, 904, 908, 910, 912, 914, 916, 918, 920, 922, 924, and 926 are equivalent to steps 802, 804, 808, 810, 812, 814, 816, 818, 820, 822, 824, and 826, respectively. In step 906, hashes are computed for each block but not appended; rather, the hashes are stored separately. For example, the hashes may be stored on a hard drive in order for the hashes to be accessed faster or more easily than the blocks in nucleic acids. The hashes could be stored in nucleic acid molecules, a magnetic storage device, a flash memory device, cloud storage, or any other suitable location.

When encoding a string of symbols, the number of distinct identifier sequences that can be constructed depend on the parameters of the encoding scheme used and the string of symbols to be encoded. For a given string of symbols, it may be advantageous to generate an optimized scheme that minimizes key resources (e.g., the number of layers or components used to build the identifiers). A set of C components may be partitioned in B(C) distinct ways, where B(C) is the $C^{th}$ Bell number, and increases factorially with C. If the L layers contain $c_1, c_2, \ldots, c_L$ components respectively, then the total number of distinct identifiers constructible is $\Pi_{i=1}^{L} c_i$, with $\Sigma_{i=1}^{L} c_i = C$. The total number of combinatorial objects constructible from the component library, which may be referred to as the span of a combinatorial scheme (as noted in relation to FIG. 7), determines the length of the bit stream writable to a single pool of identifiers. Therefore, for a given bit stream length and component library size, a partition scheme with a span large enough to encode the bit stream, while minimizing the number of layers, may be beneficial. Each additional layer imposes additional efficiency and time constraints on the chemistry; therefore a partition scheme with fewer layers is preferable. An example of a partition scheme to minimize layers is described below in relation to FIG. 10. A branch-and-bound search over the space of partitions possible from the prime factorization of the bit stream length.

The codec or any encoding system may use several strategies to compute a set of multiplexable reactions. First, a strategy borrowed from multi-valued logic synthesis may treat all or parts of a string of symbols, such as a bit stream, as a Boolean function and attempt to extract a minimal representation of the function using heuristics. State of the art logic synthesis tools have been shown to be able to handle functions with $\sim 10^6$ row truth tables. If the source stream is already entropy compressed, then this approach may fail because succinct representations may be difficult to find. For compressed streams, a local greedy approach is to divide the stream into reaction words of Z adjacent identifier sequences, and use a component partition scheme that has at least Z component sequences in the multiplexing layer. This forces Z identifiers to share the same prefix, and facilitates assembling them in a single reaction compartment. (For example, Z=2 in FIG. 7.) Inversely, another performance measure of interest is the number of bits encoded per reaction. Minimizing reaction compartments increases the number of symbols written in a single reaction, thus minimizing the write time and the total substrate length needed by the writing system to write a given string of symbols.

Another key resource is the number of identifiers that can be constructed to encode a source bit. By default, an LCPCC scheme encodes each symbol position of a string of symbols with a unique identifier sequence. If the string of symbols is a bitsteam, where a '1' is indicated by the presence of an identifier and a '0' is represented by its absence, the number of identifiers that can be assembled to write the bit stream is proportional to the number of '1' bit values in the source bit stream. Unlike in silico compression where bit stream length is a key measure, here it is the weight of the bit stream—the number of "1" bit values—that may define the writing time or reaction compartments needed.

Assembling identifiers (e.g., the identifiers described in step 1008 of FIG. 10) may require performing a chemical reaction in a compartment where all the necessary components and reagents are collocated at the time of the reaction. The number of such compartments needed is a critical resource that may be minimized. One strategy to minimizing reaction compartment count is to execute multiple reactions in each compartment. Not all reactions, however, may be mutually combinable. The LCPCC (described above in relation to FIG. 7) generates a combinatorial space such that adjacent identifier sequences share a common prefix of component sequences. For the example in FIG. 7, identifier sequences 0 and 1 share a common component sequence prefix—identifier sequence 0 has component sequences 0, 3, 6 and identifier sequence 1 has component sequences 0, 3, 7. This implies that the construction of identifiers 0 and 1 may be executed in a single reaction compartment in which four components are collocated: 0, 3, 6, and 7, because components 6 and 7, by construction, are mutually inert. This strategy of executing multiple reactions in a single compartment may be referred to as multiplexing, and the layer from which multiple components are taken, the multiplexing layer.

Figure 10:
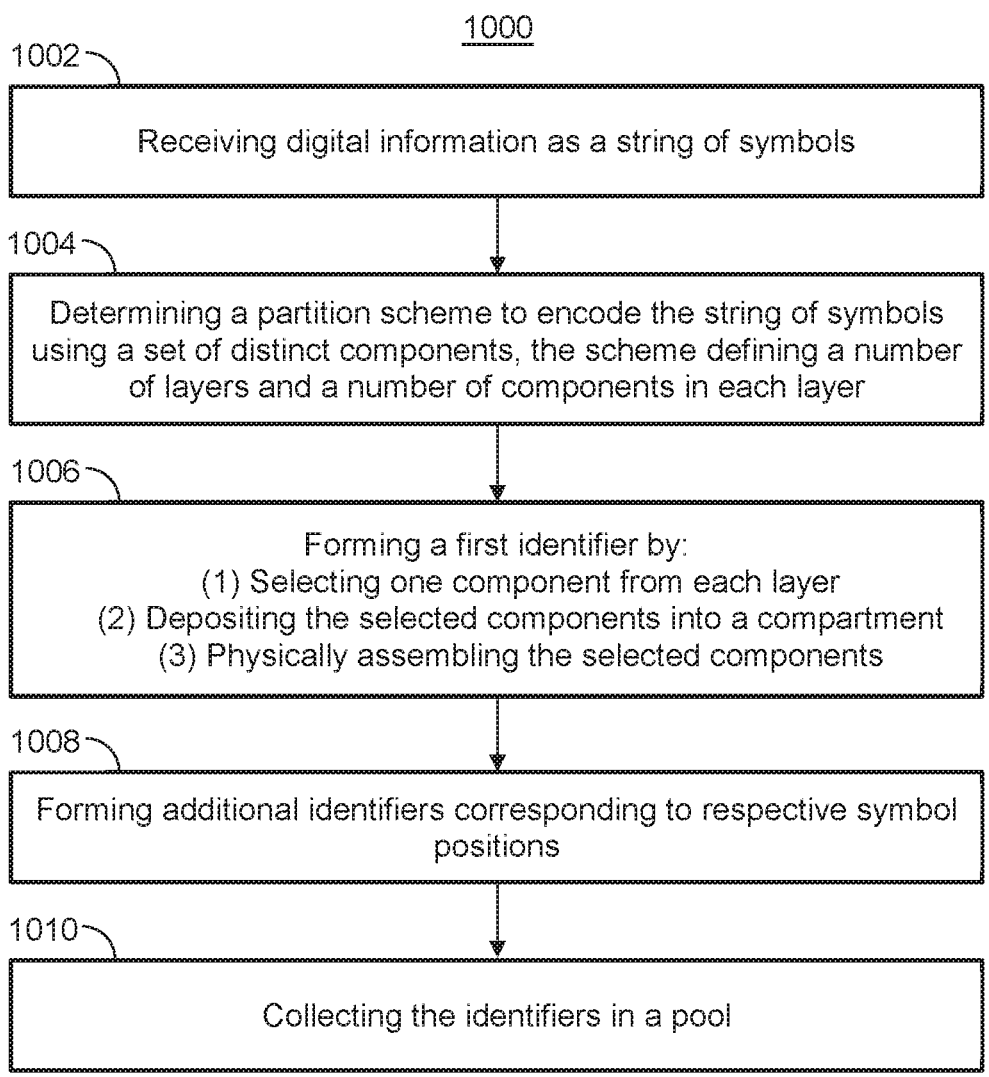
FIG. 10 shows a flowchart for storing digital information into nucleic acid molecules, using a partition scheme, according to an illustrative implementation.

FIG. 10 shows a flowchart 1000 outlining the steps for encoding digital information into nucleic acids with a partition scheme. The partition scheme may be designed with the intention of encoding the digital information in nucleic acids under restraints, such as writing hardware configurations (e.g., the number of inks available in a printer). Flowchart 1000 begins at step 1002. Like steps 802 and 902 of FIGS. 8-9 described above, at step 1002 digital information is received as a string of symbols having length L. In some implementations, an additional step may be incorporated in flowchart 1000 to translate the string of symbols to a string of bits of length B.

In order to encode within the given restraints, at step 1004 a partition scheme is determined. The partition scheme defines a set of rules to encode the string of symbols using a set of C distinct component sequences. Specifically, the partition scheme defines a number of M layers within which to arrange the C distinct component sequences, and defines component sequences numbers in each layer, such that there are $c_i$ component sequences in the $i^{th}$ layer. In some implementations, the number of component sequences in each layer is non-uniform (i.e., $c_1$ is not equal to $c_2$, etc.). The number of layers and number of component sequences may be configured to minimize the number of layers necessary to encode the string of symbols, thereby simplifying the chemistry of forming identifier molecules while maintaining enough identifier sequence possibilities to encode the entirety of the digital information. To ensure enough identifier sequence possibilities to encode the string of symbols, a product of the component sequence numbers $c_i$ ($\Pi_{i=1}^{L} c_i$) must be greater than or equal to the length (as measured in bits) of the string of symbols and a sum of the component sequence numbers $c_i$ ($\Sigma_{i=1}^{L} c_i$) must be less than or equal to the number C of distinct component sequences. In some implementations, the identifiers are representative of a subset of a combinatorial space of possible identifier sequences, each including one component from each of the M layers. As a simple example, if L equals 1,000 bits (e.g., 1,000 bits in a bit stream received in step 1002) and C equals 70 (e.g., 70 printer inks available to be printed), three layers (M=3) with 10 component sequences per layer could be used to encode the data. However, to best capitalize on the available 70 component sequences, it may be more efficient to encode the data using two layers (M=2), with 50 component sequences in the first layer and 20 component sequences in the second layer.

In some implementations, if the string of symbols has been translated to a string of symbols of length B, the product of the component sequence numbers $c_i$ must be greater than or equal to the length of the string of symbols of length B, converted to bits. For example, if the translated string of symbols is "LETTER", B equals 6 but the equivalent string of bits consists of 48 bits (B equals 48) if each character is encoded by 8 bits. Thus, the number of M layers and C component sequences necessary to encode "LETTER" must be such that $\Pi_{i=1}^{L} c_i \geq 48$.

At step 1006, a first identifier is formed, for example with a printer-finisher system, by (i) selecting one component from each of the M layers, (ii) depositing the M selected components into a compartment, and (iii) physically assembling the selected components. In some implementations, the selected components are assembled by ligation. In some examples, the M layers are associated with different priority levels. For example, the first layer may have a highest priority and the second layer may have a second highest priority.

At step 1008, additional identifiers are formed. The additional identifiers correspond to respective symbol positions in the string of symbols that represents the digital information to be encoded. Each symbol position within the string of symbols may have a corresponding different identifier. Once the necessary amount of identifiers are formed, the identifiers are collected in a pool in step 1010.

Figure 11:
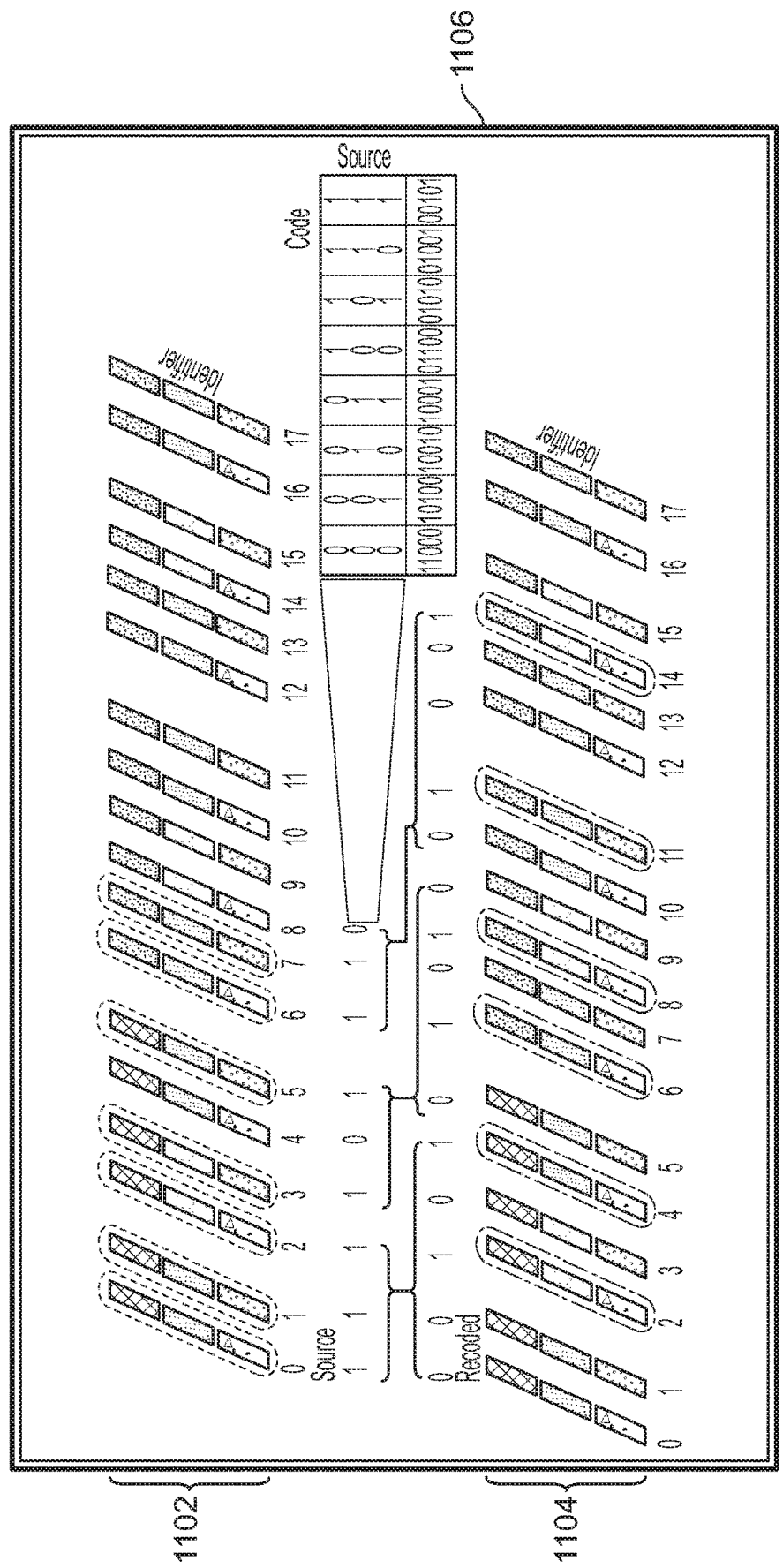
FIG. 11 shows a system diagram of a uniform weight code, according to an illustrative implementation.

FIG. 11 demonstrates a uniform weight code to translate each word into a codeword with fixed weight. Uniform weight coding can improve decoding and simplify a writing system's configuration. One approach to this is to construct a complete bipartite graph of all possible source words and their mapping to all possible codewords. Each edge of the complete bipartite graph is weighted by the number of '1' bit values introduced by the codeword. By choosing a minimal weight matching, a problem for which linear programming-based polynomial time algorithms exist, one could find a mapping that minimizes the bit stream weight, effectively "compressing" the total number of identifier sequences needed to write it. Such a code may be referred to as a weight minimizing code. The number of "1" bit values may be minimized by recoding the source bit stream using longer codewords. In FIG. 11, the minimum weight of a codeword of length five necessary to encode a word of three bits, is weight two. However, because three bit words will on average have a weight of 1.5, this codeword scheme, though minimal in weight for codewords of length 5, actually increases the total weight of the message. If, for example, the codewords were extended to length eight, then there could be a codeword weight of one to encode three bits. In this example, the overall weight of the message would be lessened. Weight minimizing techniques may be used to reduce the number of identifier sequences needed per source bit.

Reading an identifier library by sequencing involves sampling from a distribution of multiple copies (multiple nucleic acid molecules) of distinct identifier sequences. Non-uniformities in enrichment of identifiers can make sampling lower copy identifiers difficult, pushing the need for larger samples. Because the writing systems described herein assemble multiple identifiers in reaction compartments via multiplexing, and because the number of identifier sequences in each reaction compartment is defined by the source bit stream, the enrichment of each identifier in the final library could vary. One approach to mitigating this problem is to recode the source bit stream using a uniform weight code, one in which every codeword contains a fixed constant number of "1" values, as shown in FIG. 11. Consequently, each reaction compartment assembles a fixed number of identifiers and thus the variance in enrichment is minimized without modification to the writing system. Moreover, by choosing the codeword length judiciously, a uniform weight code could also minimize the weight of the bit stream. For example, the set of $37.4 \times 10^6$ 28-bit codewords of a fixed weight of 13 can encode all 25-bit source words, yielding 25/13=1.92 bits/identifier. As another example, the set of $64.5 \times 10^6$ 32-bit codewords of a fixed weight of 10 can encode all 25-bit source words, yielding 25/10=2.5 bits/identifier.

An additional benefit of uniform weight coding is that when a library is read, each codeword decoded is expected to contain a known fixed number of "1" values which enables the use of more robust decoding techniques. Pushing this idea to the extreme, a long codeword, for example 1024 bits, could span multiple reactions, yet may require assembling only a single identifier encoding 10 bits; this can lead to extreme "weight compression" enabling high encoding rates due to the need to construct very few identifiers, and high decoding rates due to higher bits encoded per identifier.

Because the recoding techniques described above are applied in the combinatorial layer after classical redundancy bytes have been computed, they can have an impact on the error protection performance. For example, when a 25-bit source word is mapped to a 28-bit codeword of uniform weight 13, the mapping may not be isometric: a 1-codeword error can now cause a multi-byte error in the source word. Extreme weight minimization may also affect the SNR (signal-to-noise ratio) of an encoded bit because the minimum distance of the code is reduced. To investigate and remedy these issues, weight minimizing uniform weight codes may be used that include source words may be embedded into codewords near-isometrically. This may result in the use of longer codewords, but also offer better error performance. To generate an encoding scheme that co-optimizes against all these constraints, tools may minimize layers, maximize span, minimize reaction compartments, minimize weight, and find a code that uses constant weight codewords that preserve error protection performance.

A throughput of roughly 1 Mb/s may be achievable per CPU-thread for the encoder as described above. As an example, a rate of 93 Mb/s (1 TB/day) may be achievable using four instances of 32 CPUs, ~10 TB of temporary disk space, and ~3 TB of outgoing bandwidth, which may be amortized over 1080 jobs. The cost of producing this encoded information may be roughly halved if similar infrastructure were locally connected to the writing system, saving the cost of outgoing bandwidth and assuming ingest was free. Using GPUs or server-less cloud functions could reduce this cost further, at the expense of software refactoring and platform dependence.

Figure 12:
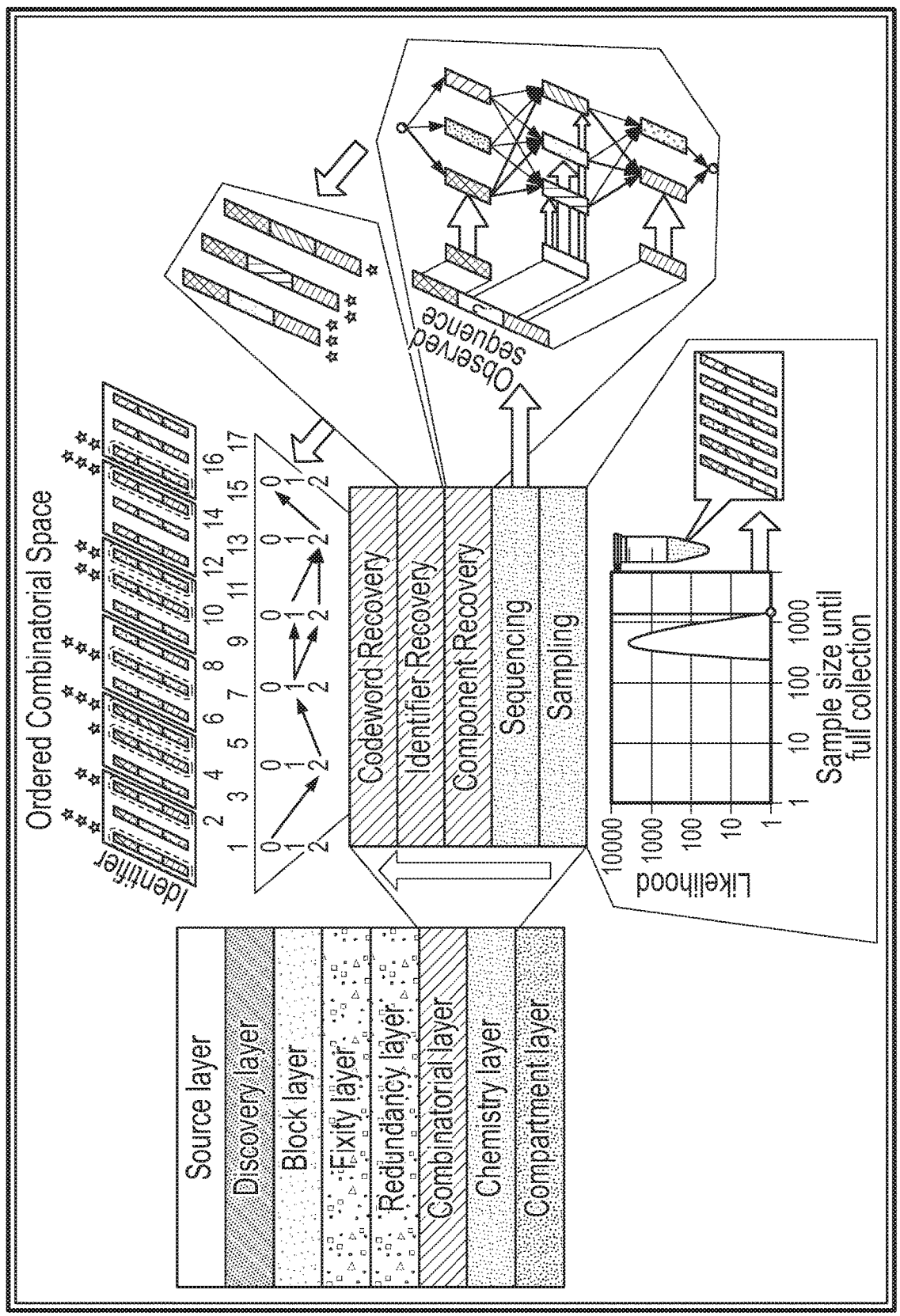
FIG. 12 shows a system diagram of a decoding stack, according to an illustrative implementation.

Recovering a source bit stream from an archive follows a roughly inverse process to the one described above. FIG. 12 shows a system diagram with the basic steps of decoding a set of identifiers. The system obtains a pool of the subset of identifiers of interest. The goal is to reconstruct a set of identifier sequences with the highest likelihood to have produced the sequences observed in an adequate sampling of the pool. Using a simulation model, a sample size estimate is first computed for the identifier sub-library to be decoded, given a small acceptable probability of incomplete sampling. Using the compute sample size, the identifier library is sampled and sequenced to obtain a stream or collection of observed sequences.

Consider an observed sequence s. From the representation information stored the archive described above it is known that the sequence comes from a LCPCC identifier library with L layers, where the jth component of layer i contains component sequence $c_{ij}$. Therefore, the observed sequence s is first compared with component sequences $c_{1j}$ for all j. If an exact match is found, then the unmatched suffix of s undergoes this same process now with i=2. If no exact match is found, then a fast approximate matching score is computed for any prefix of s and component sequences $c_{1j}$ using an approximate string matching technique (ASM) or alignment technique, or an n-gram approach. ASM (approximate string matching) methods may be evaluated to determine their suitability to "online" matching of streaming sequence data, as is expected from a nanopore sequencing device, described below.

For a component sequence of length $l_c$, only the variable segment of the component sequence need be identified. The variable segment of the component sequence may be as small as 1c/3, unlike bit-by-bit writing schemes that endeavor to decode every base. This process is repeated with the unprocessed suffix of s and results in an L-partite graph with vertices weighted by a match score. The top weighted paths correspond to candidate identifier sequences, and each candidate has a score. Identifier sequences belong to an ordered combinatorial space, so each candidate identifier sequence corresponds to a symbol in the encoded stream. Some candidate identifier sequences may contradict the codeword rules; for example, a codeword may be of a fixed weight. These candidates may be eliminated based on low scores or saved as an alternative set of candidates. Finally, a path through top ranking candidates is constructed to obtain a candidate sequence of codewords. This sequence of codewords is then checked against fixity data and corrected if possible using error correction symbols. In cases of extreme noise or error, the technique could backtrack and choose an alternative path through candidate identifiers to search for the correct sequence of candidates.

Once codewords are obtained, they are mapped back to source words using an implicit Lehmer codebook to obtain the error-protected source blocks. These blocks are then decoded and checked to verify fixity. If errors are found, error protection symbols are used to correct them if possible and the source blocks are recovered. The source blocks are appropriately assembled into a source bit stream and handed off to the block layer for query response assembly, delivery, and caching.

Figure 13:
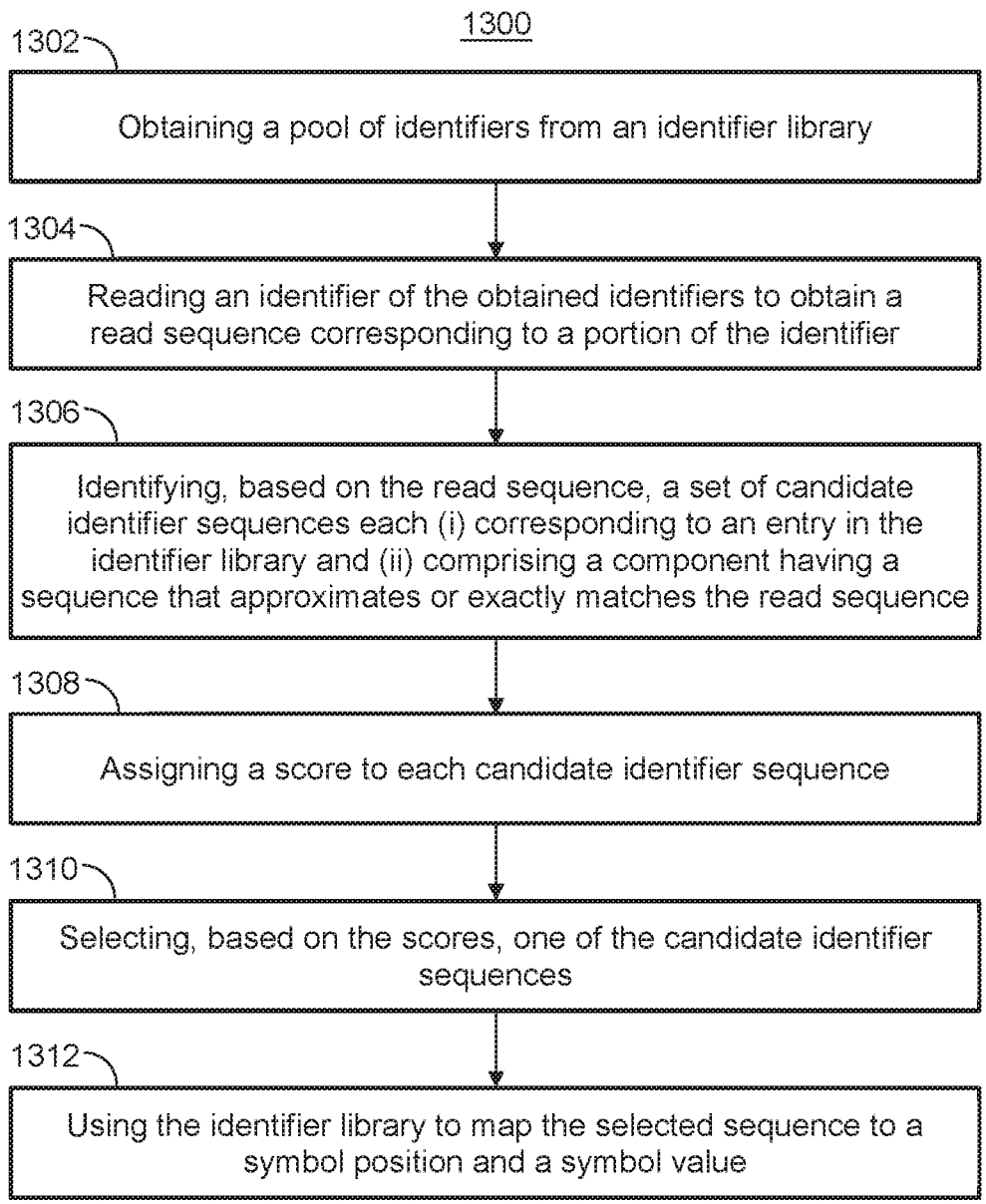
FIG. 13 shows a flowchart for reading information stored in nucleic acid sequences, according to an illustrative implementation.

FIG. 13 shows a flowchart 1300 outlining the steps for reading digital information stored in nucleic acid sequences. At step 1302, a pool of identifiers is obtained (e.g., via the methods described in relation to FIG. 14). The identifiers in the pool store digital information from a string of symbols of length L. The pool of identifiers corresponds to a subset of identifier sequences in an identifier library that is capable of encoding any string of symbols having length L. Each individual identifier in the pool corresponds to a symbol value and a symbol position in the string of symbols. Each individual identifier comprises a plurality of components and is thus an instance of a specific sequence.

Between steps 1302 and 1304, the identifier may be processed in various ways. In some implementations, the identifier is ligated to a second identifier. In some implementations, one strand of the identifier is degraded. For example, a strand-specific exonuclease may be used to selectively degrade one strand of the identifier.

At step 1304, at least one of the obtained identifiers is read to obtain a read sequence corresponding to a portion of the at least one identifier. Step 1304 may be accomplished by any sequencing technique, such as chemical sequencing, chain termination sequencing, shotgun sequencing, bridge PCR sequencing, single-molecule real-time sequencing, ion semiconductor sequencing, pyrosequencing, sequencing by synthesis, combinatorial probe anchor synthesis sequencing, sequencing by ligation, nanopore sequencing, nanochannel sequencing, massively parallel signature sequencing, Polony sequencing, DNA nanoball sequencing, single molecule fluorescent sequencing, tunneling current sequencing, sequencing by hybridization, mass spectrometry sequencing, microfluidic sequencing, transmission electron microscopy sequencing, RNA polymerase sequencing, or in vitro virus sequencing. Sequencing a pool of nucleic acids, identifiers in this case, yields a read sequence for the whole pool; however, it is not known how each identifier of the pool maps to the read sequence. Sequencing methods are prone to single-base errors, further hindering the matching of identifiers to the read sequence.

In some implementations, step 1304 includes nanopore sequencing. An electric field is applied to an electrolytic solution and at least one nanopore channel. In some implementations, the at least one nanopore channel is formed within a solid-state membrane. In some implementations, the nanopore channels are formed from alpha-hemolysin (αHL) or *Mycobacterium smegmatis* porin A (MspA). During nanopore sequencing, the identifier is translocated through the at least one nanopore channel, while impedance across the channel is measured. Each component in the identifier has a corresponding unique impedance signature along the length of the component sequence, thus allowing the components in the read sequence to be determined by comparing measured impedance values to the unique impedance signature.

In some implementations, when step 1304 includes nanopore sequencing, the applied electric field generates a differential potential greater than or equal to 100 mV. This high differential potential enables the identifier to be passed through the nanopore channels at a relatively high rate. For example, translocation of the identifier may occur at a rate great than 1,000 bases per second. In particular, the translocation rate may be 1,000,000 bases per second.

In some implementations, when step 1304 includes nanopore sequencing, an agent is bound to the identifier before translocating. The agent may be a chemical moiety, a protein, an enzyme, a base analogue, a conjugated nucleic acid, a nucleic acid with a hairpin, or a methyl group.

In some implementations, if the agent is a chemical moiety, an enzyme, such as methyltransferase, binds the chemical moiety to the at least one identifier nucleic acid molecule. In some implementations, if the agent is a base analogue and the agent is bound using an enzyme, such as a polymerase, the enzyme binds the base analogue to the at least one identifier nucleic acid molecule during replication.

The agent is associated with an agent signature that may be used to help determine sequences in the identifier during reading. Binding the agent to the at least one identifier nucleic acid molecule occurs at a known location on a component of the identifier, such that the agent signature at the known location results in a known shift in impedance value during translocation. The presence of the agent may thus create an exaggerated "profile" for the identifier, thereby increasing the signal-to-noise ratio during reading. This may allow the translocation speed to be increased while maintaining accuracy during reading. In particular, the presence of the agent on the at least one identifier may allow for a first maximum translocation rate that achieves a desired level of accuracy that is faster than a second maximum translocation rate that achieves the desired level of accuracy in the absence of the agent on the at least one nucleic acid molecule. Another way to increase signal-to-noise ration during reading includes replicating the identifier such that it comprises modified bases or base analogues. This may be done separately or in addition to binding an agent to the identifier.

Steps 1306, 1308, 1310, and 1312 describe a method of matching the read sequence to a known set of identifier sequences (i.e., the identifier library). In step 1306, the read sequence is used to identify a set of candidate identifier sequences from the identifier library that have a component sequence that approximates or exactly matches the read sequence. As an example, the read sequence (which may or may not correctly match the identifier) may be CAGCTG. The set of candidate identifier sequences may comprise an exact match (CAGCTG) as well as other potential matches that are similar to the read sequence, such as identifier sequences that differ by a certain number of bases (e.g., 1, 2, 3, 10, 20, 100, etc.). For example, the set of candidate identifier sequences may also include CAGATG, AAGCTA, and CACGTG. For ease of reference, the "incorrect" nucleotides (i.e., that do not match the read sequence in the example) are underlined.

In some implementations, the identifiers are encoded such that each identifier is associated with a reading error tolerance (for example by ensuring a minimum hamming or Levenshtein distance between components of the same layer). A permissive reading error tolerance may be used to increase the rate at which the identifier is read. Another way to increase read speeds includes reading a subset of the identifier. In some implementations, the identifier includes M components corresponding to M layers (as described above in relation to FIG. 10). In some implementations, reading the identifier includes reading only N of the M components where N is less than M. For example, only the first two layers out of five layers may be read. This can increase how many identifiers are read in a given amount of time. This can be helpful when a subset of the data encoded in the pool needs to be accessed. For example, if the first layer always indicates a certain meaningful value, certain useful identifiers can be identified by only accessing the first layer. Or, for example, if all accessed identifiers have the same components in the first four layers, then those four layers need not be read.

In step 1308, each candidate identifier sequence is assigned a score associated with how similar the component sequence of each candidate identifier sequence is to the read sequence. The better the candidate identifier sequence matches the read sequence, the lower (or higher) the score may be. The scores may be computed in a variety of ways including a least distance algorithm, a percent match, or any other suitable algorithm. As an example, for the read sequence CAGCTG, a candidate sequence CAGCTG may have a score of zero, while a candidate sequence CAG<u>A</u>TG may have a score of one because the fourth base of the candidate sequence does not match the read sequence. The score may depend on the number of bases that are incorrect and/or the placement of incorrect bases. For example, a candidate with two incorrect nucleotides adjacent one another (CA<u>CG</u>TG) may have a lower score than a candidate with two incorrect nucleotides that are not adjacent (<u>A</u>AGCT<u>A</u>).

The set of scores guides the decision in step 1310 to select one of the candidate identifier sequences as a potential match to the identifier that was read (or observed) in step 1304, thereby mitigating the effect of single-base sequencing errors. For example, the candidate sequence with the lowest score may be selected because it is the closest potential match to the read sequence. At step 1312, the selected candidate identifier sequence is then mapped to a symbol position and symbol value using the identifier library. In some implementations, if step 1304 includes nanopore sequencing and an agent has been bound to the identifier, determining the sequence in the identifier includes comparing measured impedance values during translocation to the agent signature.

In some implementations, steps 1306, 1308, 1310, and 1312 are iterated until the desired digital information is completely accessed from the pool (or multiple pools) of identifiers. In some implementations, a decoded string of symbols is determined and tested for accuracy. Specifically, a hash of a portion of the decoded string of symbols may be calculated then compared to a hash associated with a corresponding portion of the string of symbols obtained in step 1302. The hash may be stored as a plurality identifiers in the pool (and subsequently be read via the steps of FIG. 13 above) as described in relation to FIG. 8, or may be stored remotely, as described in relation to FIG. 9. The hash may be calculated using MD5, SHA-224, SHA-256, SHA-384, SHA-512, SHA-512/224, or SHA-512/256 or any other suitable algorithm. A mismatch between the read out or original hash and the computed hash indicates there was a read error in reading the data—e.g., the information extracted from the nucleic acid molecules does not match the source data. Based on whether the calculated hash matches the read out original hash, the portion of the decoded string of symbols may be verified as a match to the portion of the string of symbols obtained in step 1302. If the hashes do not match (or if it is determined the decoded string does not match the obtained string through any other means), a different candidate identifier sequence (e.g., of the set of candidate identifier sequences from step 1306) may be selected (e.g., as in step 1310 described above). As identifiers are decoded and verified, a computer system may track this information and use a machine learning technique to increase a likelihood that the decoded string of symbols matches the string of symbols. The error-tolerant method disclosed by FIG. 13 thus set a basis for making unconventional improvements to sequencing techniques, for example running nanopore sequencing at a substantially large applied voltage, as described above.

In terms of grams, the total amount of material in a given pool may be in microgram quantities. To accurately read the molecules in the pool, it may be amplified with PCR to ensure enough material exists for redundancy, archiving, and accessing. The components on each edge of the identifiers can be designed to have common primer binding sites so that entire identifier libraries can be replicated exponentially in one PCR reaction. etc.

Figure 14:
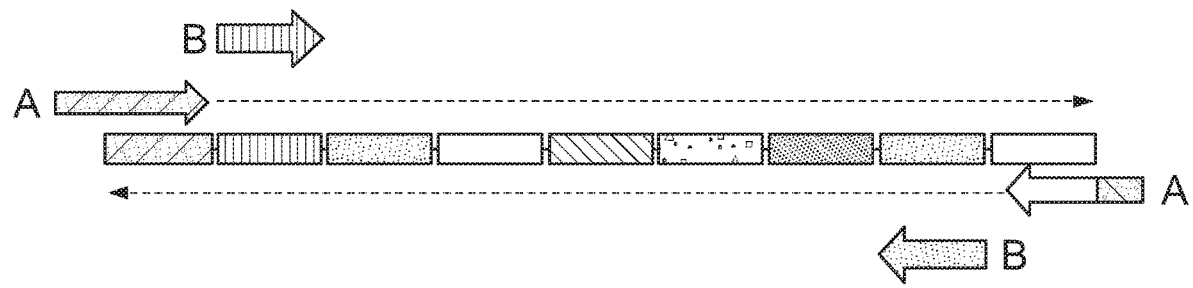
FIG. 14 shows a PCR amplification scheme, according to an illustrative implementation.

Moreover, a nested PCR-based, chemical random access method can be used to efficiently sub-library of identifiers for reading. FIG. 14 illustrates an example of a nested PCR amplification scheme for accessing a sub-library of identifiers from an archived DNA library. A sub-library may be any group of identifiers that one wishes to access, such as a data block, several data blocks, a single identifier, several identifiers, etc. In the first amplification step with (A) primers that bind components on the edge layers of the identifiers, a group of identifiers comprising the desired data block is selected and enriched. This process is repeated with (B) primers that bind components on the next two layers inward and therefore further reduced the group of identifiers to a smaller sample that comprise the desired data block. This process may be repeated until the retrieved (or accessed, or selected) group of identifiers is only or nearly only comprised of all identifiers that represent the desired data block, thus enabling the data block to be read back efficiently with sequencing. In the final round of nested PCR, the identifiers may be simultaneously prepared for sequencing. With this nested approach for amplification, the number and identity of identifiers accessed is adjusted and the sequencing burden is reduced. In some implementations, amplification steps are limited to seven cycles or less to reduce amplification bias in the libraries and to maintain uniformity of sequence abundance. Primer combinations may be validated with identifiers to demonstrate efficiency and uniformity of the amplification process. As described below, this access method may be used in conjunction with data structures to retrieve blocks of data by their associated block ID. As an alternative to nested PCR, affinity tagged probes that uniquely bind particular components may be used in a nested fashion to access a particular sub-library of identifiers (that represent a data block, for example) for reading.

Reading the identifier nucleic acid molecules in 1304 may be accomplished via nanopore sequencing. Nanopore sequencing provides advantages due to size and scalability. Nanopore sequencing involves applying an electric field to an electrolytic solution and nanopores. Under the applied voltage, nucleic acid molecules pass through the nanopores, interrupting the flow of the electrolytic solution and causing a measurable impedance. Each nucleotide can be correlated to a unique impedance value such that a whole sequence corresponding to a nucleic acid molecule can be obtained by processing an impedance dataset. The nanopore can be formed by a channel in solid-state substrate or by a protein. The protein may be embedded in a lipid membrane or a solid-state substrate such as metal, metal alloy, and polymer-based substrates, and common nanopore proteins include alpha-hemolysin (αHL) and *Mycobacterium smegmatis* porin A (MspA). For a point of reference, Oxford Nanopore's PromethION system is approximately 1.5 square feet in size and is able to sequence 12 Tb (12.0E+12 base pairs) in 48 hours. It is important to note, that because the writing scheme described herein uses premade DNA components that are verified to have high fidelity, any sequence error is likely only introduced during sample preparation and sequencing. Further, single base resolution may not be needed to identify components present in identifiers. For these reasons, improvements to sequencing speed are enabled by adjusting sample preparation protocols and implementing compression techniques (at least for digital information not already compressed).

The standard template preparation scheme for Oxford nanopore sequencing involves ligation of adapter protein complexes to nucleic acid molecules. Some adapter proteins act as a hydrophobic tether allowing for the nucleic acid molecules to target the lipid bilayer reducing the time nanopores are unoccupied. Another protein, or motor, such as α-hemolysin separates the double-stranded nucleic acid molecules so that a single-strand enters the nanopore. This motor then helps ratchets the single-stranded nucleic acid molecules through the nanopore. This protocol is entirely compatible with the identifier libraries and amplicon enrichment plan described herein.

To increase sequencing efficiency, it may be advantageous to optimize nanopore sequencing by physically concatenating identifiers in amplified sub-libraries. Nanopore sequencing may require target nucleic acid molecules to find nanopores which contributes to reading speed. In order to increase read time identifiers may be physically concatenated into longer molecules by ligation. By increasing the length of sequenced molecules from less than 500 bp to 5,000 bp (or greater), pore occupancy may be maximized.

The speed that nucleic acid molecules translocate through the nanopore may be increased. Current nanopore sequencing instruments translocate nucleic acid molecules through nanopores at a rate of 500 base pairs per second. Establishing a differential membrane potential (e.g., greater than 100 mV) across a nanopore membrane translocates nucleic acid molecules at a higher rate (e.g., ~1,000,000 bases per second). For most sequencing applications, a rate on the order of hundreds of thousands is too rapid and protein "motors" can be used to ratchet nucleic acid molecules through the pore in order for a single distinct base to be detected. Thus, running nanopore sequencing without a "motor" may need generating single-stranded nucleic acid molecule input and amplification of nucleic acid molecule signal. Several methods exist for asymmetric PCR that achieve greater than 50% single-stranded nucleic acid molecules from a reaction. By adjusting primer-melting temperature, amplification primers can be designed to drive the reaction into linear amplification of one strand. Alternatively, strand-specific exonucleases, such as Lambda exonuclease, can be used to bind specifically to 5' phosphorylated nucleic acid molecule strands and selectively degrade one strand of the duplex. The protocol may provide greater than 90% production of single-strand molecules.

Regarding signal amplification, nucleic acid molecules can be modified with agents to enhance the signal to noise ratio, essentially creating a "super signature". For example, agents can be small molecules, chemical groups, base analogues, enzymes, proteins, protein complexes, peptides, or amino acids. One method for nanopore signal enhancement, mTAG (methyltransferase-directed transfer of activated groups), uses a methyltransferase to add a chemical group, like biotinylated S-adenosyl-L-methionine cofactor analogue, to the N6 atom of the adenine base in a sequence motif. If the agent is a base analogue, it can be added to the identifier molecule through PCR in which the base analogue is included in reaction mix and is incorporated into a complementary strand bound to a single strand of the identifier molecule during replication. The new hybrid of identifier molecule with base analogue can then be sequenced, and the base analogue can improve signal to noise ratio in a sequencing readout.

Figure 15A:
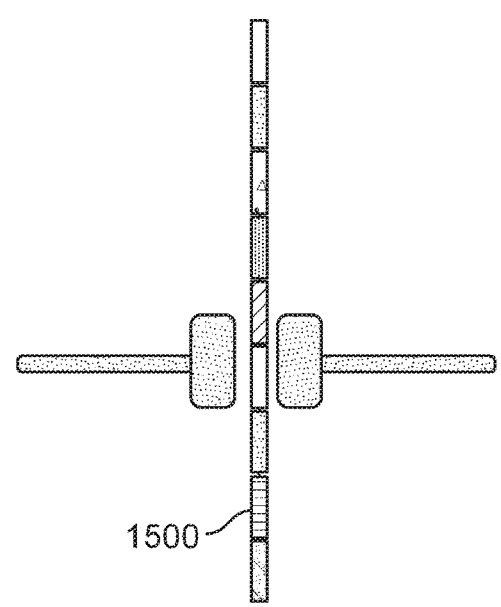
FIGS. 15A-B show identifier nucleic acid molecules with signal events, according to an illustrative implementation.
Figure 15A:
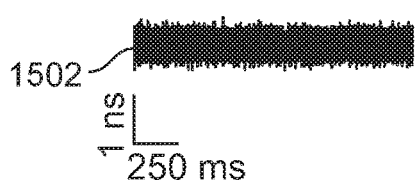
Figure 15B:
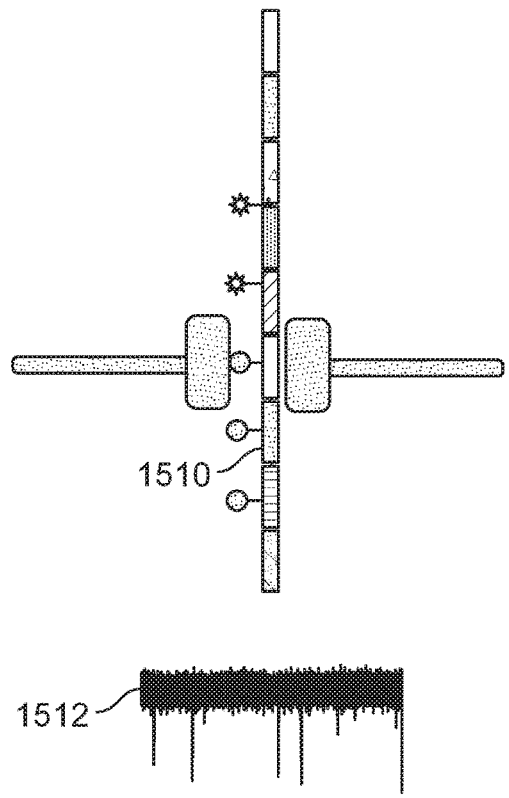
Figure 15B:
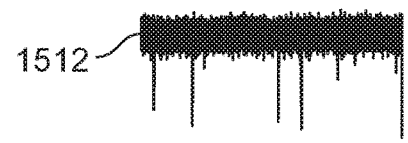

FIGS. 15A-B show DNA identifiers with signal events. In particular, FIGS. 15A-B show how modifying DNA with agents reduces conductance resulting in an increase of signal, thereby increasing the signal to noise ratio (SNR) associated with a sequencing event. Compared with unmodified DNA identifiers as shown in FIG. 15A, DNA identifiers with larger chemical structures as shown in FIG. 15B reduce conductance enhancing sequence signal. Graphs 1502, 1512 show signals (e.g., representative signal events from solid-state pores) from sequencing identifiers 1500 and 1510 respectively. Single and multiple modified bases can be used to create complex signal signatures defined by the type of modifications, number of modifications, and spacing between modifications. As shown, graph 1512 showing the signal of a modified identifier read shows a higher SNR than graph 1502 showing the signal of the unmodified identifier read.

In some implementations, a protein motor may be used to translocate nucleic acid molecules through the nanopore. A protein may be selected to increase the speed of translocation with the protein motor. For example, the translocation may be on the order of 1,000; 10,000; 100,000; or 1,000,000 base per second. Current motor proteins may be optimized to perform better at increased speeds. For example, published helicase variants for motor speed include synthesizing multiple variant construct (using commercial DNA synthesis vendors).

The core decoding effort comprises signal decoding and error recovery. As an example, suppose that the archive is written as 10 pools, each pool written with a component library of 113 component sequences partitioned into 17 sets of five component sequences each and one set of 28 component sequences. Each 25-bit source word is mapped to a 28-bit codeword of weight 14 identifier sequences. The span of such a combinatorial space is $21.4 \times 10^{12}$ identifiers per pool, with the size of any data encoding library being roughly $5.82 \times 10^{12}$ identifiers with $4.16 \times 10^{11}$ reactions. Assuming uniform enrichment of each identifier, and setting the incomplete sampling probability to $10^{-6}$, a sample of size 44× the size of the pool of $5.82 \times 10^{12}$ identifiers is needed. Thus, sequencing a single pool will result in $256 \times 10^{12}$ reads. Assuming each component is 30 bases long, each read will be 540 bases in length, resulting in a sequence stream of approximate length 34.6 PB (petabytes). Instead, if the codeword weight is reduced to four, so that each 14-bit source word is mapped to a 28-bit codeword of weight 4, then the span and the number of components that may be required remain unchanged, whereas the number of reactions increases to $2.97 \times 10^{12}$. Each identifier encodes 3.5 bits instead of 1.79 bits in the previous scheme, and the total reads are halved to $128 \times 10^{12}$ resulting in stream of length 17.2 PB. Using the 34.6 PB estimate, a stream of about $34.6 \times 10^{15}$ bytes can be processed in the span of 24 hours, which may require a throughput of $3.2 \times 10^{12}$ b/s. Graphics Processing Units (GPUs), like the Nvidia GeForce GTX Titan X GPU with 12 GB of memory connected to a high performance Xeon CPU, may be used for approximate string matching achieving between $0.35 \times 10^{12}$ and $1 \times 10^{12}$ b/s depending on text and pattern length, and allowed edit distance. Using 10 instances of Nvidia Tesla V100, and a GPU comparable to the GeForce Titan X offered by a cloud provider, a higher signal decoding throughput may be achieved.

Assuming a writing error rate of $10^{-4}$ codewords, and the encoding scheme described above, we expect to see roughly 25 erroneous bits every 250000 bits, or every 122 255-byte slices. Assuming independent uniformly random errors, we thus expect a bit-error every four 255-byte slices. Thus, at the assumed error rate, at least 75% of all slices decoded would be error free. If decoding an erroneous slice takes three times as long as encoding it and decoding an error-free slice takes a third of the time as encoding it, the total decoding time works out to be roughly equal to the encoding time.

The signal decoding GPU setup may be cloud-based. From this, and not double counting bandwidth and storage costs and including only the compute cost for decoding as assumed above, the cost of reading data may be significantly less than that required for bit-by-bit sequencing processes. This cost may be further reduced if all data storage and computing happens locally, rather than in the cloud.

FIG. 16 shows a system diagram of archival operations. The archive (CAR) is partitioned into boot, ontology, index, and content regions. The boot partition may be written using a standard encoding scheme capable of being decoded without any external metadata, and may store the parameters, keys, and addresses needed to read the other partitions. The OS abstracts the storage medium as a collection of fixed size blocks, as described above. Each block is a contiguous sequence of identifier sequences in a single identifier library, stored as a single pool of identifiers. (A block may, however, be mirrored in several pools for fault tolerance.) The OS can be responsible for organizing, allocating, and writing blocks. When the block layer receives a source bit stream packet, the block index divides and allocates the packet to blocks in the archive. The boot partition comprises the block index, a hierarchical data structure mapping block IDs to physical addresses (comprised of container and identifiers). The block index tracks free/used blocks and allocate blocks to new packets. Each block ID can be a logical address and can be converted to a physical address in the molecular archive. This is achieved by traversing the Block Index illustrated in FIG. 16. Each node in the data structure, called an address node, contains a sequence of child block id ranges, similar to a B-Tree data structure (e.g., as described below in relation to FIG. 18). Each range points to the next block on the path to the block of interest. In this way, a tree of address nodes is maintained culminating in leaf nodes pointing to blocks in the molecular archive which contain actual data. The leaf node so reached holds the block ID identifying, the physical address of the block, and can also hold the hash of the block. Internal nodes can also contain a hash the concatenation of the hashes of its child nodes, thus forming a hash tree. The physical address of a block comprises a Location Code, a Container Code, and an identifier range defined by a start and end identifier that described a plurality of identifiers. A block ID may resolve to more than one physical address to enable fault tolerance. For example, it may be spread across two or more disparate containers, or two or more disparate identifier ranges.

At the molecular level, retrieval queries are answered using a combination of two operations: an identifier sub-library selection operation (for example, with the nested PCR or nested affinity tag access methods described above) and an identifier reading operation (for example, with the impedance-based methods described above, or with sequencing-by-synthesis). Each operation has a positive cost and takes a positive amount of time, measured in minutes to hours. A selection operation may involve a number of sequential PCRs that recursively select identifiers with a given fixed prefix of components. For an LCPCC with L layers with each component sequence of length $l_c$ bases, performing p sequential PCRs (SPCRs) on an identifier library will decrease the identifier library diversity by $\theta p$ layers, where $\theta$ is the number of layers covered by a single PCR. Thus, after p SPCRs on non-multiplex layers, the identifiers present are diverse in $L-\theta p$ layers. Each such identifier corresponds to $(L-\theta p)l_c$ diverse bases. If a sequencing technique is capable of reading molecules of maximum length $\sigma$, then the number p of SPCRs needed to be able to sequence any identifier after p SPCRs is constrained in the following way:

$$p \geq \frac{1}{\theta}\left(L - \frac{\sigma}{l_c}\right).$$

After p SPCRs where p satisfies the given constraint, an identifier library of span D possible identifiers is truncated to an identifier library containing D' identifiers, where $$D' = \frac{D}{c_b\theta_p},$$

where $c_b$ is the number of components in any base layer of the partition scheme. Assuming an encoding scheme with L=15 layers and $c_b$=6, $l_c$=30 bases, $\sigma$=300, and $\theta$=4, gives p=2. In this case, the truncated identifier library size D'≅6× $10^5 \leq 10^6$ identifiers. For example, assuming a simple model of perfectly uniform enrichment of each identifier, the sample size that may be required to sample all identifiers with high probability may be calculated using a Coupon Collector model, and turns out to be S≥βD' ln D', where $$\beta = 1 - \frac{\ln\alpha}{\ln D'},$$

and $\alpha$ is the probability of an incomplete sample. Setting $\alpha$=10', gives β=2, and approximately S≥28×$10^6$, showing that a sample size of 28× the size of the selected sub-library may be sufficient. Note that the uniform enrichment assumption is idealistic and the coverage may need to be somewhat larger (but not extraordinarily so, given that non-uniform coupon collection distributions are also known to be concentrated around the mean). This allows a tolerance of a 10- to 100-fold higher value of a.

The number of block operations needed may be calculated via the following steps. As an example, consider data blocks of size $10^6$ bits in an archive of $10^{19}$ bits, roughly an Exabyte. The archive is composed of $10^{13}$ data blocks partitioned into $10^7$ compartmentalized identifier libraries, each containing $10^{12}$ bits. Each identifier library contains $10^6$ data blocks. If each block is represented by a continuous range of ordered identifiers, then each block may be completely defined by the sequence of components in its first identifier and that in its last identifier. For an L-layered scheme, with a component library of C components, a physical block address comprising an identifier range can thus be encoded using 2L [$\log_2$ C] bits. Thus, if C=112 and L=15, then the identifier range may be encoded in 27 bytes. By similar reasoning, encoding a physical container address may require at least 3 bytes. A total of 64 bytes may be allocated for encoding a physical block address comprising an identifier range and a physical container address. We can allocate 128 bytes to store a hash. Analogously, a source block ID for any block in the source bit stream may require 64 bytes. An address node that can support up to 512 child nodes may require 511 block ID range markers and 512 pointers, each of which is a physical archive address (for example, container address and identifier range) of a child block. Thus, an address node may require 511×64+512×64+128 bytes, or 524,800 bits. Including error correction bytes, such an address node would be encodable in a $10^6$-bit archive block. Thus, a $10^6$-bit archive block could be selected and read.

Using such a scheme, a hierarchical block addressing structure for an Exabyte-scale archive would need to be no more than five levels deep. Starting from a "cold" cache of blocks, i.e., no blocks have been queried, a single-block access with a block ID may require at most six select-read operations: five select-read pairs to find the physical address of the block in question (e.g. traversing through the B-tree), and one select-read pair to read the data block. The OS can use this foundation of a block and a block index to build an indexable archive. The basic unit of storage is a block and blocks refer to other blocks using block ids which are mapped to physical addresses using the block index.

Each high level operation on a block of bits depends on and results in a number of physical operations, which rely on chemical methods or physical steps to be orchestrated. This can involve two types of software tools: optimization tools that translate block operations into an optimized set of physical operations, and translation tools that convert physical operations into detailed programs of actions to be executed by technicians or automation devices, and may include designing and implementing a translator between operations on blocks of bits and physical and chemical operations.

The OS can also allocate bottleneck resources—liquid handling robot and technician time for example—and schedule other write operations so as to minimize the make-span of a write operation. A read request may arise from a pattern query (as described below) and comprise reading a range of blocks specified by block IDs. Because a CAR index is organized as a B-Tree (e.g., as described below in relation to FIG. 18), each pattern query is likely to translate into an access of a range of adjacent words in a range of adjacent blocks.

Typically, pattern queries involve conjunctions and disjunctions and are translated into an optimized sequence of join operations to minimize the read footprint. The query optimizer used in the systems and methods described herein may be modified and augmented so as to faithfully reflect the access cost model in a CAR. After join optimization, a complex pattern query comprising conjunctions and disjunctions may result in a set of blocks to be read. The OS may generate chemical steps for reading the block index to convert block IDs into physical addresses (container and identifiers) and the steps for reading the target blocks. Reading a set of target blocks may require identifying the set of primers needed to execute a set of sequential PCRs as identified by the query optimizer. The OS can generate instances of the SPCR and other chemical methods, complete them with physical sample addresses and method parameter values like volume and concentration, and allocate all essential labware, instruments, and technicians. The overall framework can be responsible for three tasks: time scheduling, resource allocation, and compilation and generation of action programs. The OS can adapt extant frameworks from the business process modeling and automation space such as jBPM and Camunda and from cloud workflow tools such as Simple Workflow Service and Logic Apps may be adapted for the framework.

The OS can interact with at least four automation devices: the writing system, the reading system, a liquid handling robot, and a sample and container management system. The OS can translate the steps in the workflows output by the physical and chemical translators automatable by any of these devices into device-specific instructions. The writing system can be programmed as to which sets of components to collocate, and may require the design and generation of a reaction specification format. FIG. 3 illustrates an example format, and shows how a combinatorial space may be used to encode a bit stream and serialized into a reaction specification. In this example, a 5-bit codeword of fixed weight three bits encodes a source word. The codeword is translated into a combinatorial space of four base layers and a multiplex layer comprising five components, corresponding to the bits in a codeword. Each codeword is to be assembled in a single reaction, and each reaction may include 4 base components and 3-of-5 multiplex layer components, or 7 components in total. A combinatorial space from a layered product constructor can be visualized as a trie and each path from root to leaf in this trie is an identifier. The set of identifiers to be assembled in each reaction can be serialized by traversing the trie in post order, as depicted at the bottom. This reaction set specification is generated by the OS for each write job and packaged with additional description information in the form of job and block descriptors, illustrated in FIG. 17.

FIG. 17 shows a writing workflow with a printer-finisher system, according to certain illustrative embodiments. Print job instructions are split into print head controller command frames and sent to individual print heads, each capable of printing up to four inks, each ink containing a single component. The writing system is equipped with cameras imaging nozzle test (chirp) signals. The OS will process this image data offline, estimate a write error rate, and generate rewrite requests for potentially missing identifiers until the error rate becomes tractable by error protection scheme. The OS will also produce instructions for directing a container management system to submit and checkout containers, and generate container barcode labels. For an Exabyte-scale archive, up to $10^6$ identifier libraries can be managed by a container bank such as the Hamilton Verso or the Brooks SampleStore II. Such container banks also integrate with third party laboratory information management systems (LIMS): for example, the Verso API is supported by LabVantage 8 LIMS and Mosaic. The Verso and Mosaic both support programmatic control through RESTful APIs for integration with the OS. The OS may also generate "picklist" transfer instructions for liquid handlers to facilitate sample prep for sequencing and SPCRs.

The systems and methods described herein provide preservation, discovery, and querying of an archive incrementally, without requiring the decoding large portions of the archive. It should be possible to discovery, query, and read target content selectively and incrementally, while minimizing the need to compute joins and other structures on the archive. A key metric to be minimized is the total number of bits decoded to satisfy a sequence of queries.

Figure 18:
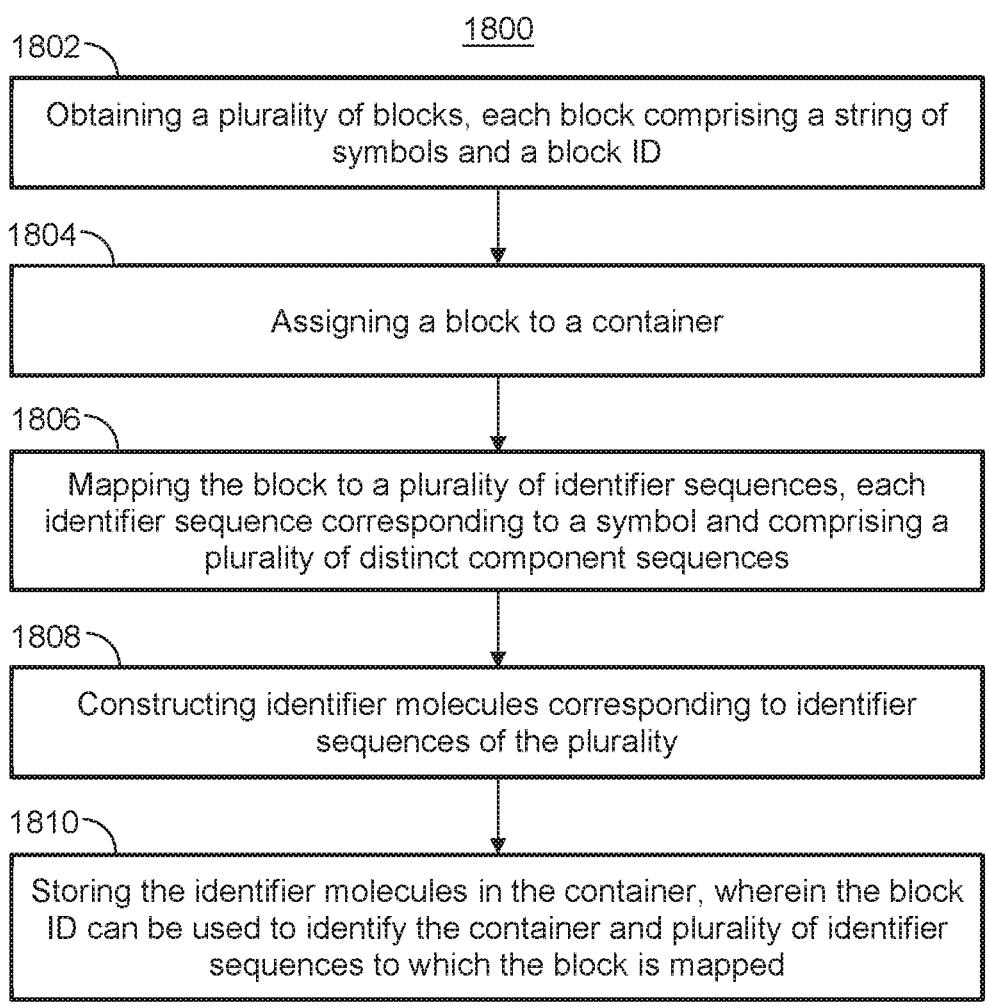
FIG. 18 shows a flowchart for storing blocks of data in containers, according to an illustrative implementation.

FIG. 18 shows an example of a data path for the writing system. Semantic annotation of data blocks may be provided and comprise a block ID, with relational information linking them, and a compact index mapping terms to blocks for access. A Resource Description Framework (RDF) may be as the framework implementing the discovery layer to address indexing and discoverability while minimizing cost of access and maximizing longevity of interpretation. RDF is a formal meta-language standardized by the World Wide Web Consortium for representing information about resources as a set of subject-predicate-object (SPO) triples encoding a graph of entities. Key advantages of RDF can be leveraged, including the ability to interlink blocks of data and even datasets, the integration of domain-specific vocabularies, and tooling for translation, indexing, compaction, and mining.

An archive can be factored into four partitions: bootup, ontology, index, and content. The ontology partition contains a vocabulary of terms and classes and a list of the labels of all entities found in the archive. As such, it offers a taxonomy of the contents of the archive and is intended to facilitate targeted discovery while minimizing the decode footprint. The ontology may be provided by the producer or constructed during ingest using domain-specific software. The index partition can be organized as a triple-store. For example, it can store several collections of lexicographically sorted triples—typically between 6 and 18—with the goal of rapidly serving pattern queries. RDF querying is by example and takes the form "select $x_1, x_2, \ldots x_k$ where $\{p_1$ and $p_2$ and $\ldots p_n\}$", where $x_1$ are data attributes of interest and pi are subject-predicate-object patterns, where each is either a variable or a literal value. For example, "select name where {author <hasName> name and book <writtenBy> author and movie <basedOn> book and movie <directedBy> dir and dir <hasName>"Kubrick"}" returns the names of all authors whose books were made into films directed by "Kubrick." Because each element of a pattern may be a literal or a variable, any of the six permutations of SPO may be needed to search for triples satisfying a pattern in a query. Additional indices storing all unary and binary relations (e.g. SO, SP, OS, etc.) with a count of satisfying triples may also be maintained. These indices are stored as B-Trees or as tries (as described below in relation to FIG. 18), where literals in a pattern serve as the key through the B-Tree or trie and the satisfying triples are stored in blocks pointed to by leaf nodes. The RDF Header Dictionary Triples framework may be used to implement this index organization and serialization scheme. While RDF literals may be string URIs, these are mapped to integer ids when stored in these indices. Because adjacent triples may share prefix literals, they can be stored as deltas in a compressed form and may be directly translated into ranges of identifiers.

An advantage of such a native semantic data storage is that a query may now be satisfied without having to read and decode the entire index. An analyst-initiating discovery of an archive results in the decoding of the bootup and ontology partitions. These are disseminated to the analyst from which the analyst may construct initial queries. A RDF query engine (e.g. Redland Rasqal), coupled with the software described herein, can transform this pattern query into an optimized set of scans through the B-Tree indices, and CAR blocks. The result may be a set of satisfying triples, and/or a set of estimated triple counts. Based on these results, the analyst may submit further queries that may result in decoding of long-form target content comprising images, videos, or scientific datasets. Because indexing is natively integrated with Applicant storage, the decoded footprint can be minimized by the query optimizer.

Each entity included in the index is referred to by an integer ID, which expands to a Uniform Resource Identifier (URI). The entity referred to by the URI, however, is stored in the content partition, which may optionally have an additional compressed index. Compressed indices (e.g. a wavelet tree) enable multi-resolution access, multi-scheme writing, and fast searching, all with small space overheads.

FIG. 18 shows a flowchart 1800 outlining the steps for storing blocks of data associated with block identifications (IDs) in containers. At step 1802, a plurality of blocks is obtained. Each block comprises a string of symbols and is associated with a block ID. A block ID may be any identifying characteristic or symbol associated with a particular block. For example, it may be a semantic annotation in the form of a triple. In some implementations, a block ID is an integer, a string, a triple, a list of attributes, or a semantic annotation. For example, the first X symbols of a string of symbols included in the block may indicate a numerical ID for that block.

At step 1804, a block (one of the blocks belonging to the plurality of blocks received in step 1802) is assigned to a container. A container may be a physical location, such as a bin, tube, or other physical storage medium where nucleic acid molecules may be stored. A container may be linked to a single block or multiple blocks. For example, one container may be associated with B blocks of information. In some embodiments, a container may comprise multiple sub-containers.

At step 1806, the block is mapped to identifier sequences to be associated with the container. These identifiers may comprise an identifier range or multiple disparate identifiers of identifier ranges. An identifier range may be specified by the component sequences that comprise the identifiers flanking the range. In some implementations, each individual identifier is associated with a distinct integer, such that an identifier range may be specified by two integers. An individual identifier sequence of the plurality of identifier sequences corresponds to an individual symbol in the string of symbols stored in the block. Each identifier sequence includes a corresponding plurality of component sequences. Each of these component sequences includes a distinct nucleic acid sequence.

At step 1808, individual identifiers of the plurality of identifier sequences are constructed. For example, a set of Q identifier sequences may be associated with a particular container. A subset V of those Q identifier sequences may be physically constructed to represent information in the block, as described in various methods described above.

At step 1810, the identifiers constructed in step 1808 are stored in the assigned container. For example, the assigned container may then hold a number V of identifiers representing the information stored in the block. Identities of the container and the plurality of identifier nucleic acid sequences associated therewith are configured to be determined using the associated block ID. In some implementations, the identities are stored in a data structure designed to facilitate access of the identity of each container using the associated block ID. For example, the data structure may be one of a B-tree, a trie, or an array. In some implementations, at least a portion of the data structure is stored along with the digital information in an index. The index may include a second plurality of identifier sequences associated with a second container. In some implementations, the index is stored in a magnetic storage device, an optical storage device, a flash memory device, or cloud storage If the index includes a B-tree data structure, each node of the B-tree may include a distinct plurality of identifiers (i.e., different than the set of identifiers constructed in step 1808) of the second plurality of identifier sequences. In some implementations, to determine the identity of the distinct plurality of identifiers, the B-tree may be searched. Searching for a particular block ID in the B-tree may include selecting the distinct plurality of identifiers that comprise a first node and reading a value of the first node. The steps of selecting an identifier and reading a value of a node may be repeated with subsequent nodes. The identity of the distinct plurality of identifiers that comprise the subsequent node is determined by the blockID in relation to the value of the first node. In an example, the first node is the root node of the B-tree and the process of selecting (with random access method described above) and reading nodes continues until the value of a leaf node of the B-tree is read. The value of the leaf node is configured to communicate whether the block for the block ID exists. If the block ID exists, the identity of the container and the identity of the plurality of identifier nucleic acid sequences comprising said block (for example, the identifier range) may be communicated to a user or system.

If the index comprises a trie data structure, each node of the trie may comprise a distinct plurality of identifiers of the second plurality of identifier sequences. In some implementations, the block ID is a string of symbols and each node in the trie corresponds to a possible prefix of the string of symbols. If a path through the trie for a block ID exists, then the physical address (comprised of the container and identifier range or ranges) of the corresponding block can be specified by the leaf node of that path. Each intermediate node of the trie can be represented by a separate plurality of identifiers and can contain information on how many daughter nodes it has, what symbols those daughter nodes represent, and the physical addresses (comprised of the container identity and identifier range or identifier ranges) of those daughter nodes. In that way, the trie can be navigated in DNA, similar to the B-tree, using select-read operations as described above.

If the data structure is an array, each element of the array comprises a distinct plurality of identifiers of the second plurality of identifier sequences. In some implementations, each element in the array corresponds to a block ID and each element contains the physical address (comprised of the container identity and identifier range of ranges) of that block ID.

In some implementations, the location in the index of the identities (of the container and plurality of identifiers for each block) introduced in step 1810 described above is natively configured to the block ID. The block ID may map directly to a plurality of components that only and all identifiers that contain the physical address of the block share. The plurality of identifier nucleic acid molecules in the index that stores the identities may be comprised of individual identifier nucleic acid molecules that each comprise the plurality of components. In some implementations, the block ID maps directly to the container and a plurality of nucleic acid components that only and all identifiers of the corresponding block in the container share. In some implementations, the block ID is a triple of entities that annotate the associated block, and an entity of the triple maps to a plurality of nucleic acid components. The plurality of identifiers in the index that comprise individual identifiers that comprise the components can store the physical addresses of all blocks annotated with the entity. Alternatively or in addition, the plurality of identifiers in the content of an archive that comprise all blocks annotated by said entity may exclusively comprise the corresponding plurality of nucleic acid components that represent said entity.

A system for storing digital information according to any of the methods described herein (e.g., the methods described in relation to FIGS. 8-10, 18) may include a sample management system for storing multiple containers of nucleic acids. The system may use automation machinery for retrieving a specified container from the sample management system. In some implementations, this sample management system is used to access any kind of containers—including the DNA-holding identifiers described above in relation to FIG. 18 but also including any kind of physical or computer represented data storage element.

The foregoing is merely illustrative of the principles of the disclosure, and the apparatuses can be practiced by other than the described embodiments, which are presented for purposes of illustration and not of limitation. It is to be understood that the methods disclosed herein, while shown for use in nucleic acid-based data storage, may be applied to systems in other applications requiring data storage.

Variations and modifications will occur to those of skill in the art after reviewing this disclosure. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented.

The systems and methods described may be implemented locally on a printer/finisher system. The printer/finisher system may include a data processing apparatus. The systems and methods described herein may be implemented remotely on a separate data processing apparatus. The separate data processing apparatus may be connected directly or indirectly to the printer/finisher system through cloud applications. The printer/finisher system may communicate with the separate data processing apparatus in real-time (or near real-time).

In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program may correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Examples of changes, substitutions, and alterations are ascertainable by one skilled in the art and could be made without departing from the scope of the information disclosed herein. All references cited herein are incorporated by reference in their entirety and made part of this application.

What is claimed is:

1. A method for storing digital information into nucleic acid molecules, the method comprising:
   obtaining a plurality of blocks, wherein each block comprises a string of symbols and is associated with a block ID;
   assigning a block of the plurality of blocks to a container;
   mapping the block to a plurality of identifier nucleic acid sequences to be associated with the container, wherein an individual identifier nucleic acid sequence of the plurality of identifier nucleic acid sequences corresponds to an individual symbol in the string of symbols and comprises a corresponding plurality of component nucleic acid sequences, wherein each component nucleic acid sequence in the plurality of component nucleic acid sequences comprises a distinct nucleic acid sequence;
   constructing individual identifier nucleic acid molecules of the plurality of identifier nucleic acid sequences; and
   storing the individual identifier nucleic acid molecules in the assigned container, wherein a physical address, comprising the identities of the container and the plurality of identifier nucleic acid sequences associated therewith, is configured to be determined using the associated block ID.

2. The method of claim 1, wherein the block ID is an integer, a string, a triple, a list of attributes, or a semantic annotation.

3. The method of claim 1, wherein said physical address is stored in a data structure designed to facilitate access of the physical address using the associated block ID.

4. The method of claim 3, wherein the data structure is one of a B-tree, a trie, or an array.

5. The method of claim 3, wherein at least a portion of the data structure is stored along with the digital information in an index.

6. The method of claim 5, wherein the index is stored in a magnetic storage device, an optical storage device, a flash memory device, or cloud storage.

7. The method of claim 5, wherein the index comprises a second plurality of identifier nucleic acid sequences associated with a second container.

8. The method of claim 7, wherein the index comprises a B-tree data structure and each node of the B-tree comprises a distinct plurality of identifier nucleic acid molecules of the second plurality of identifier nucleic acid sequences.

9. The method of claim 8, wherein searching for the block ID in the B-tree comprises:
   (i) selecting the distinct plurality of identifier nucleic acid molecules that comprise a first node;
   (ii) reading a value of the first node, and
   (iii) repeating the process of steps (i) and (ii) with a subsequent node, wherein the identity of the distinct plurality of identifier nucleic acid molecules that comprise the subsequent node is determined by the block ID in relation to the value of the first node.

10. The method of claim 9, wherein the first node is the root node of the B-tree and the process of steps (i) and (ii) continues until the value of a leaf node of the B-tree is read, wherein the value of the leaf node is configured to communicate whether the block for the block ID exists, and if the block ID exists, communicate the physical address of said block.

11. The method of claim 7, wherein said index comprises a trie data structure and each node of the trie comprises a distinct plurality of identifier nucleic acid molecules of the second plurality of identifier nucleic acid sequences.

12. The method of claim 11, wherein the block ID is a string of symbols and each node in the trie corresponds to a possible prefix of the string of symbols.

13. The method of claim 11, wherein a leaf node of the trie is configured to store the physical address associated with the block ID that matches the string of symbols specified by the trie in said lead node.

14. The method of claim 7, wherein the data structure is an array and each element of the array comprises a distinct plurality of identifier nucleic acid molecules of the second plurality of identifier nucleic acid sequences.

15. The method of 14, wherein each element in the array corresponds to a block ID.

16. The method of claim 15, wherein each element of the array stores the physical address of the associated block ID.

17. The method of claim 7, wherein said physical address is natively configured to the block ID.

18. The method of claim 17, wherein the block ID maps directly to the physical address.

19. The method of claim 18, wherein the plurality of identifier nucleic acid molecules that stores the associated block are comprised of individual identifier nucleic acid molecules that each comprise said plurality of components.

20. The method of claim 18, wherein the block ID is a triple of entities that annotate the associated block, and an entity of the triple maps to a plurality of nucleic acid components.

21. The method of claim 20, wherein the plurality of identifier nucleic acid molecules in the container that comprise individual identifier nucleic acid molecules that comprise said plurality of nucleic acid components store all blocks annotated with said entity.

22. The method of claim 1, wherein a plurality of identifier nucleic acid molecules is fully comprised of contiguously ordered identifier nucleic acid sequences, such that said plurality of identifier nucleic acid molecules is configured to be specified by an identifier range comprising the identities of the first and last identifiers in said identifier range.

23. The method of claim 22, wherein the first and last identifiers in said identifier range are represented by integers.

24. The method of claim 1, further comprising storing bootup and ontology information along with said digital information.

\* \* \* \* \*